(12) United States Patent
Nyblom et al.

(10) Patent No.: US 9,776,093 B2
(45) Date of Patent: Oct. 3, 2017

(54) CONTROLLING A USER INTERFACE OF A COMPUTER DEVICE

(71) Applicant: KING.COM LIMITED, St. Julians (MT)

(72) Inventors: Tobias Nyblom, Stockholm (SE); Magnus Hansson, Stockholm (SE)

(73) Assignee: KING.COM LTD., St. Julians (MT)

(*) Notice: Subject to any disclaimer, the term of this patent is extended or adjusted under 35 U.S.C. 154(b) by 168 days.

(21) Appl. No.: 14/611,733

(22) Filed: Feb. 2, 2015

(65) Prior Publication Data
US 2016/0220898 A1   Aug. 4, 2016

(51) Int. Cl.
*A63F 9/24* (2006.01)
*A63F 13/80* (2014.01)
*A63F 13/35* (2014.01)

(52) U.S. Cl.
CPC .............. *A63F 13/80* (2014.09); *A63F 13/35* (2014.09)

(58) Field of Classification Search
CPC ....................................................... A63F 9/00
See application file for complete search history.

(56) References Cited

U.S. PATENT DOCUMENTS

| | | | |
|---|---|---|---|
| 5,423,556 A | 6/1995 | Latypov et al. | |
| 2002/0094854 A1 | 7/2002 | Morita et al. | |
| 2014/0235306 A1 | 8/2014 | Walls et al. | |

OTHER PUBLICATIONS

Azkend. Azkend 2: The World Beneath gameplay, https://www.youtube.com/watch?v=JG75WbH5-yA. Created Jun. 20, 2012.*
CrazyMikesApps. "Azkend 2 Hd—The World Beneath iPhone App Review—CrazyMikesapps" https://www.youtube.com/watch?v=yWFBH3S6tG8. Created Mar. 15, 2012.*
International Search Report, dated Apr. 21, 2016, and Written Opinion, issued in International Application No. PCT/EP2016/051961.
"Azkend 2: The World Beneath gameplay", retrieved from the Internet: https://www.youtube.com/watch?v=JG75WbH5-yA, Jun. 20, 2012.

* cited by examiner

*Primary Examiner* — Reginald Renwick
(74) *Attorney, Agent, or Firm* — Saul Ewing LLP

(57) ABSTRACT

A computer device having a user interface configured to display user actuatable game elements in a game board and to detect user input when a user engages with a game element in a move; a processor configured to receive a detected user input and on detecting a match game condition to control the user interface to remove at least three game elements from the display and to generate replacement user game elements for a subsequent move; and a graphics rendering component operable to render the game elements on the user interface, each game element having a graphical representation on a tile having a background appearance, wherein the processor is configured to determine on detecting the match game condition if at least one tile in the match game condition has an attained background appearance and if so to apply the attained background appearance to each tile of the match condition.

18 Claims, 90 Drawing Sheets

| T1 L | T2 A | T3 E | T4 W | T5 O |
| --- | --- | --- | --- | --- |
| T6 M | T7 U | T8 C | T9 L | T10 A |
| T11 QU | T12 A | T13 S | T14 A | T15 R |
| T16 A | T17 O | T18 I | T19 U | T20 U |
| T21 T | T22 G | T23 N | T24 C | T25 O |

Figure 14a

|    |    |    |    |    |
|----|----|----|----|----|
| B  | N  | D  | O  | Z  |
| L  | A  | E  | W  | O  |
| M  | U  | C  | L  | A  |
| A  | O  | I  | U  | U  |
| T  | G  | N  | C  | O  |

Figure 15a

CONTROLLING A USER INTERFACE OF A COMPUTER DEVICE

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements will then disappear. In a switcher game, the player switches place onto adjacent game elements on the game board so that one or both of them create a chain of at least three adjacent game elements of the same type. Those matched game elements will then disappear. The game board is then repopulated with game objects.

One such known match three-type game is known by the trade name Candy Crush. In that game, the game board is repopulated with game elements which are perceived as falling downwards onto the game board from the top edge of the screen from which the game is played.

Another known type of game is "linker game", where a sequence of game elements are linked to form a known sequence, such as a word, which can be matched to a dictionary. One such game is Alphabetty.

Another type of game is a 'clicker' game, in which matches can be made in a board by clicking adjacent game elements.

SUMMARY OF THE INVENTION

Aspects of the present invention provide improved methods of controlling a user interface in the context of a computer-implemented game of a matching type (switcher, clicker or linker). They provide a solution to the technical problem of improved user engagement by providing a new user engagement mode, which is implemented by a processor and data structure in a computer device.

One aspect of the invention provides a computer device having a user interface configured to display user actuatable game elements in a game board and to detect user input when a user engages with a game element in a move; a processor configured to receive a detected user input and on detecting a match game condition to control the user interface to remove at least three game elements from the display and to generate replacement user game elements for a subsequent move; and a graphics rendering component operable to render the game elements on the user interface, each game element having a graphical representation on a tile having a background appearance, wherein the processor is configured to determine on detecting the match game condition if at least one tile in the match game condition has an attained background appearance and if so to apply the attained background appearance to each tile of the match condition.

An attained background appearance can be applied by rendering tiles at the location of the removed game elements with the background appearance when the removed game elements are replaced. It will be understood that each tile has a game board location, but game elements are removed and replaced over the tiles. The background appearance is the appearance of a static tile underlying the game element or game object which may change. A background appearance may cover the whole tile or only a part thereof.

The graphics rendering component is operable to initially render at least some game elements on the user interface with a tile having a standard background appearance, wherein the standard background appearance differs visually from the attained background appearance.

In one embodiment the standard background appearance is a first colour and the attained background appearance is a second colour. The colour can cover the whole tile, or just all or part of a border.

In another embodiment the standard background appearance is matt and the attained background appearance is shiny.

In a further embodiment, the standard background appearance represents land and the attained background appearance represents water. In the game play, if the processor determines on detecting the match game condition that no tile in the match game condition has an attained background appearance, it is configured to apply the standard background appearance to replacement tiles of the game elements.

In most games, the graphics rendering component is operable to render game elements in multiple varieties, each variety differing from another variety in its shape and/or colour of a game object rendered on each tile.

For example, the game elements may resemble candies, as in Candy Crush (a match-3 switcher game), sea based creatures in another match-3 game or letters as in the linker game Alphabetty.

The processor may be configured to control the graphics rendering component to generate on the game board at least one special game element, wherein a special game element causes multiple further game elements to be removed when it is involved in a match game condition.

The tiles on the game board can be arranged in rows and columns.

One special game element causes a column of existing game elements on the game board to be removed in a line blast feature.

The processor can be configured to detect whether the special game element was on a tile with an attained background appearance, and if so to cause all replacement tiles for replacing the removed tiles to have the attained background appearance.

The processor can be configured to detect if the special game element was on a tile with an attained background appearance, and if not to apply a refill procedure, wherein the refill procedure detects whether any game elements removed in the line blast feature are on an attained background appearance, and if so to apply the attained background appearance to refill game elements for that game element and game elements in a refill direction of the column.

In one version of a match 3 switcher game, the direction of refill of the game element is downwards from a top portion of the game board when viewed by a user.

In another version of a match 3 switcher game, wherein each tile has a selectable physics which controls the direction in which it moves to replenish a vacancy left by removed game elements.

In a word game the game element represents letters, and a match condition is determined by the formation of a word stored in a dictionary accessible to the processor.

In one game objective the processor is configured to detect when all tiles have the attained background appearance, and to generate a new game board for a new level. In another game objective, the objective may be to cover only a predetermined set of tiles with the attained background appearance.

The invention provides in another aspect a game element is engaged by a user to be switched with an adjacent game element to create a match.

The invention provides in another aspect a computer implemented method of controlling a user interface responsive to user engagement with displayed game elements on an interface, the method comprising the following steps implemented by a processor of a computer device, detecting a match game condition of at least three game elements responsive to user input; generating replacement game elements to be displayed, each game element associated with a tile having a background appearance; determining on detecting the match game condition if at least one tile in the match game condition has an attained background appearance, and if so applying the attained background appearance to each tile of the match condition.

The method can comprise the step of initially generating a game board with a first set of tiles having a standard background appearance and a second set of tiles having the attained background appearance, and a game objective may be for a user to achieve a game board where all tiles have the attained background appearance.

The method can comprise the step of generating a game board having a first set of tiles with a standard background appearance, a second set of tiles with a first attained background appearance and a third set of tiles with a second attained background appearance, wherein an objective for the user is to select one of the first and second attained background appearances and to control the game elements such that after at least one game move the replacement tiles are of his selected first or second attained background appearance.

In this context a game objective may be to "beat" another player who is controlling the other attained background appearance or to "beat" the processor which is monitoring moves and using artificial intelligence to play against the user with the other attained background appearance.

The decision logic in such a scenario can be that if the colour/characteristic/attained
  background appearance associated with the person (or AI) making a move for which a match condition is identified is comprised in the match, all the tiles of the match changes to the attained colour/characteristics of that person/AI.

Thus, in one embodiment a first player controls the first attained background appearance and a second player controls the second attained background appearance wherein if the attained background appearance associated with the player making a move for which a match condition is identified is comprised in the match, all the tiles of the match change to the attained background of that player. A 'player' can be a user or a processor implementing an AI player logic.

A further aspect provides computer program products for implementing the afore-defined methods.

BRIEF DESCRIPTION OF THE DRAWINGS

For a better understanding of the present invention and to show how the same may be carried into effect, reference will now be made by way of example to the accompanying drawings in which:

DESCRIPTION OF THE DRAWINGS

Embodiments of the invention will now be described by way of the accompanying drawings in which:

FIGS. 1(a)-(d) show an edited version of a game board, illustrating the spreading of jam as a result of a 3-combo match.

Figure 2A:
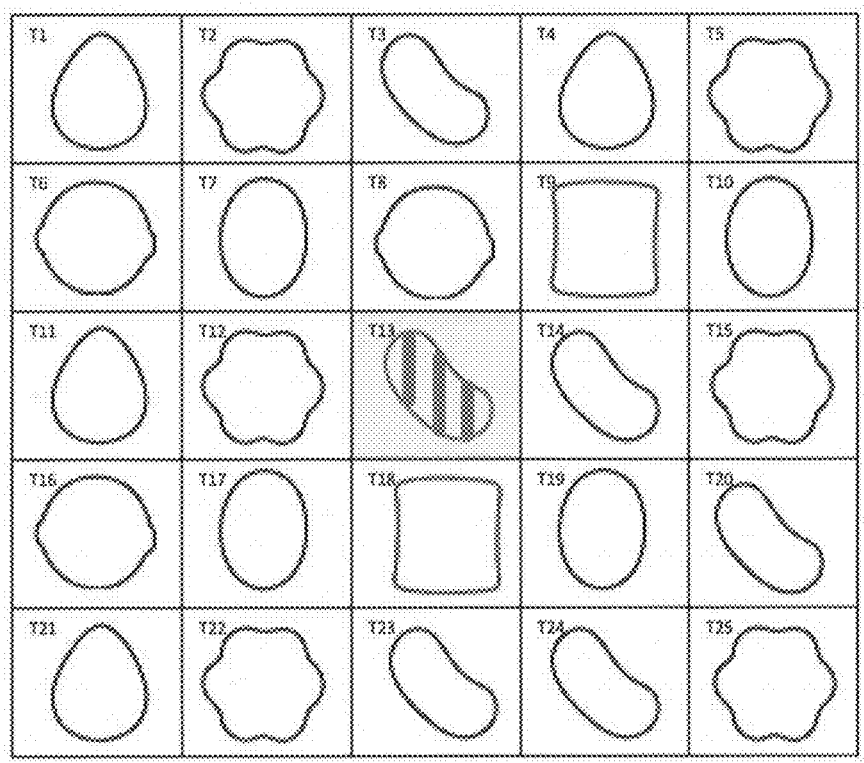
Figure 2B:
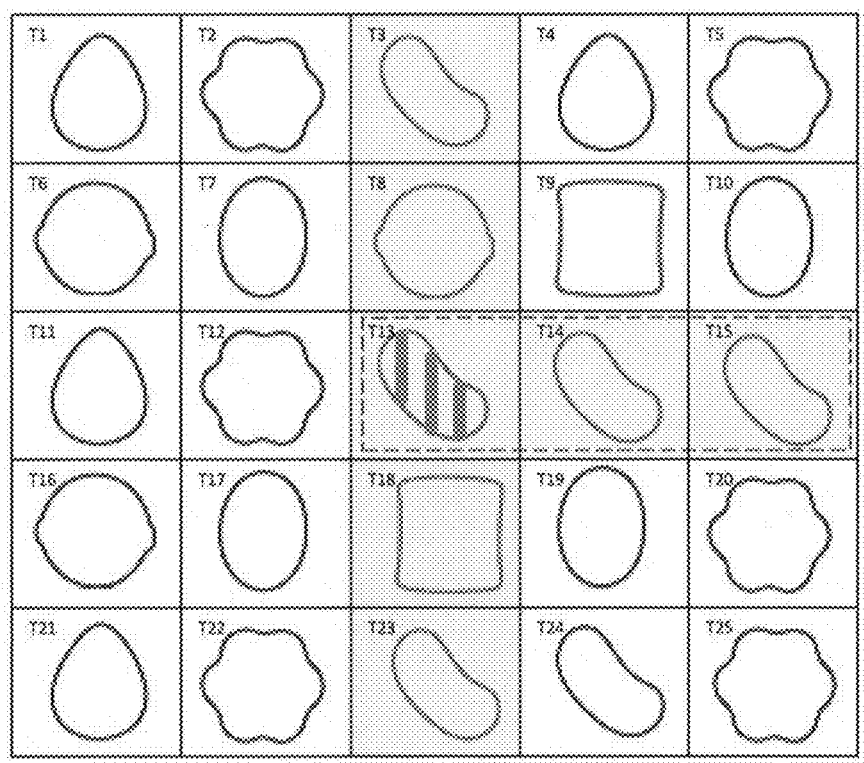
Figure 2C:
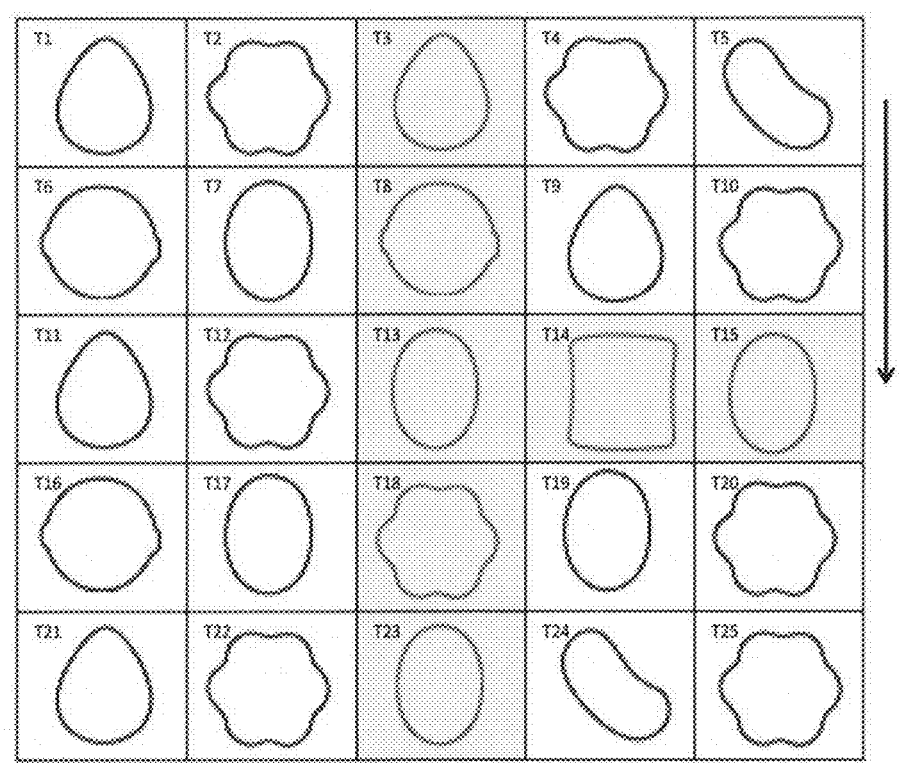

FIGS. 2(a)-(c) show an edited version of a game board, illustrating how jam spreads from a match containing a special (vertically striped) candy on jam.

FIGS. 3(a)-(e) show an edited version of a game board, illustrating how jam is smeared when a special feature, a line blast, encounters a candy on jam.

FIGS. 4(a)-(d) show an edited version of a game board, illustrating how jam is spread as a result of a match containing a wrapped candy on jam.

Figure 5A:
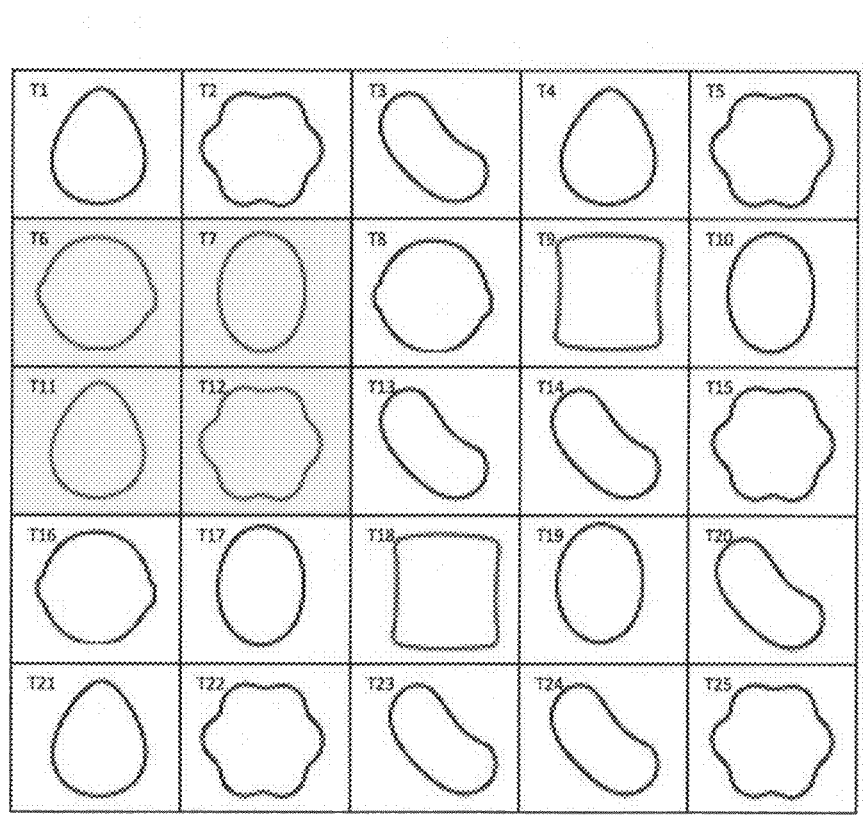
Figure 5B:
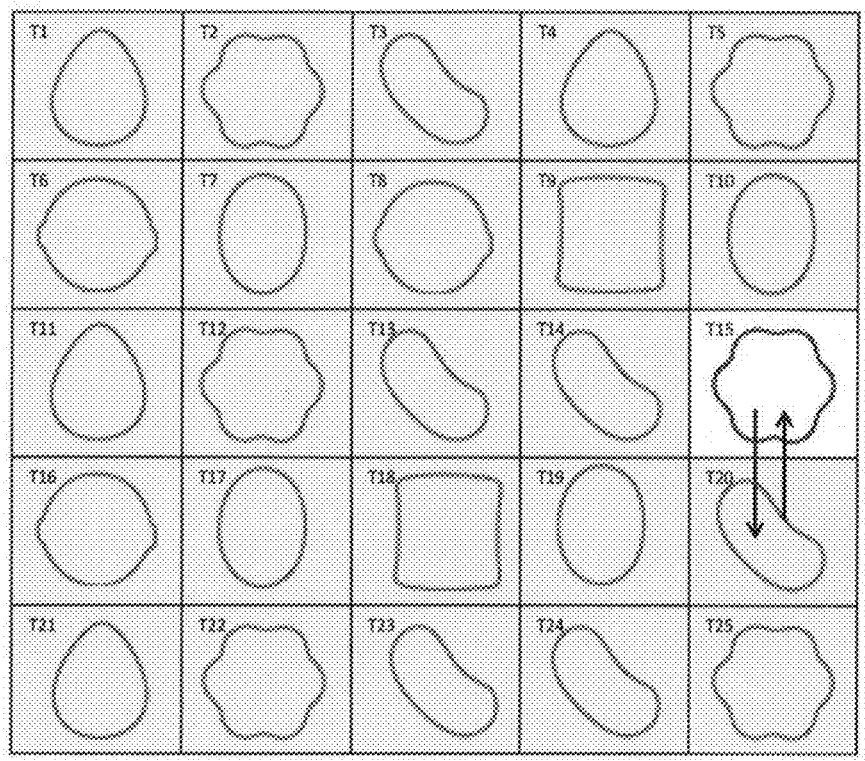

FIGS. 5(a)-(b) show an edited version of a game board, illustrating how a level objective presented to a player may be to cover the entire game board with jam, as a result of making matches.

Figure 6:
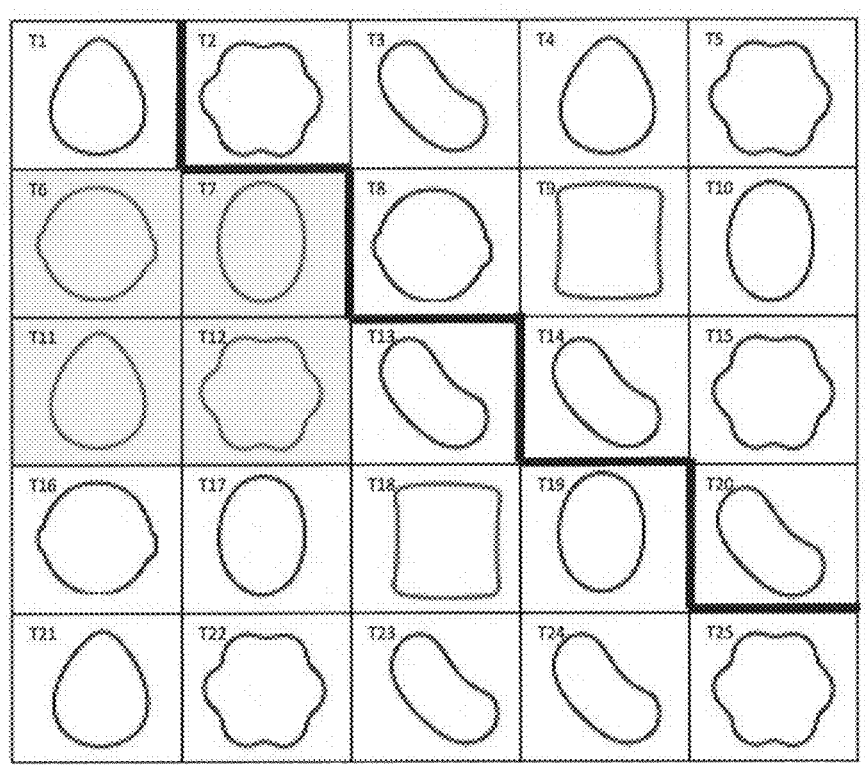

FIG. 6 shows an edited version of a game board, illustrating how a level objective presented to a player may be to fill a specific area on the game board with jam, as a result of making matches.

Figure 7A:
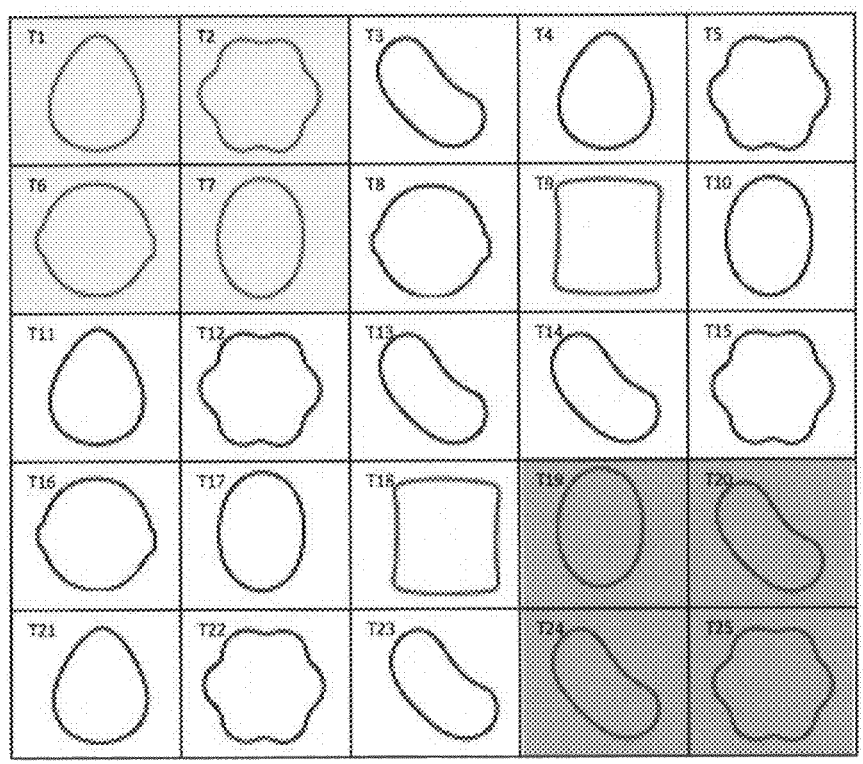
Figure 7B:
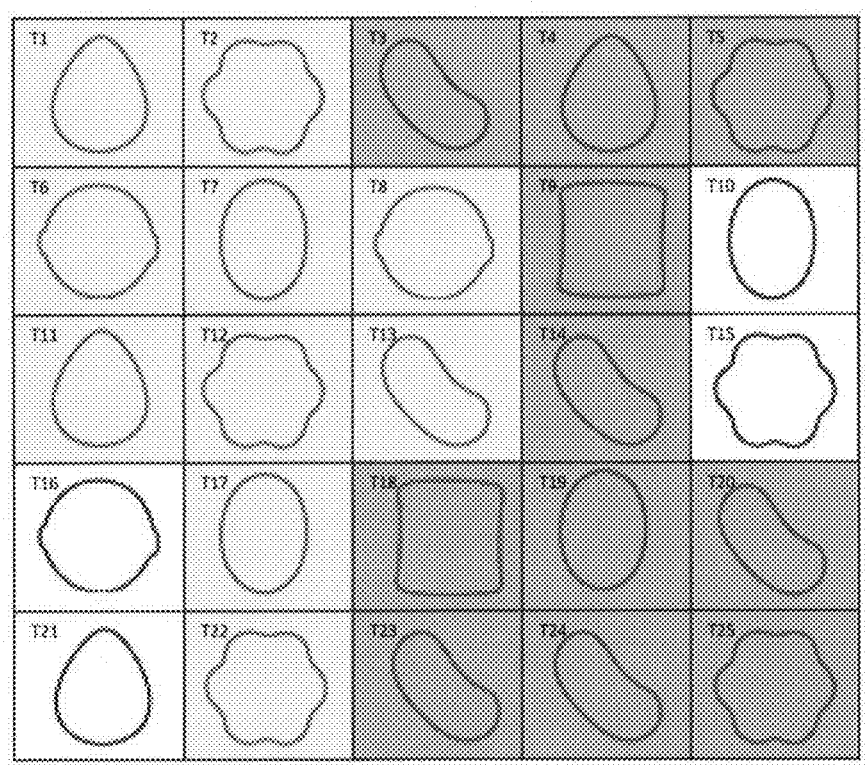
Figure 7C:
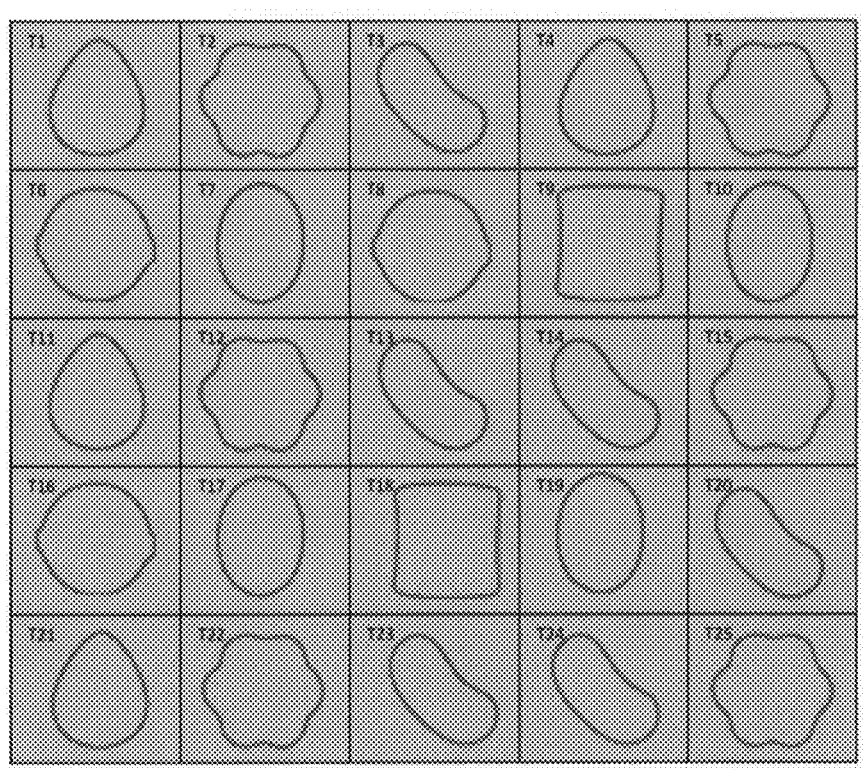

FIGS. 7(a)-(c) show an edited version of a game board, illustrating how a player may be presented with a level objective requiring them to fill the board with one of two or more different types/colours of jam present on the game board.

Figure 8A:
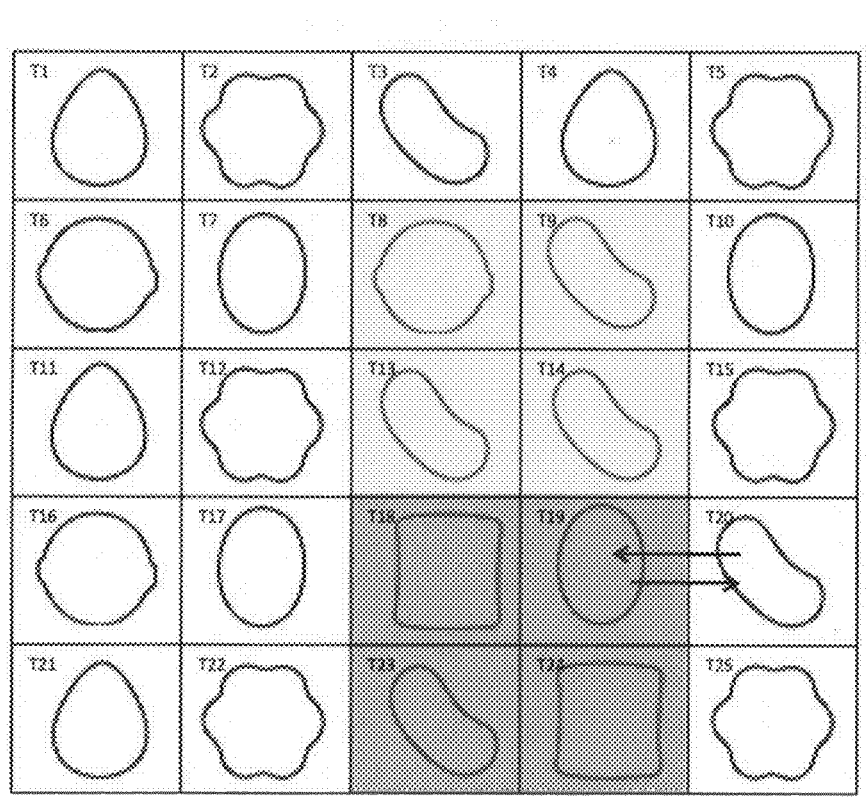
Figure 8B:
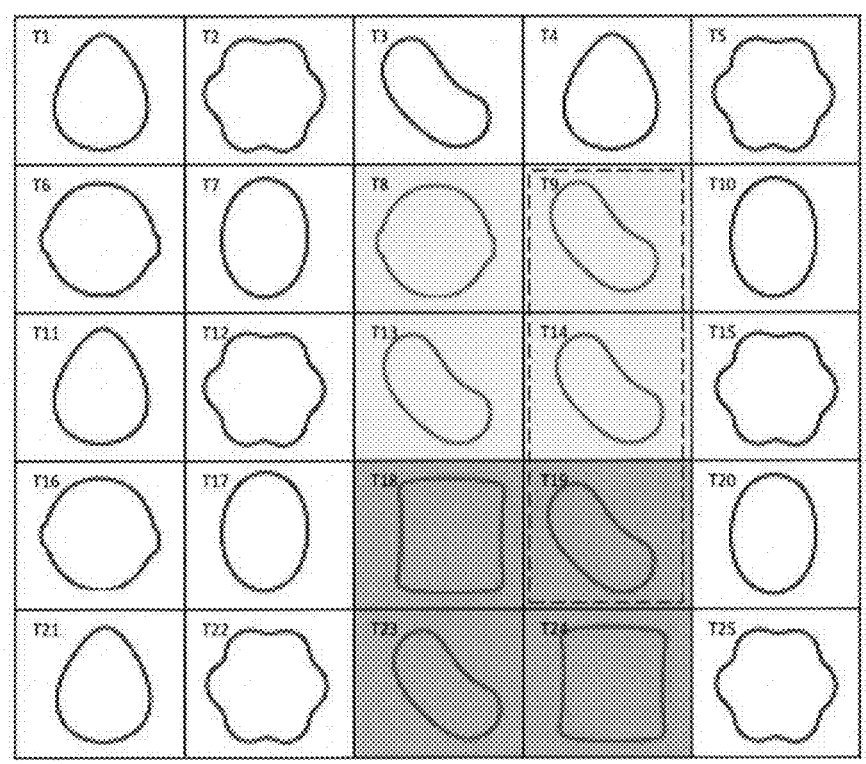
Figure 8C:
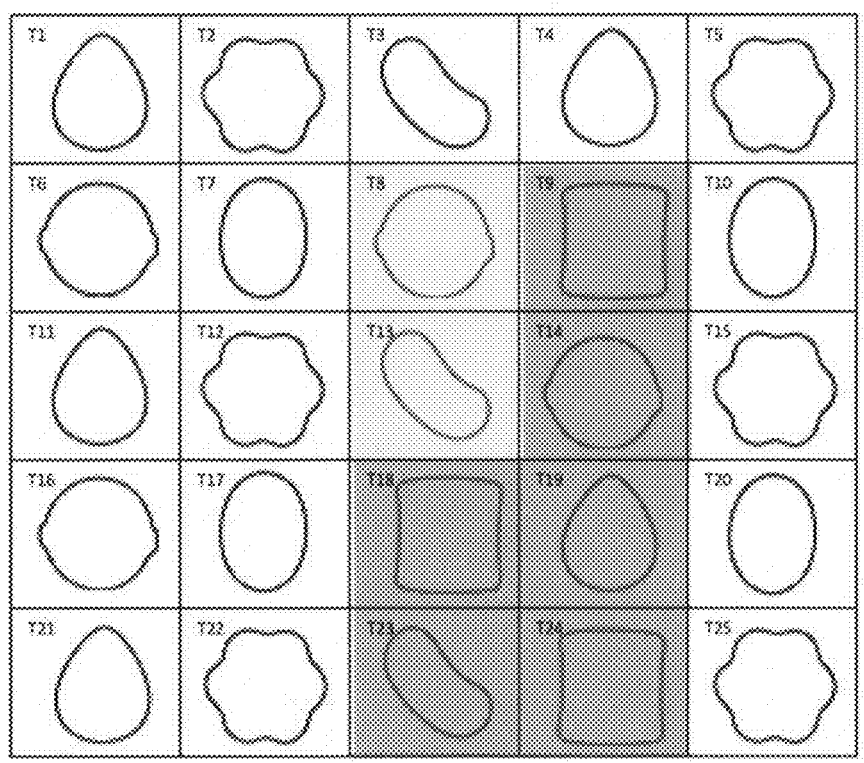

FIGS. 8(a)-(c) show an edited version of a game board, illustrating how it is decided which jam is spread if a match contains two or more different types/colours of jam. The candy moved to make the match lies on one of the types/colours of jam.

Figure 9A:
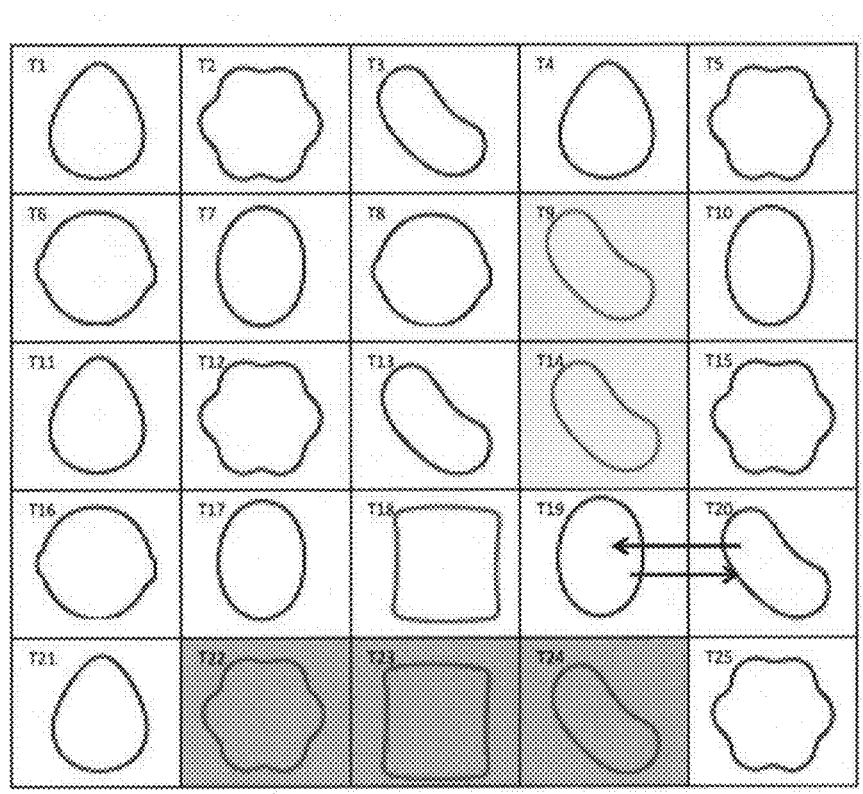
Figure 9B:
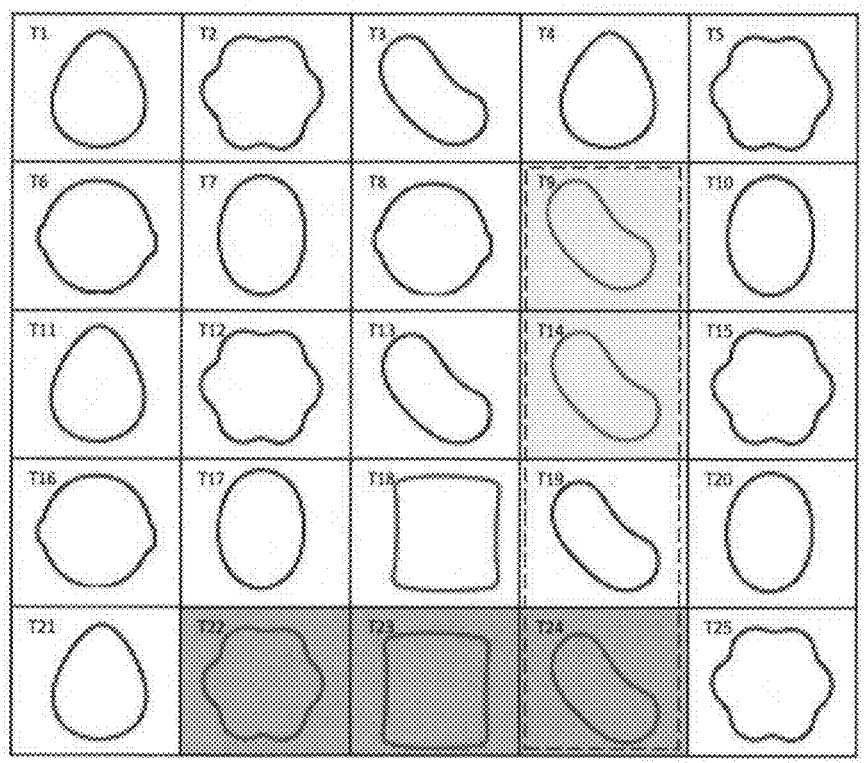
Figure 9C:
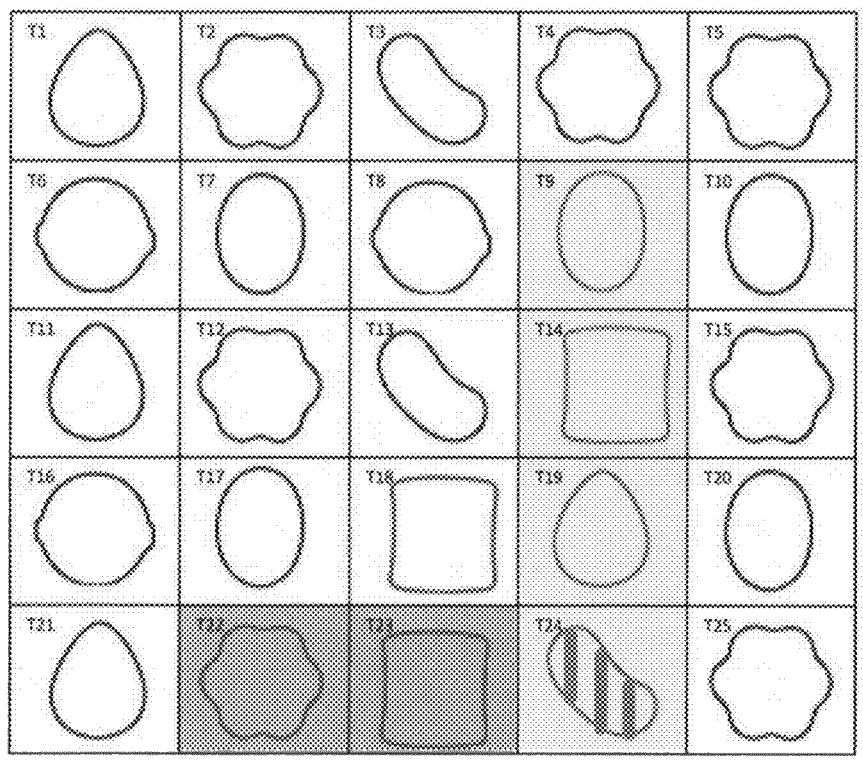

FIGS. 9(a)-(c) show an edited version of a game board, illustrating how it is decided which jam is spread if a match contains unequal numbers of candies on two or more types/colours of jam. The candy moved to create the match is not on any jam.

Figure 10A:
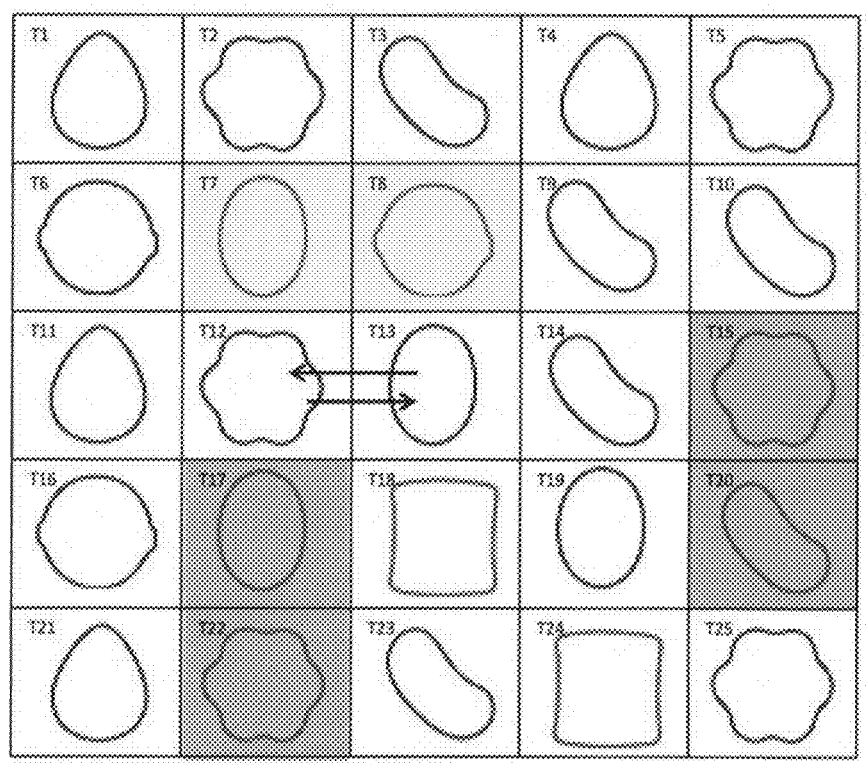
Figure 10B:
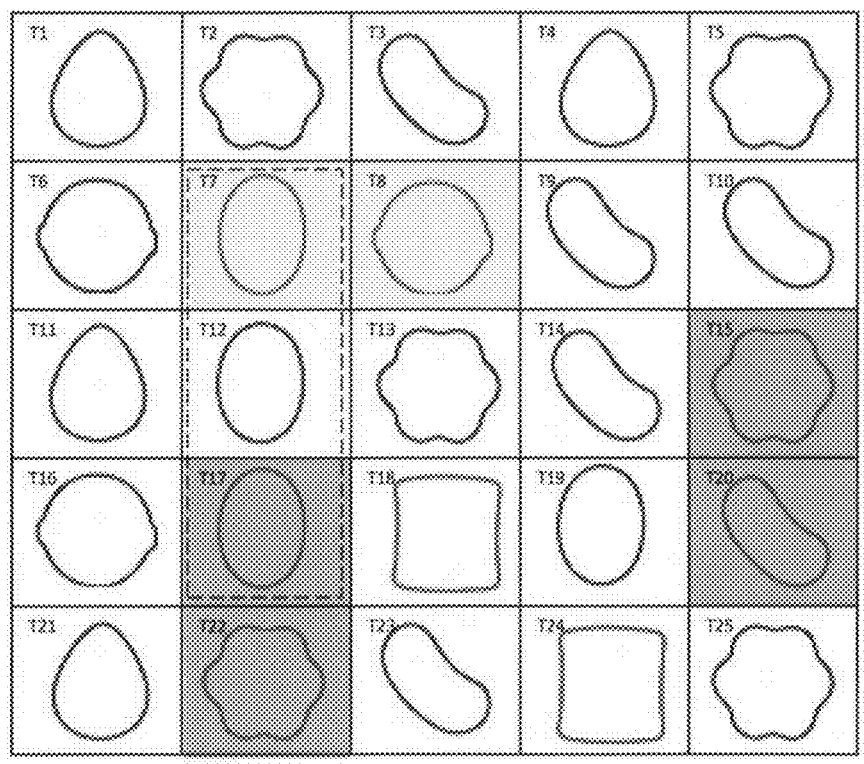
Figure 10C:
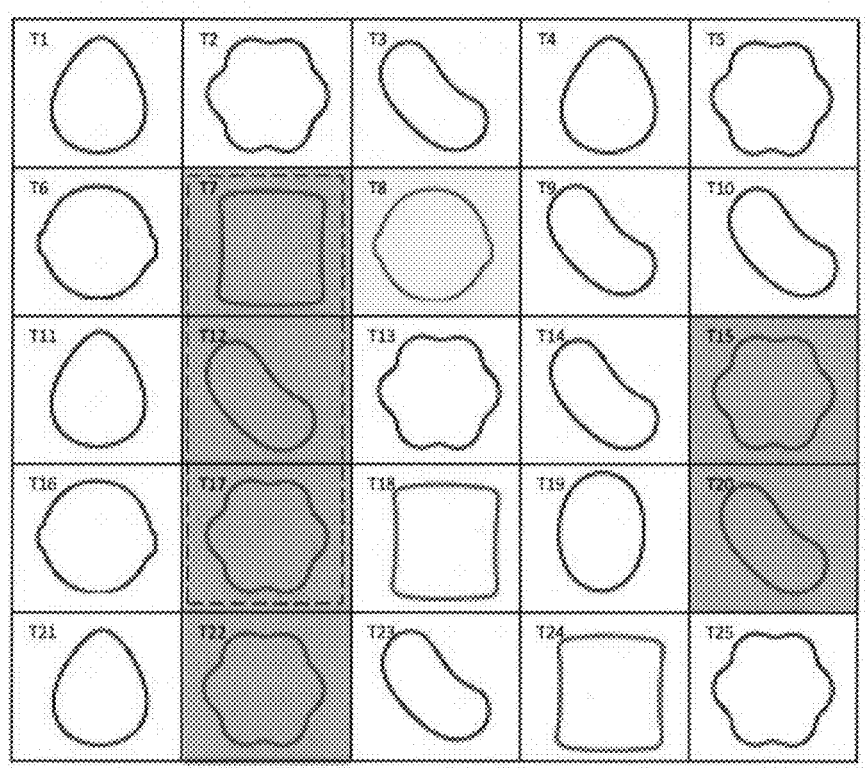

FIGS. 10(a)-(c) show an edited version of a game board, illustrating how it is decided which jam is spread if a match contains equal numbers of candies on two or more types/colours of jam. The candy moved to create the match is not on any jam.

Figure 11:
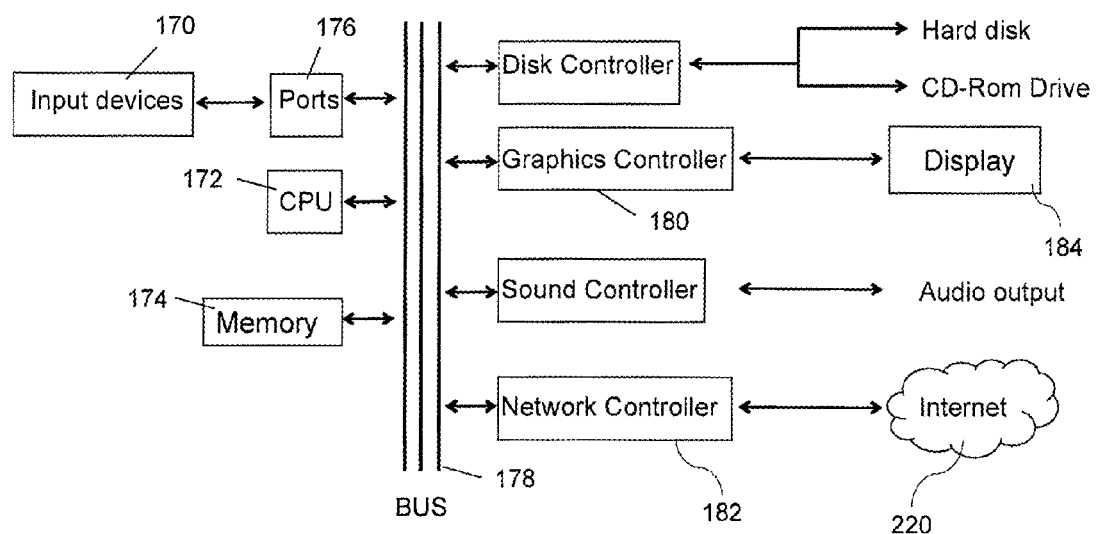
Figure 12:
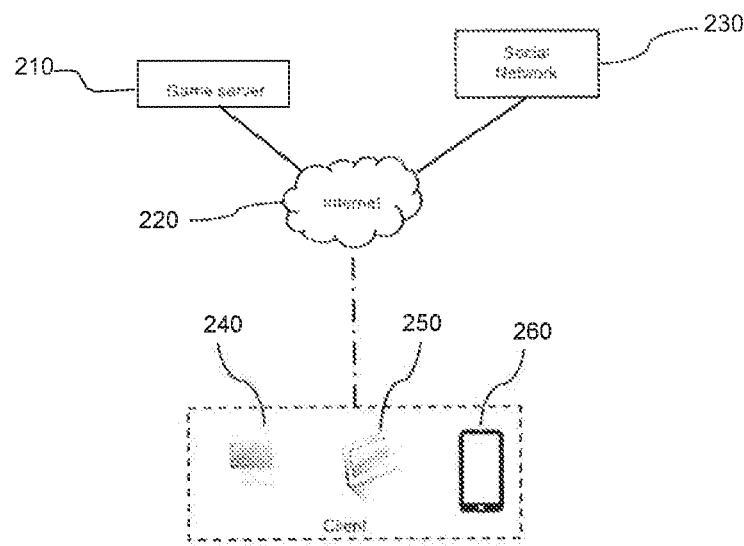
Figure 13:
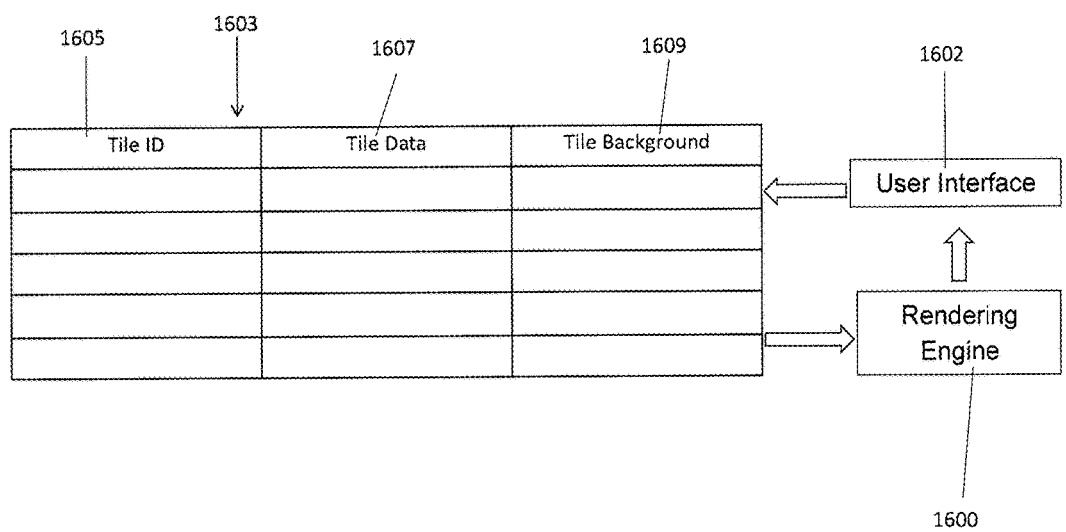

FIG. 11 is a schematic diagram of a computer device;

FIG. 12 is a schematic architecture diagram of a context in which a computer device can be utilised to play the game;

FIG. 13 is a diagram of a data structure for managing the tile background, showing the interrelation between the data structure and a rendering engine of the graphics controller.

FIGS. 14(a)-(e) show an edited version of a game board, illustrating how the background is attained by tiles by linking letters to make words, where at least one letter is in a tile that has already attained the background.

Figure 15A:
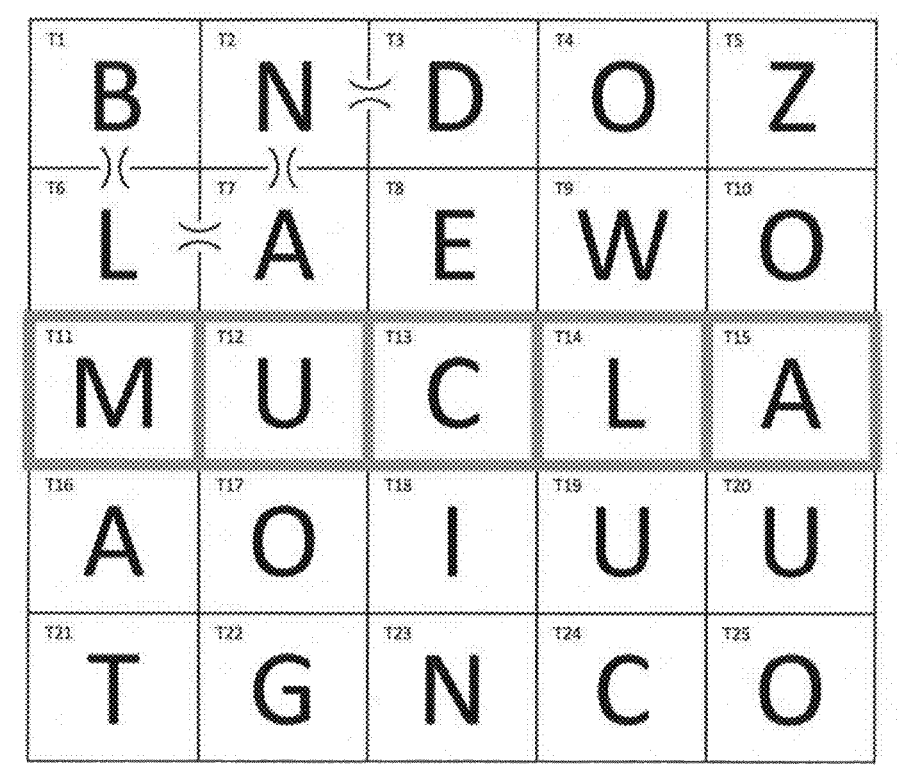
Figure 15B:
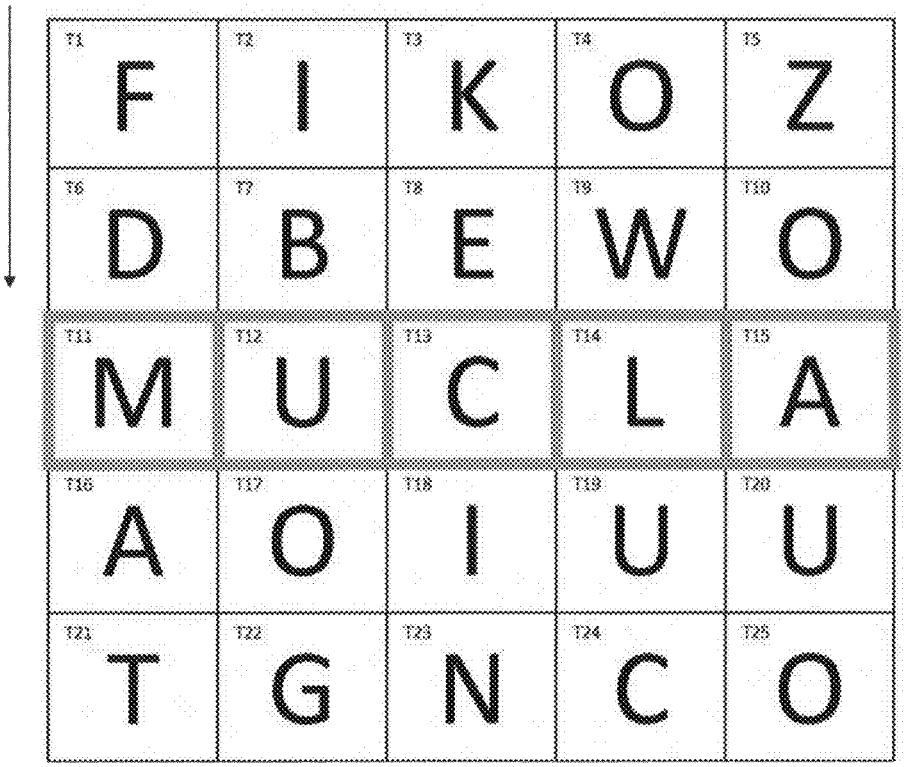

FIGS. 15(a)-(b) show an edited version of a game board, illustrating how linking letters to form words, where none of the letters have the attainable background, does not lead to these tiles attaining the background.

FIGS. 16(a)-(e) show an edited version of a game board, illustrating how a player may be presented with a level objective to turn the background of particular tiles from one colour to another.

Figure 17A:
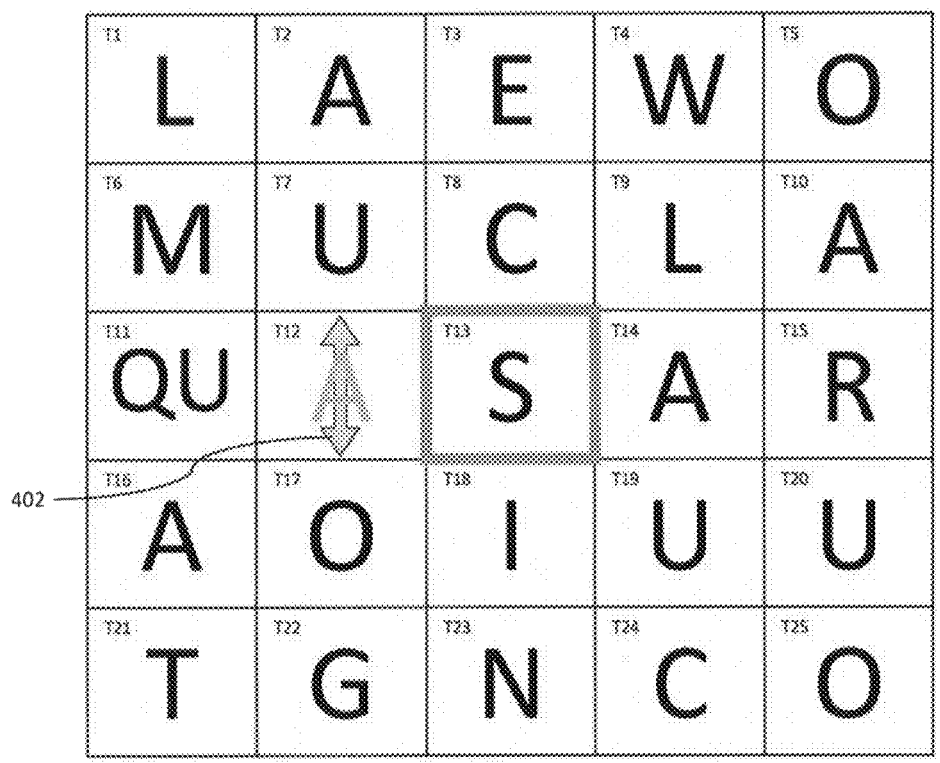
Figure 17B:
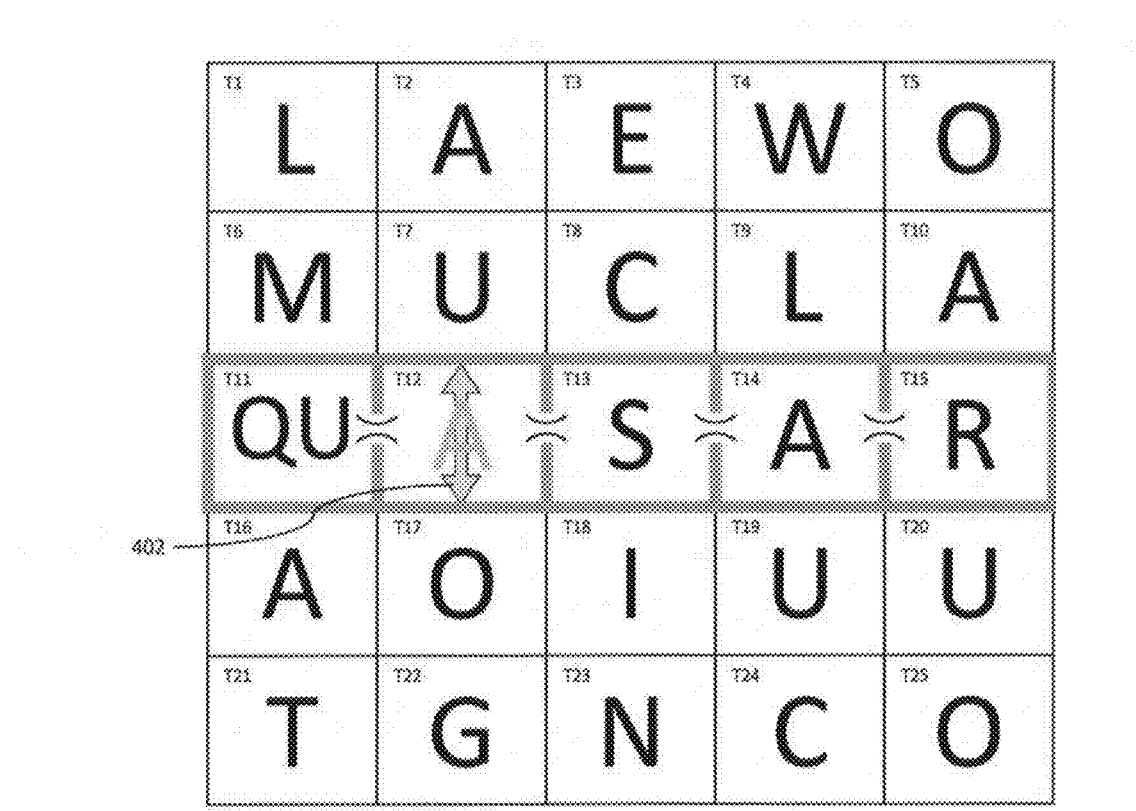
Figure 17C:
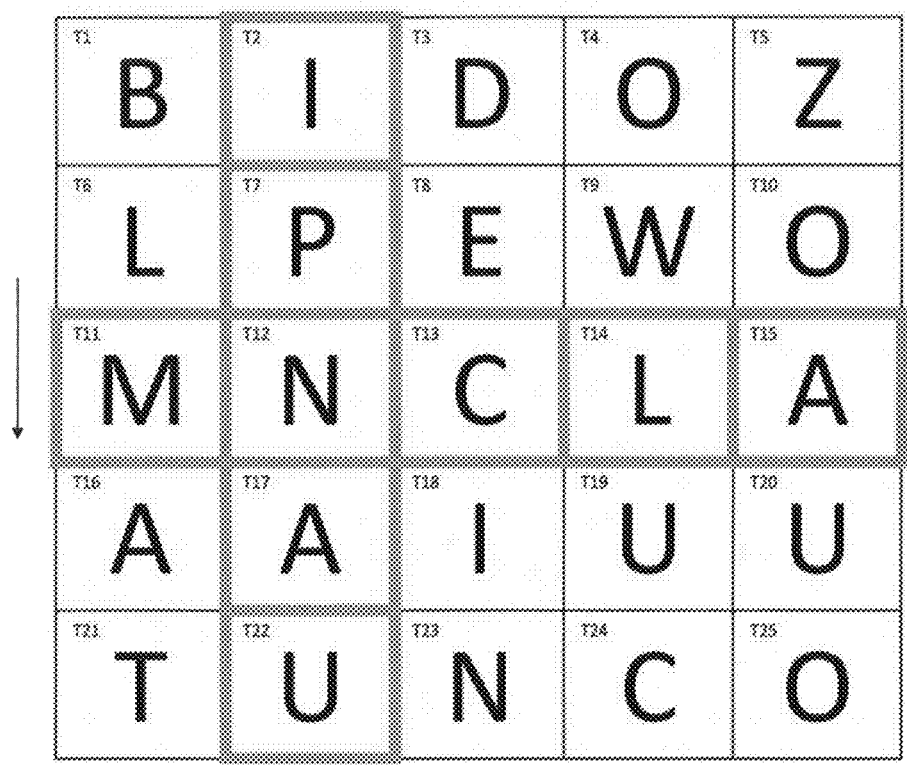

FIGS. 17(a)-(c) show an edited version of a game board, illustrating the result of linking tiles to make a word where one of the tiles is a special tile. In this example the special tile is a 2-way vertical line blast tile.

Figure 18A:
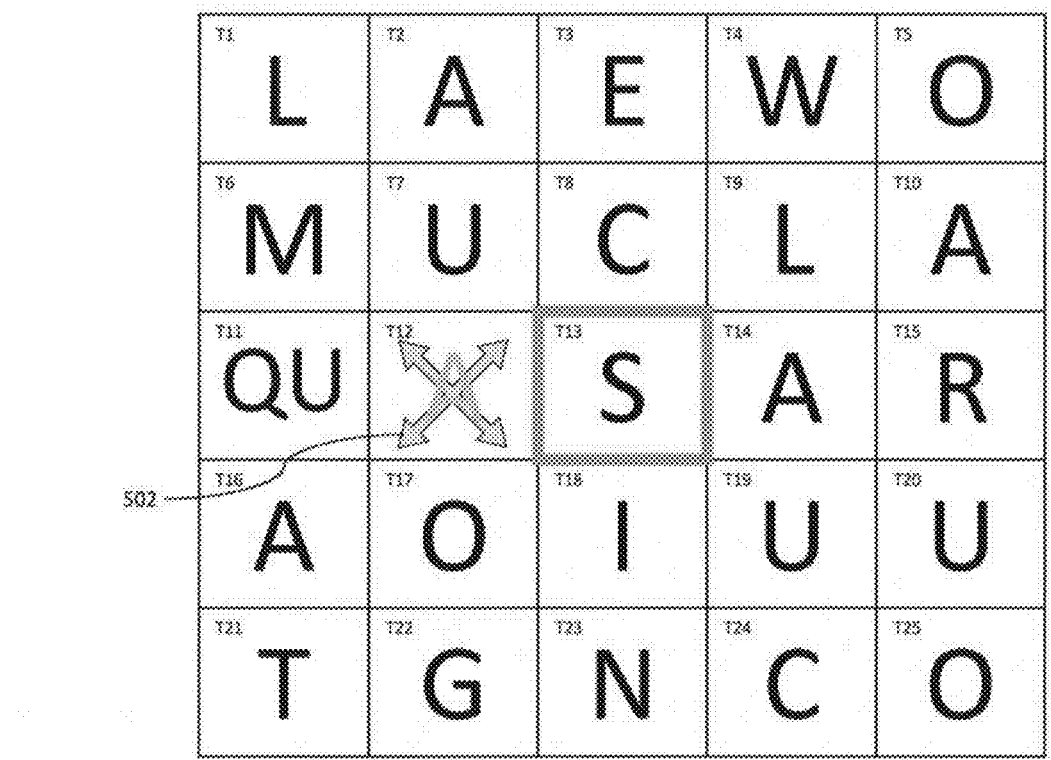
Figure 18B:
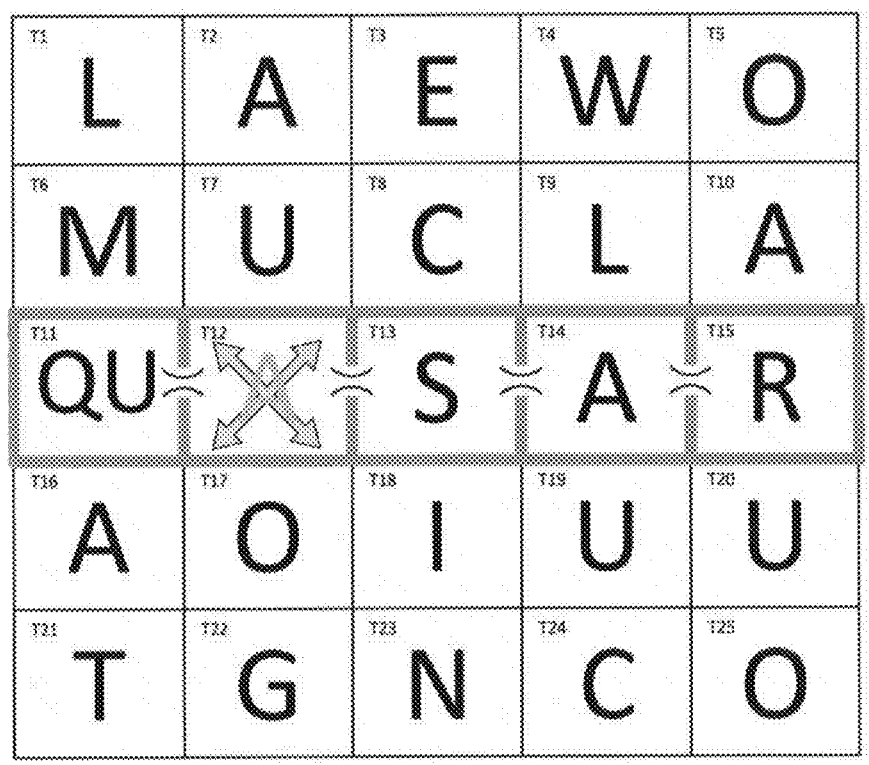
Figure 18C:
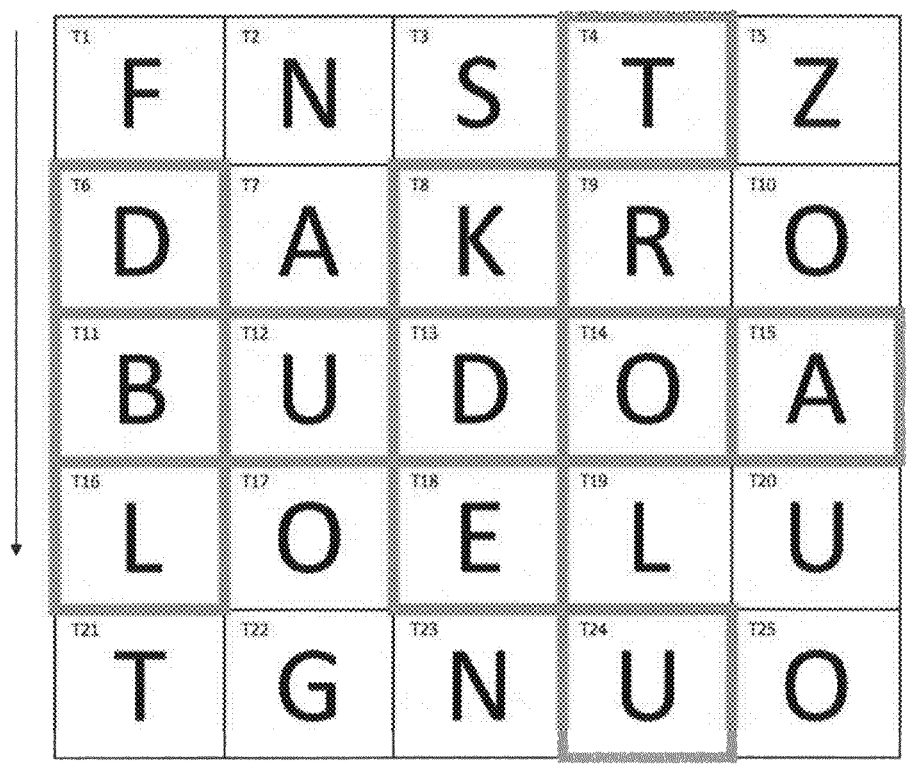

FIGS. 18(a)-(c) show an edited version of a game board, illustrating the result of linking tiles to make a word where one of the tiles is a special tile. In this example the special tile is a 4-way diagonal line blast tile.

Figure 19A:
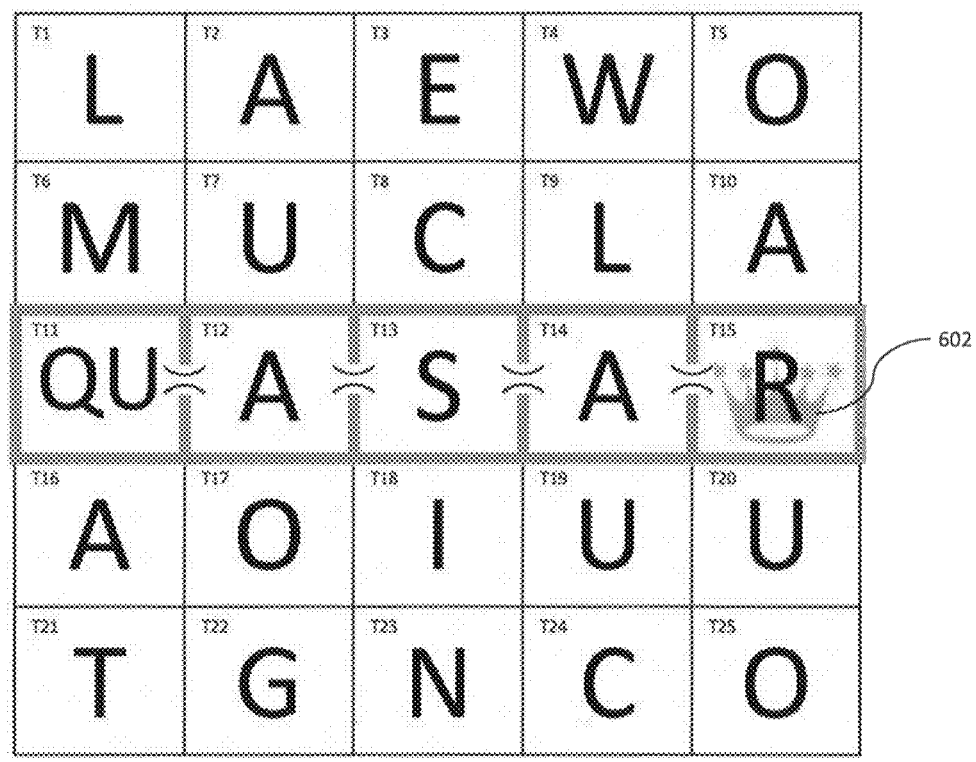
Figure 19B:
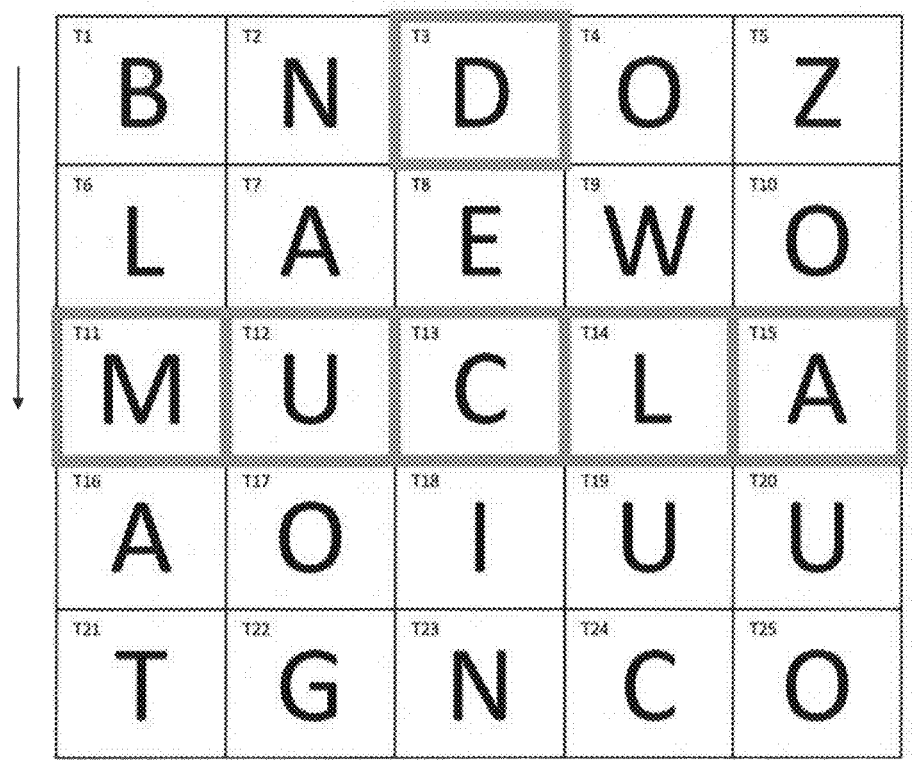

FIGS. 19(a)-(b) show an edited version of a game board, illustrating the result of linking tiles to make a word where one of the tiles is a special tile. In this example the special tile is a crown tile.

Figure 20:
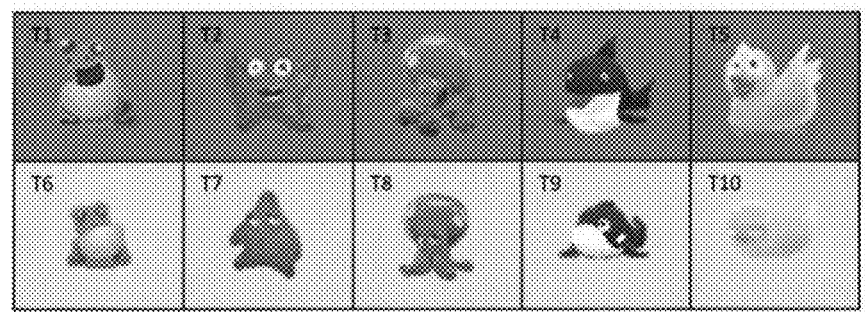

FIG. 20 shows an edited version of a game board, illustrating the various game pieces used and their background dependent appearance.

Figure 21A:
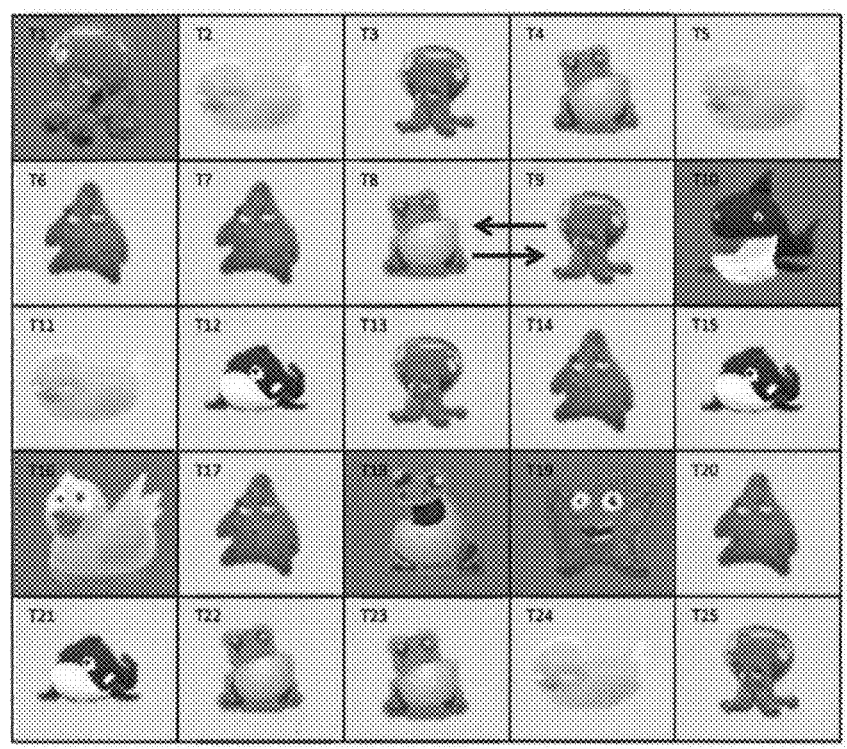
Figure 21B:
Figure 21C:
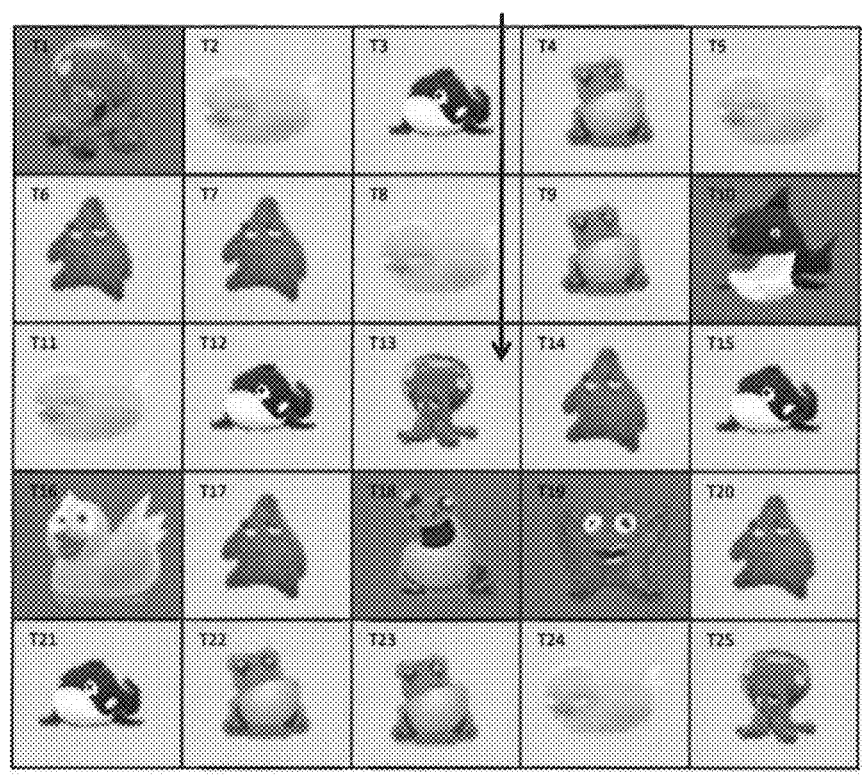

FIGS. 21(a)-(c) show an edited version of a game board, illustrating how a match made on tiles all possessing a ground background does not result in any tiles attaining a water background.

Figure 22A:
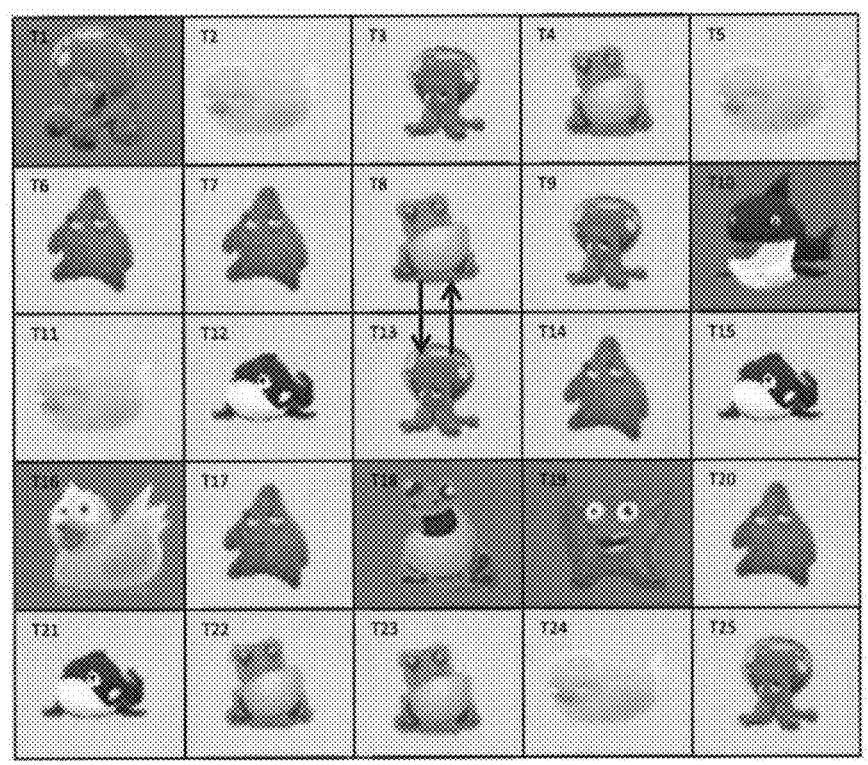
Figure 22B:
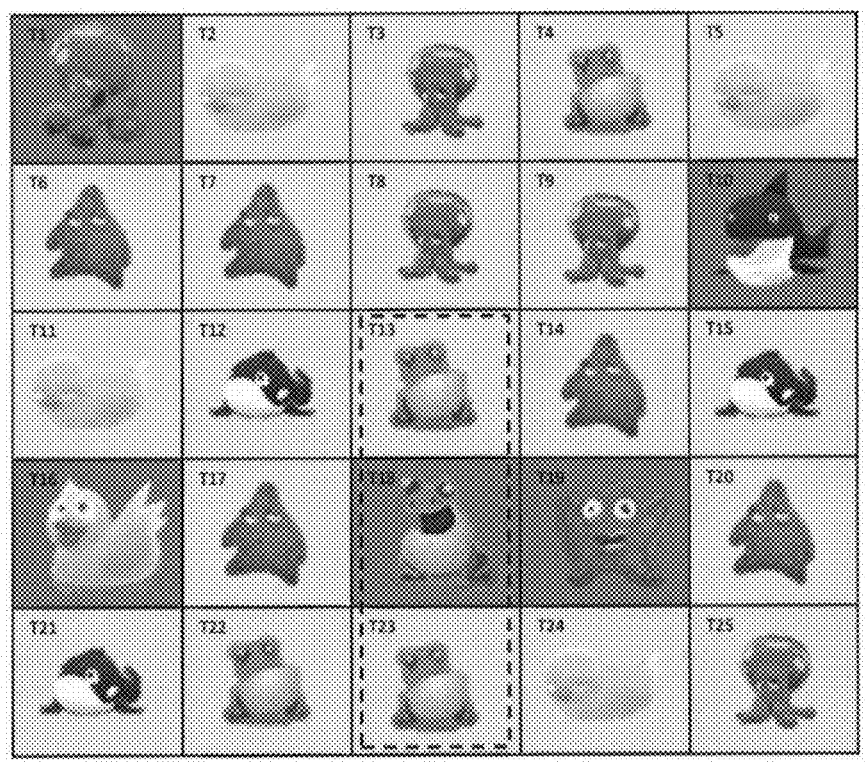
Figure 22C:
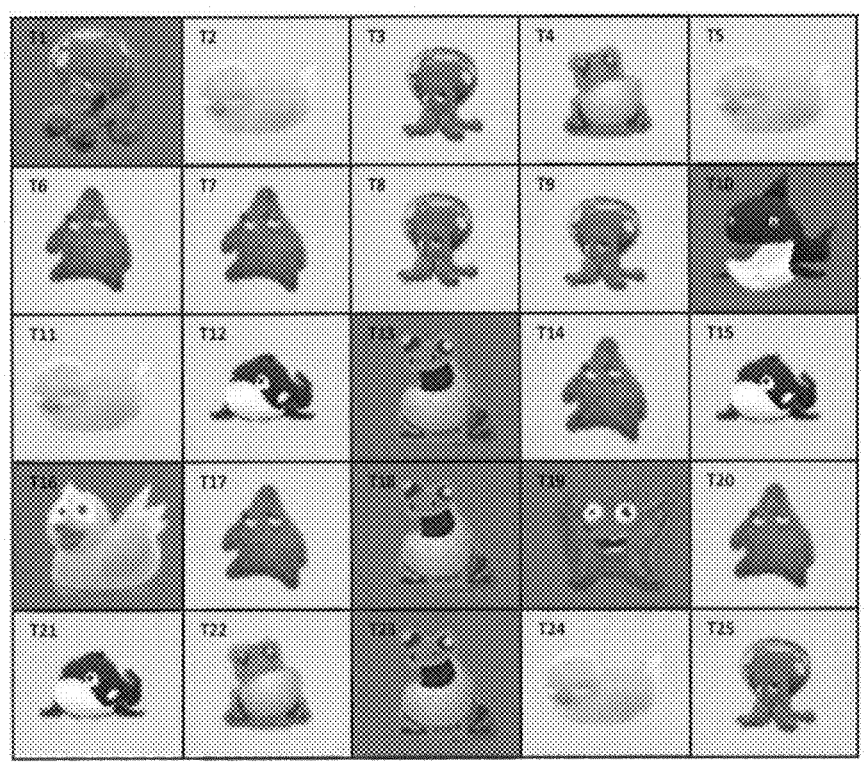

FIGS. 22(a)-(c) show an edited version of a game board, illustrating how a match made on tiles where at least one tile has attained the water background, results in the spreading of the water background to all tiles involved in the match.

FIGS. 23(a)-(e) show an edited version of a game board, illustrating the result of a 4-combo match on tiles where at least one tile has attained a water background.

FIGS. 24(a)-(f) show an edited version of a game board, illustrating the result of a 4-combo match on tiles where at least one tile has previously attained a water background, and a tile adjacent to the 4-combo has also previously attained a water background.

FIGS. 25(a)-(i) show an edited version of a game board, illustrating the result of a 5-combo match on tiles where at least one tile has attained a water background, creating a water fountain.

FIGS. 26(a)-(d) show an edited version of a game board, illustrating the result of a 4-combo match on tiles where at least one tile has attained a water background, and a tile adjacent to the 4-combo contains a driftwood 'blocker'.

Figure 27:
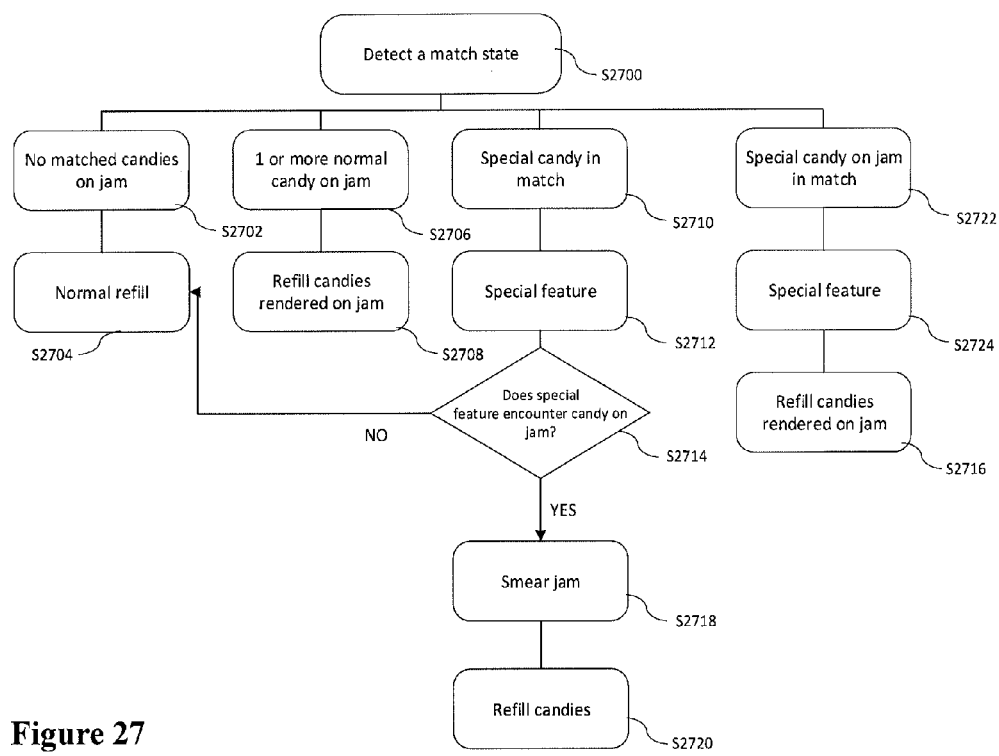

FIG. 27 is a flow diagram showing the steps used to determine the type of candy refill for combinations of special candy and jam.

Figure 28:
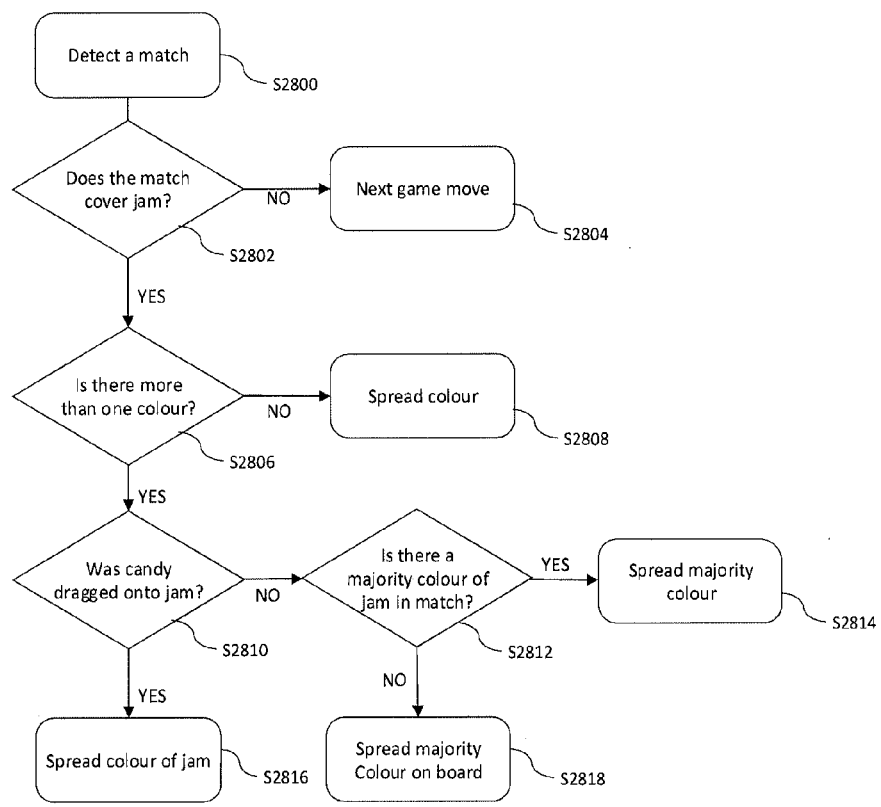

FIG. 28 is a flow diagram showing the steps used to determine the colour of jam spread, if any, when a match is detected.

Figure 29:
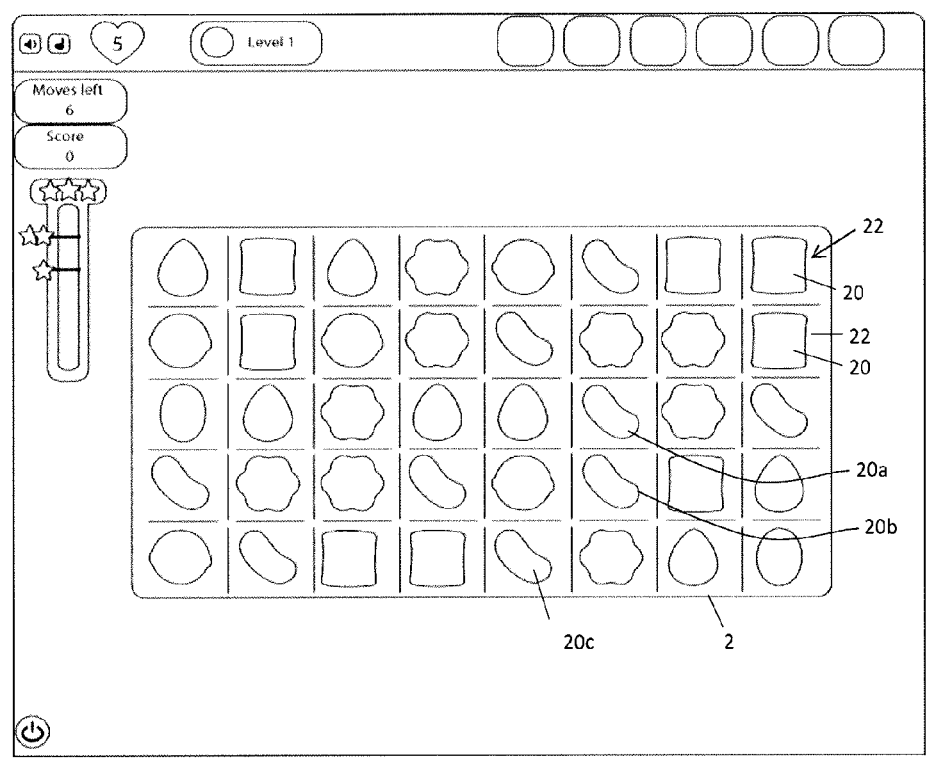
Figure 30:
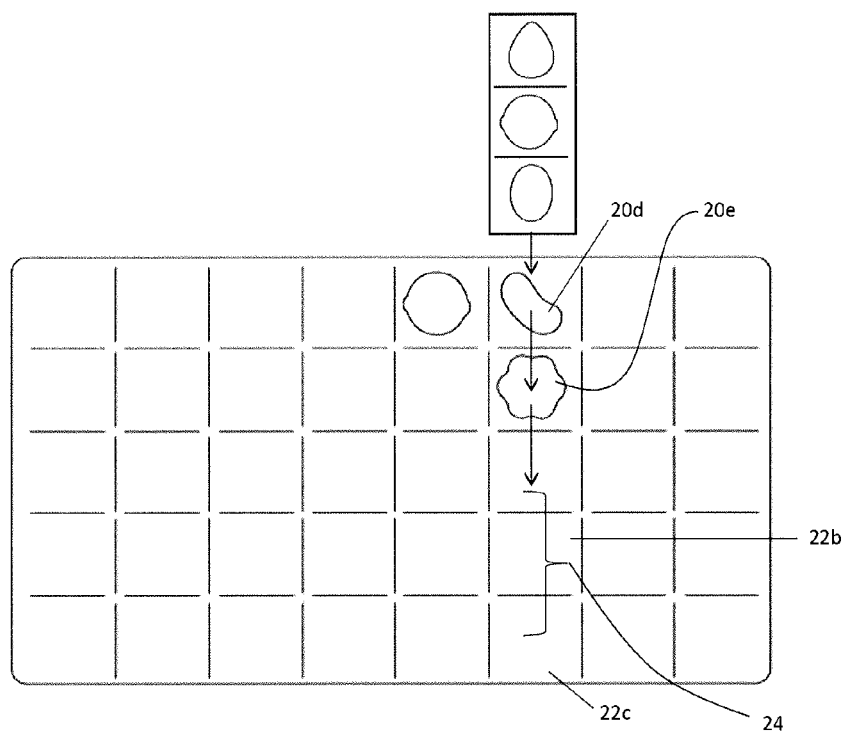

FIG. 29 is a schematic diagram of a game board of an existing version of a match three game;

FIG. 30 is a schematic diagram illustrating how a game board is repopulated with replacement game elements.

Figure 31:
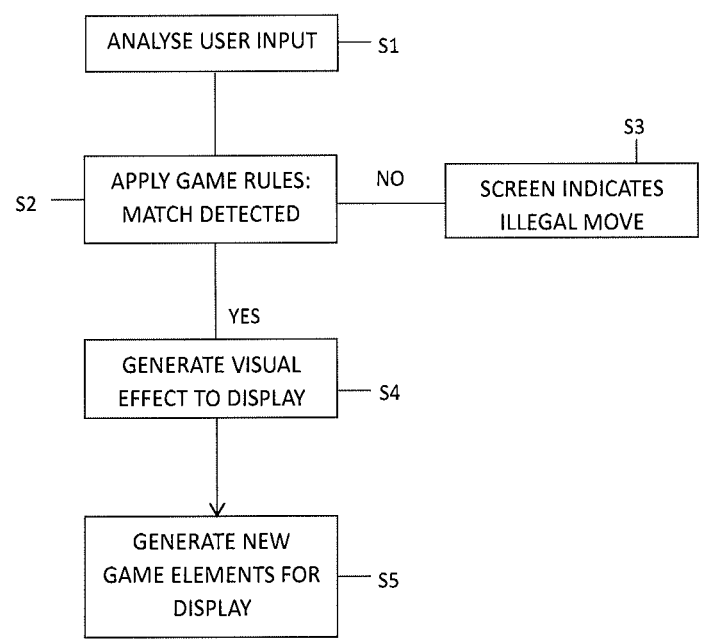

FIG. 31 is a flow chart indicating how a game board is repopulated with replacement game elements.

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

FIG. 29 shows a display of a known version of a match 3 switches game called Candy Crush Saga™. FIG. 29 illustrates a game board 2 with a plurality of game elements 20. The game elements are each of six different shapes and colours. Each game element is supported by a tile 22. The tiles are not readily visible to a player of the game—the game elements are the main focus for a player. However, the tiles govern characteristics of the game elements which are visible to a player as will be described in more detail later.

In the known version of the match 3 switcher game, the aim of the game is to swop game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 29 that game element 20c is moved one place to the right to form a three-line match with game elements 20a and 20b. Turning now to FIG. 30, this has the effect of game board elements 20a, 20b and 20c "disappearing", creating a visual effect (animation) on the screen to indicate the disappearance, such as a minimal explosion effect denoted 24 in FIG. 30. The two game elements which were directly above game elements 20a will now fall downwards into the spaces created by the removal of game elements 20a, 20b and 20c. Thus, game element 20e will end up at the location of tile 22c, and game element 20d will end up at the location of tile 22b. In addition, three new tiles with game elements are "created" and fall downwards into the game board to fill the remaining three spaces above tile 22b. The game elements on the newly created tiles which fall downwards into the game board are generated at random. The user then has a new game board on which to play a subsequent move. FIG. 31 is a flow chart illustrating a process implemented by software in a processor for executing the basic game mechanic just discussed. At step S1 the input made by a player on the screen is analysed. At step S2 the game rules are applied to see whether or not at least a three-element match has been created. If it has not, at step S3, the screen indicates an illegal move to a user, and the player must try again. If a match has been detected, at step S4 an appropriate visual effect is generated for the display to denote the match and the disappearance of the game elements which have been matched. At step S5, new game elements are generated for the display, these game elements falling downwards to fill up the display from the top. The so-called physics of the tile on generation of a new game board after each move is always the same in the existing version of the game called Candy Crush. That is, tiles drop down from above the game board at a set speeds and from the top of the game board.

In an alternative version detailed in U.S. Ser. No. 14/316, 274 and launched under the name Candy Crush Soda, the tile physics can vary so that the speed and direction of replacement can alter.

According to described embodiments the present invention, a new game mode is provided, with a completely new game objective and providing improved user engagement. According to this game mode, an initial game board is delivered with game elements having a tile with a standard background appearance, and one or more game elements having an "attained" background appearance. Although a game board is initially delivered with at least one tile with an "attained" background appearance, this term is used because the objective of game is to change the background appearance from a standard background appearance to be "attained" background appearance by making game moves. For example, the standard background appearance could be a first colour, and the attained background appearance could be a second colour. Certain types of game move would change the background appearance of a replacement tile in a location where a tile had a first colour to a tile having a second colour. In one game described later, this background appearance is referred to as "Jam".

In the word linker game called "Alphabetty" described later, a "green" mode is spread.

In a further game described later, entitled "Beached Buddies", the standard background appearance has a visual effect as sand (for example, it is brown and could also be rendered to visually represent the grain form of sound) or any other ground, and the attained background appearance has the visual effect of water.

According to the new game mode, the aim is to achieve an entire game board of tiles with the attained background appearance.

This new game mode is supported by a processor executing decision logic to alter the background appearance of tiles in replacement game elements, and the data structure which supports the logic.

FIG. 13 illustrates a data structure for managing the tile background appearance, and schematically illustrates the interrelation between the data structure 1603 and a rendering engine 1600 of the graphics controller 180. The graphics controller 180 is illustrated in FIG. 11. The data structure 1603 can be held in any suitable storage circuitry, such as illustrated by memory 174 in FIG. 11. The rendering engine 1600 drives the display on a user interface 1602 which receives the video output from the graphics controller 180 illustrated in FIG. 11.

As mentioned, activity at the user interface 1602 can cause the background appearance of replacement tiles to alter. The data structure 1603 is responsible for managing how replacement tiles are delivered to the user interface. Each tile has a tile ID 1605. The tile ID 1605 can define the location on the user interface where the tile is to be replenished, that is governed by the vacancy which has been released by gameplay. This allows the rendering engine 1600 to generate that tile at an appropriate location on the user interface display 1602. Each tile ID 1605 is associated with tile data 1607 which defines how the tile is to be displayed, that is what game element it has associated with it, and whether it has any "blockers" in addition to or instead of a game element, or any foreground or background. Different alternatives for blockers, foreground and background are discussed later. In particular, the background can be the attained or standard background.

In addition to this tile data, a separate field 1609 can denote whether the tile has an attained or standard background appearance for ease of managing the decision logic described later. The tile background can be modified for a particular tile based on activity at the user interface 1602. Thus, after each gameplay, the tile identifier, which defines the location at which the tile is to be replenished, can have a different tile background associated with it, as modified by activity at the user interface 1602.

Description of Architecture

FIG. 11 shows a schematic picture of a computing device, containing a Central Processing Unit 172 and Memory 174. The CPU 172 acts according to input given from input devices 170, such as a keyboard, mouse or touchscreen via input parts 176. Computer BUS 178 is used to communicate, both between input devices and the CPU, but also between different controllers within the computer device, such as a graphics controller 180 and a network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard. The flow diagrams of FIGS. 3 and 9 are implemented in software executed by the CPU 172, that can be stored in memory 174. The output screens are supplied to graphics controller 180 for supplying game video output to a user display 1602 (FIG. 16c).

FIG. 12 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference.

People skilled in the art will understand that other devices than the exemplary ones listed can be also be used without departing from the scope of the invention as claimed.

Jam Mode

In a new version of the match-3 switcher game Candy Crush, the attained background appearance is referred to as "jam". It may have a shiny appearance.

Jam is a tile quality (background) that lies under the normal candy crush game objects. It remains associated with particular tiles, while the game objects move and refill above it. It is spread when a match is made, and remains when the matched candy disappears. It is also spread according to the consequences of making matches with special candy. The spreading area depends upon which type of special candy is involved. In this context, "spreading" means that replacement tiles previously of a standard background now have an attained background.

FIGS. 1-10 show an edited version of the game board as it will be rendered to a user on the display of his computer device. The board has been reduced to a 5×5 grid for illustrative purposes. In this embodiment the jam is presented as a shading of the tile(s) of which it is an attained quality. Each type of match produces a different response.

Each response spreads the jam to the tiles involved in the respective response. Matches that involve special game objects modify these respective responses.

Figure 1A:
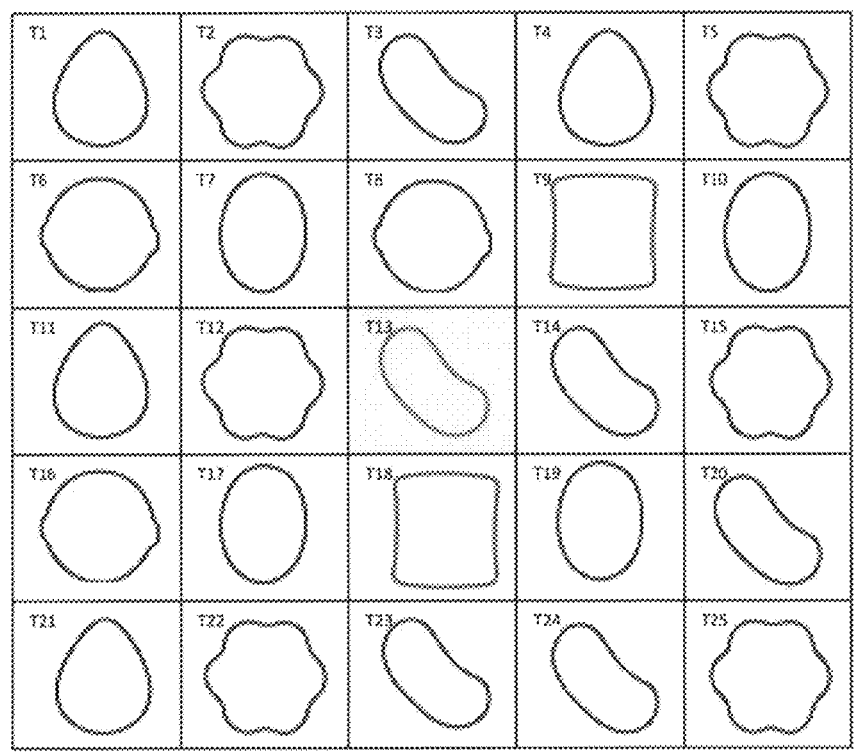

FIG. 1a shows a section of a game board. Tile T13 contains a kidney bean shaped candy, and is also occupied by the jam.

Figure 1B:
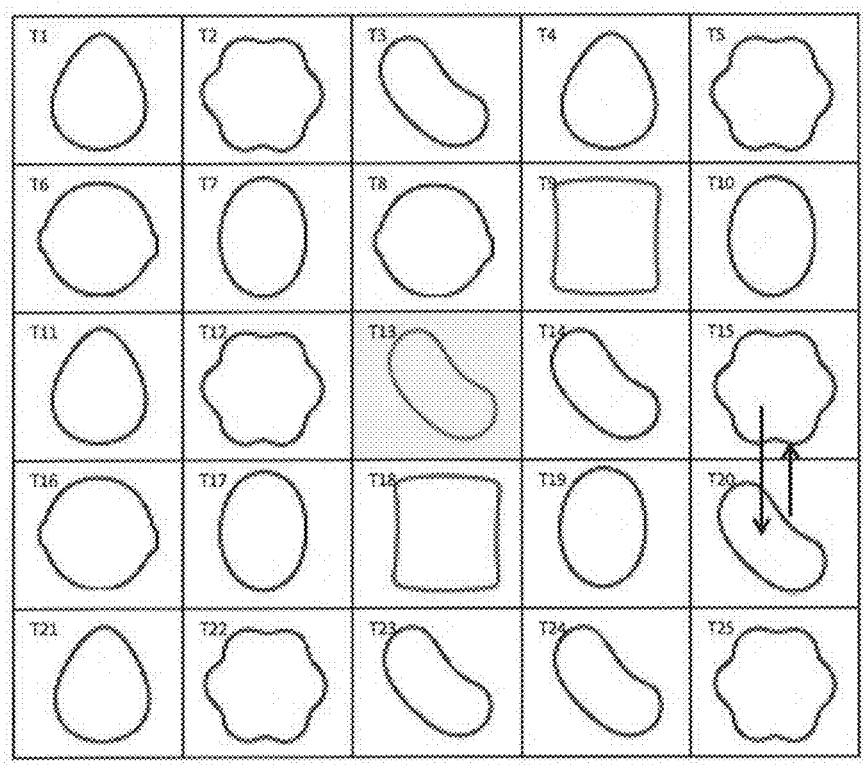

FIG. 1b shows the candy of tile T15 being dragged to tile T20. This will create a match-3 in the tiles T13, T14, and T15.

Figure 1C:
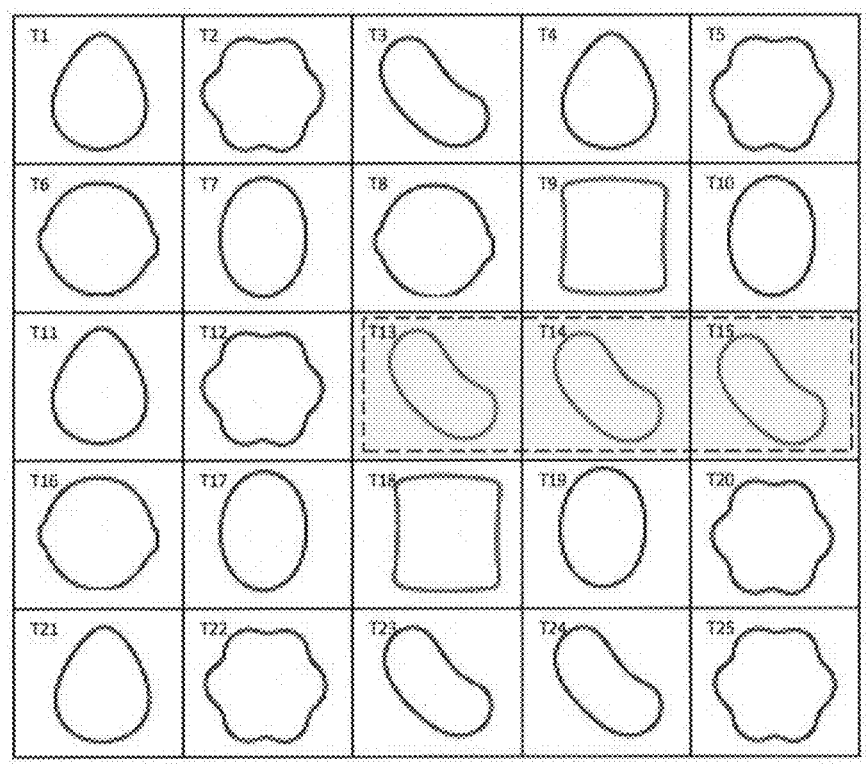

FIG. 1c shows the match-3 of tiles T13, T14 and T15 surrounded by a dashed line. The jam has spread so that it occupies tiles T14 and T15 as well as T15. Between tiles there are no gaps in the jam, it is continuous.

Figure 1D:
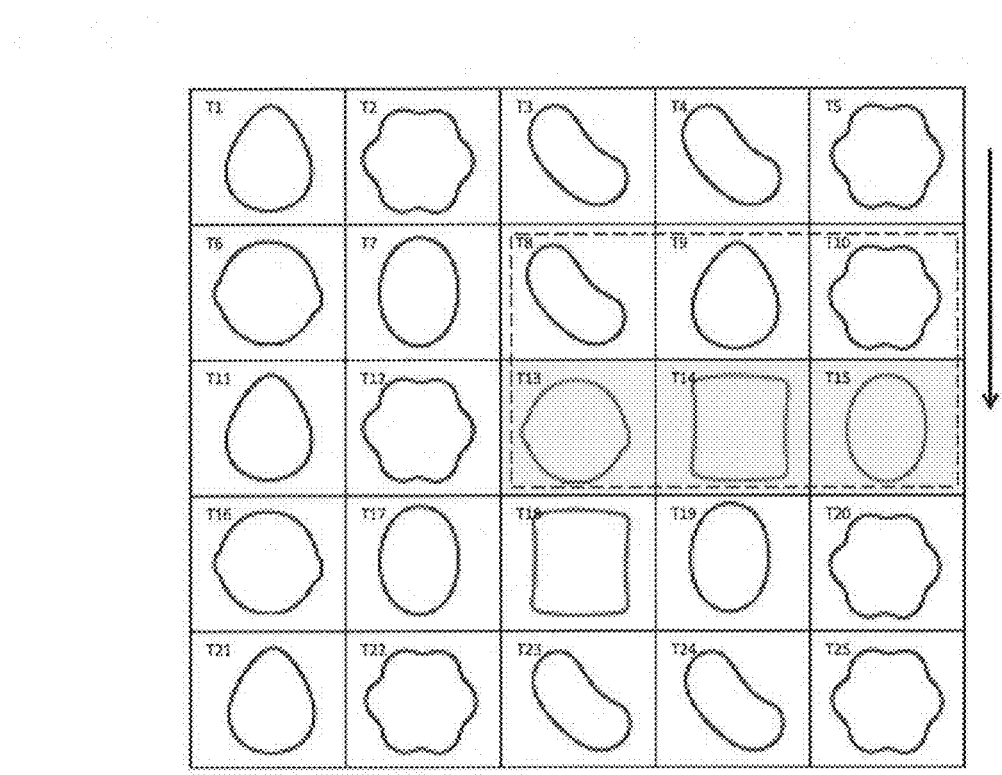

FIG. 1d shows the game board after the match-3 of kidney bean shape candies have been cleared from tiles T13, T14, and T15, and the board has been refilled from above. The six candies previously in tiles T3, T4, T5, T8, T9, and T10 have moved downwards, in the direction of the arrow, to tiles T8, T9, T10, T13, T14, and T15 respectively. The jam occupying tiles T13, T14, and T15 remains, and continues to occupy them.

FIG. 2a shows a section of the game board. The tile T13 contains a kidney bean shaped special candy, and is also occupied by the Jam. This special candy is a vertically striped candy. When it's involved in a match the result is a line blast. The line blast causes all the candies in the same column as the striped candy, to be removed from the board. Starting from the striped candy, and moving outward towards the column ends.

FIG. 2b shows the game board after the same game objects are moved as shown in FIG. 1b. The jam is spread across the tiles involved directly in the match, as shown in FIG. 1c, as well as along the entire column containing the special candy.

FIG. 2c shows the game board after the matched candies, and those involved in the line blast, are removed, and the board is refilled. The candies in tiles T4, T5, T9, and T10 move downwards into tiles T9, T10, T14 and T15 respectively, shown by the arrow 202.

Figure 3A:
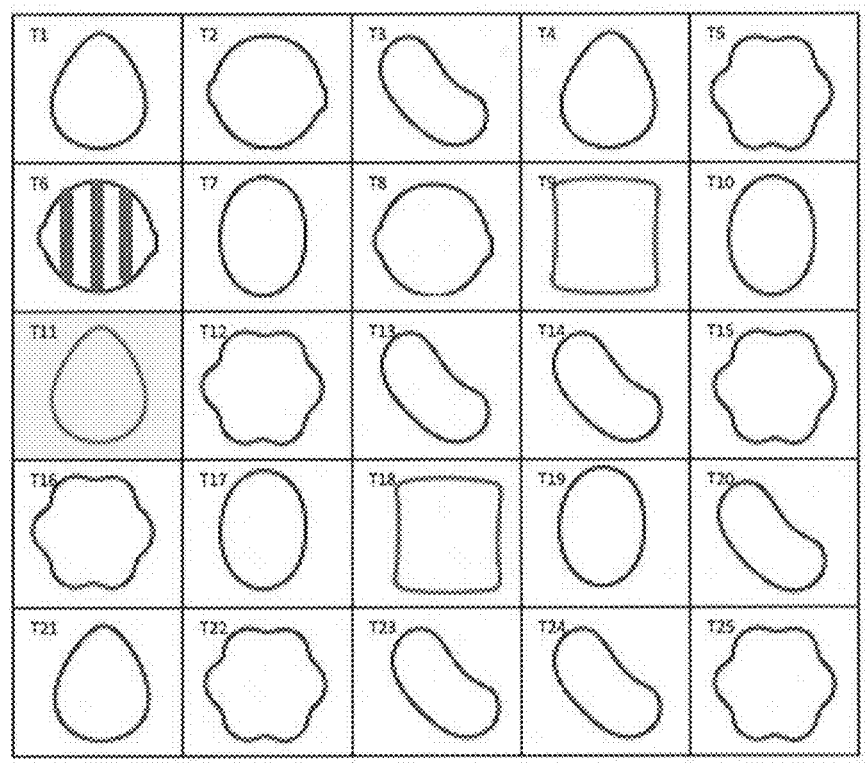

FIG. 3a shows a section of the game board. Tile T6 contains a special vertically striped spherical candy. Tile T11 contains a teardrop shaped candy and is occupied by jam.

Figure 3B:
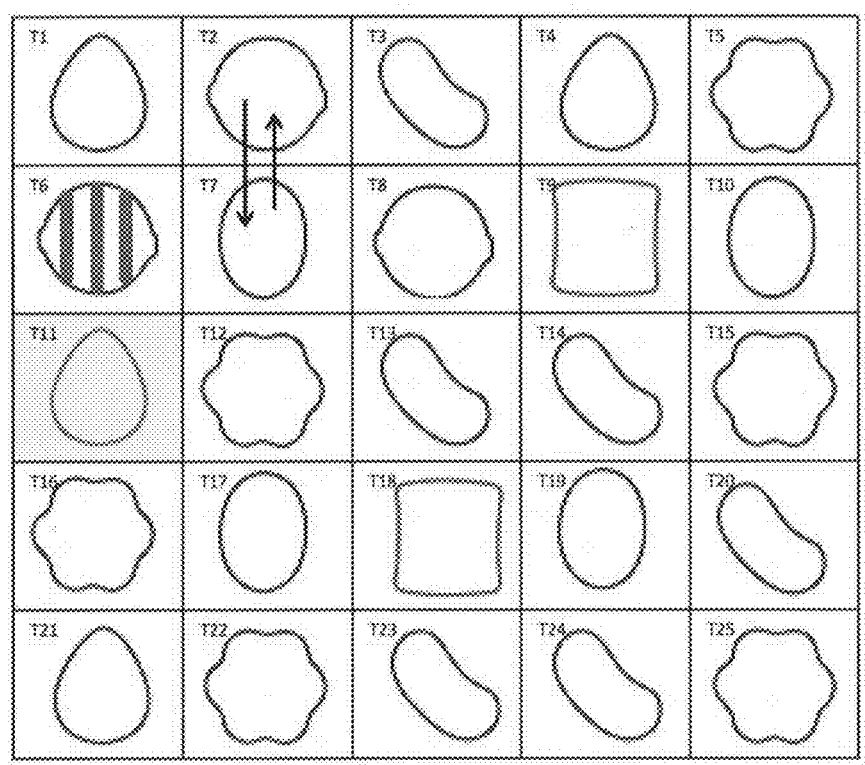

FIG. 3b shows a spherical candy in tile T2 being dragged to tile T7. This will create a match-3 in the tiles T6, T7, and T8.

Figure 3C:
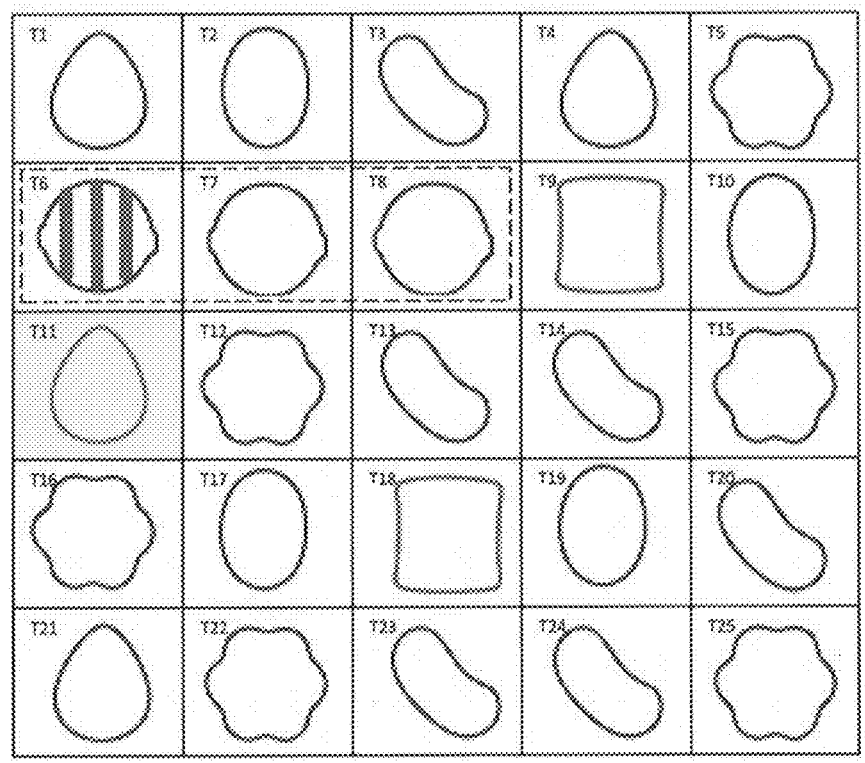

FIG. 3c shows the match-3 of tiles T6, T7 and T8 surrounded by a dashed line. The jam does not occupy any tiles involved in the match-3. It therefore does not spread to occupy these tiles.

Figure 3D:
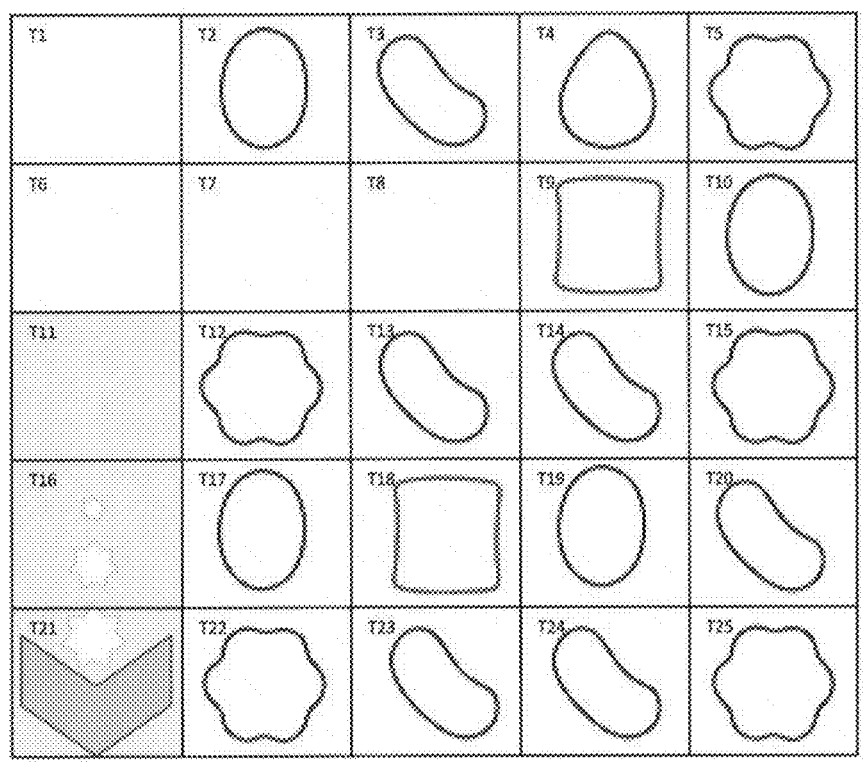

FIG. 3d shows the board after the match-3 in tiles T6, T7, and T8 has been removed from the board. The special candy in tile T6 is directly involved in the match-3, and as such causes a line blast in that column. As the line blast moves from tile T6, downwards towards tile T21, it encounters tile T11. Tile T11 is occupied by jam. The line blast spreads this jam, starting from tile T11 downwards so that it subsequently also occupies tiles T16 and T21.

Figure 3E:
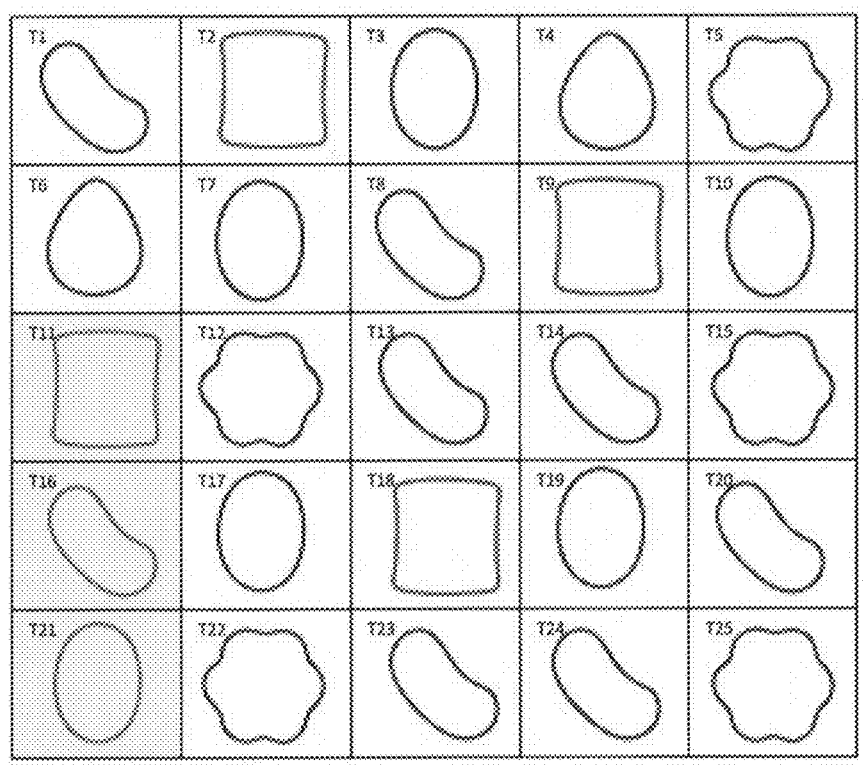

FIG. 3e shows the board after it has been refilled from above, and the candies previously in tiles T2 and T3 have moved downwards to tiles T7 and T8. The jam now in tiles T11, T16, and T21 continues to occupy those tiles.

Figure 4A:
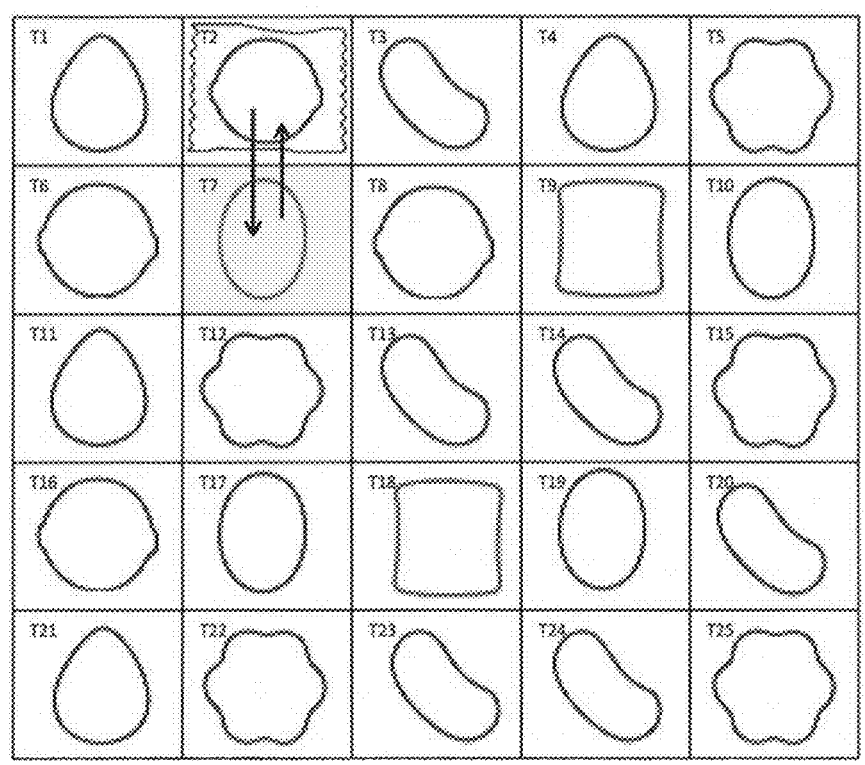

FIG. 4a shows a section of a game board. Tile T7 is occupied by jam. Tile T2 contains a special wrapped candy. Arrows indicate a move where the wrapped candy of tile T2 is dragged to tile T7.

Figure 4B:
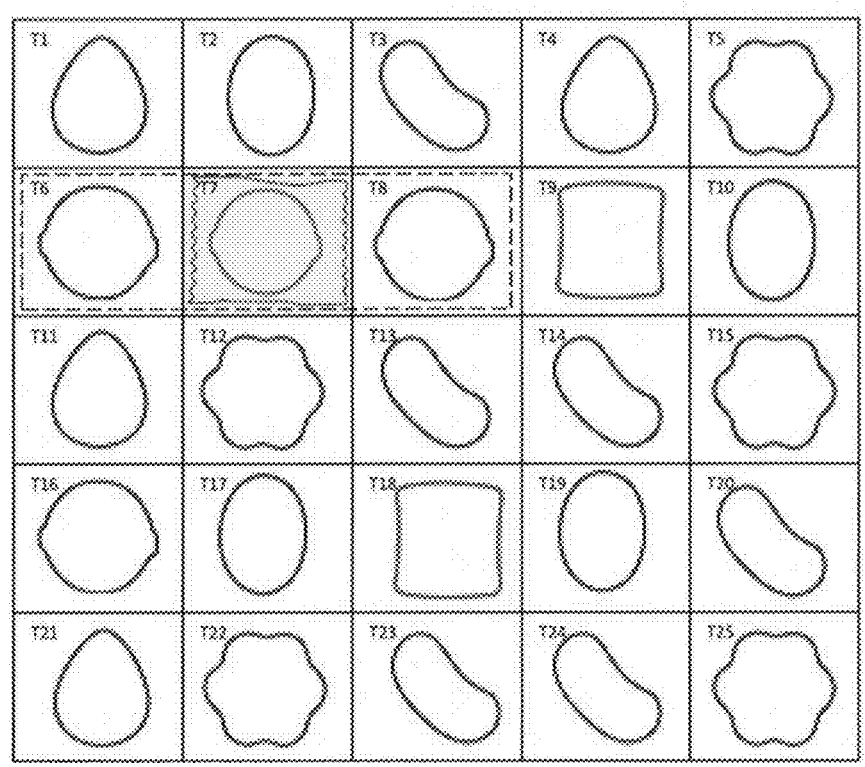

FIG. 4b shows the resulting match-3 in tiles T6, T7 and T8 surrounded by a dashed line. The wrapped candy is now in tile T7, which is also occupied by jam.

Figure 4C:
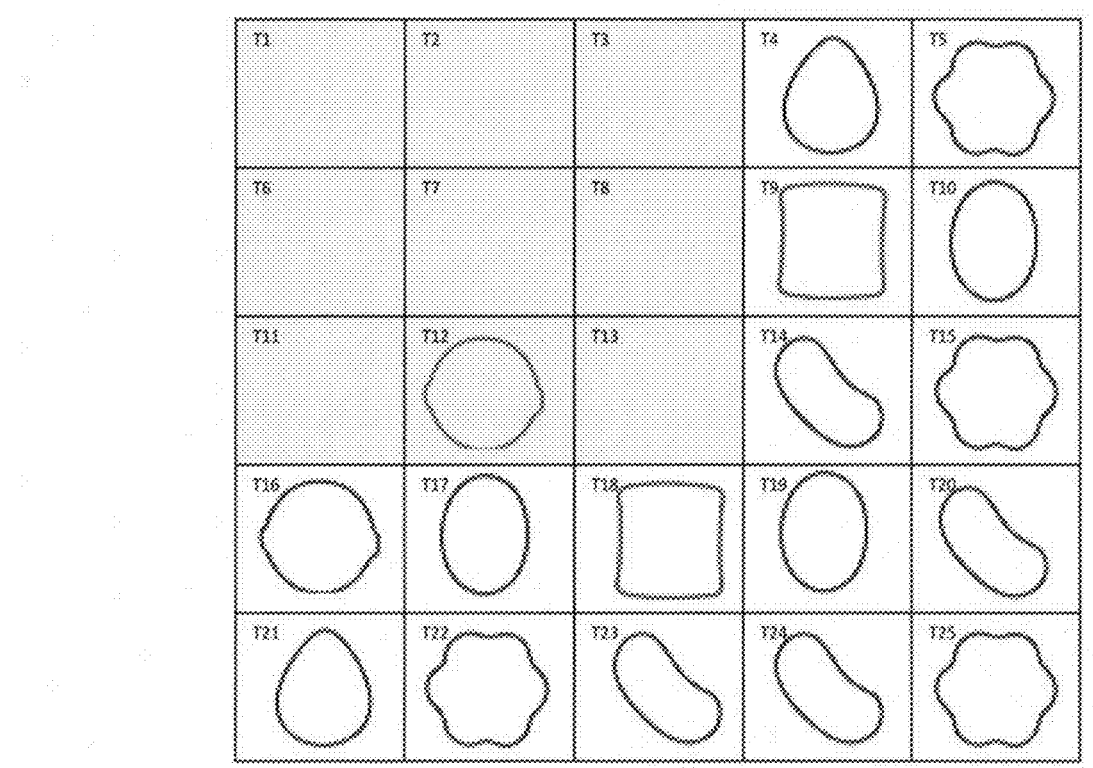

FIG. 4c shows the board after the removal of the candies directly involved in the match-3 from tiles T6, T7, and T8. As a result of the wrapped candy being directly involved in the match-3, the wrapper explodes. All the candies in the blast radius of the wrapped candy are also removed from the game board. This is a 3×3 tile area, centred on the wrapped candy. As the jam occupied the same tile as the wrapped candy upon explosion, the jam is spread to all tiles in the blast radius of the wrapper, as well as the tiles involved in the match-3. The spherical candy that was previously wrapped, remains, and moves downwards to tile T12.

Figure 4D:
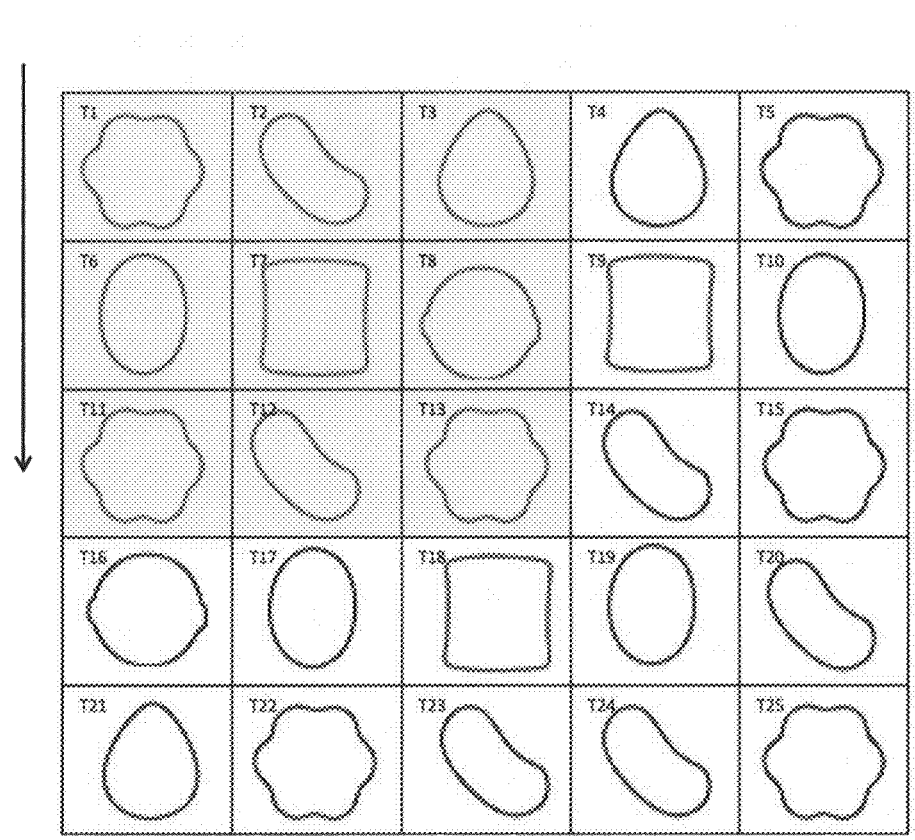

FIG. 4d shows the game board after being refilled from above, as shown by the arrow. The jam remains, and continues to occupy tiles T1, T2, T3, T6, T7, T8, T11, T12, and T13.

FIG. 5a shows a section of a game board. The board is presented to the player with a number of tiles occupied by jam. These are tiles T6, T7, T11, and T12. The objective of a level of the game may be to spread the jam by making matches, and involving special candies, until the entire game board is occupied by jam.

FIG. 5b shows the game board section with all but one tile, T15, occupied by jam. Arrows show a final move that will result in the entire game board being occupied by the jam.

FIG. 6 shows a section of the game board. Players may be required to fill a certain area of the game board with jam in order to fulfil one or all of the level objectives, and be allowed to continue on to the next. The player is presented with a number of tiles, T6, T7, T11, and T12, occupied by jam. A thick black line represents a divide, splitting the game board into two sections. Players may be asked to occupy all the tiles in the bottom left hand corner with jam in order to complete the level.

FIG. 7a shows a section of the game board. Players may be presented with a game board where two areas, comprising one or more tiles, are occupied by a different type of jam. The tiles T1, T2, T6, and T7 form one such area and are occupied by one type of jam. The tiles T19, T20, T24, and T25 are occupied by another type of jam. The jam in each starting area is differentiated between by colour. In this embodiment. However, as mentioned, any distinctive characteristics of background appearance may be utilised, some non limiting examples of which are described herein in connection with other examples.

FIG. 7b shows the game board some moves later. Making matches within each of the pre-existing areas of Jam have resulted in the Jams spreading to occupy larger areas. The jam in tiles T1, T2, T6, and T7, now occupies tiles T8, T11, T12, T13, T17, and T22 also. The jam in tiles T19, T20, T24 and T25, now occupies tiles T3, T4, T5, T9, T14, T18, and T23 as well.

FIG. 7c shows the game board some time later. Matches have been made resulting in the jam initially occupying tiles T19, T20, T24 and T25, spreading so that it now occupies all tiles of the game board, thus fulfilling a level objective.

FIG. 8a shows a section of the game board. The tiles T8, T9, T13, and T14 are occupied by one type of jam. The tiles T18, T19, T23 and T24 are occupied by another type of jam. Arrows indicate a move that will create a match-3 in tiles T9, T14 and T19.

FIG. 8b shows the match-3 outlined by a dashed line. The tiles within the dashed line are occupied by two types of jam.

Tiles T9 and T14 are occupied by one type, tile T19 is occupied by another or second type.

FIG. 8c shows the game board after the candies involved in the match-3 have been removed and the tiles refilled from above. The match-3 was created by dragging a candy into tile T19. As a result it is the type of jam occupying tile T19 that spreads to the other tiles involved in the match-3. Therefore tiles T9 and T14 are now occupied by the same type of jam in tiles T19, T18, T23, and T24 in FIGS. 8a and 8b.

FIG. 9a shows a section of the game board. Tiles T9 and T14 are occupied by one type of jam. Tiles T22, T23, and T24 are occupied by another type of jam. Arrows show a move that will result in a match-4.

FIG. 9b shows the game board after the move shown in FIG. 9a has been made. The match-4 has been outlined with a dashed line. Within the dashed line two types of jam occupy a different number of tiles. One type of jam occupies tile T24, while another type of jam occupies tiles T9 and T14. However it was tile T19 that was dragged to create the match, and this tile contains no jam.

In this situation the type of jam that is spread is the type of jam that occupies the largest number of tiles involved in the match. In this case tiles T9 and T14 were occupied by one type of jam and tile T24 was occupied by another type of jam. Therefore it is the jam occupying tiles T9 and T14 that spreads to both tiles T19 and T24.

FIG. 9c shows the game board after the candies involved in the match produce a single special stripe candy, and the board has been refilled from above. The jam occupying tiles T9 and T14 is the type that has spread to tiles T19 and T24.

FIG. 10a shows a section of the game board. Tiles T7 and T8 contain one type of jam. Tiles T15, T17, T20 and T22 contain another type of jam. A move is indicated with arrows that will create a match-3 in tiles T7, T12, and T17.

FIG. 10b shows the match-3 three created in tiles T7, T12, and T17 by the move, outlined by a dashed line. The candy dragged to create the match-3 is in tile T12, which is not occupied by jam. The other tiles involved in the match-3 are equally occupied by the two types of jam present. One occupies tile T7, the other tile T17. Therefore the most occurring type of jam involved in the match cannot be used as a criteria to spread the jam. The tie is broken by considering the total number of tiles occupied by jam on the entire game board. The jam occupying tile T17 also occupies tiles T22, T15 and T10. The jam occupying tile T7 also occupies tile T8. Therefore it is the jam occupying tile T17 will spread.

FIG. 10c shows the game board after the candies involved in the match have been removed, and the game board refilled from above. The tiles T7, T12, T17, T15, T20, and T22 are all occupied by the same type of jam. Tile T8 is the only remaining tile occupied by the other type of Jam.

In another version of the 'two colour' battle, a game objective may be to "beat" another player who is controlling the other attained background appearance or to "beat" the processor which is monitoring moves and using artificial intelligence to play against the user with the other attained background appearance.

The decision logic in such a scenario can be different to that outlined above, which looks at the number of tiles with certain characteristics. In place of that, the logic can determine that if the colour/characteristic/attained background appearance associated with the person (or AI) making a move for which a match condition is identified is comprised in the match, all the tiles of the match changes to the attained colour/characteristics of that person/AI.

In a new version of the linker word game known as Alphabetty, the attained background appearance is demonstrated as a green border.

FIG. 14a shows an edited version of the game board. The central tile T13 has an attained background rendered to the display as a thick green border around the tile. The player may be given relevant level objectives, such as "Turn all the 'QU' tiles green".

Figure 14B:
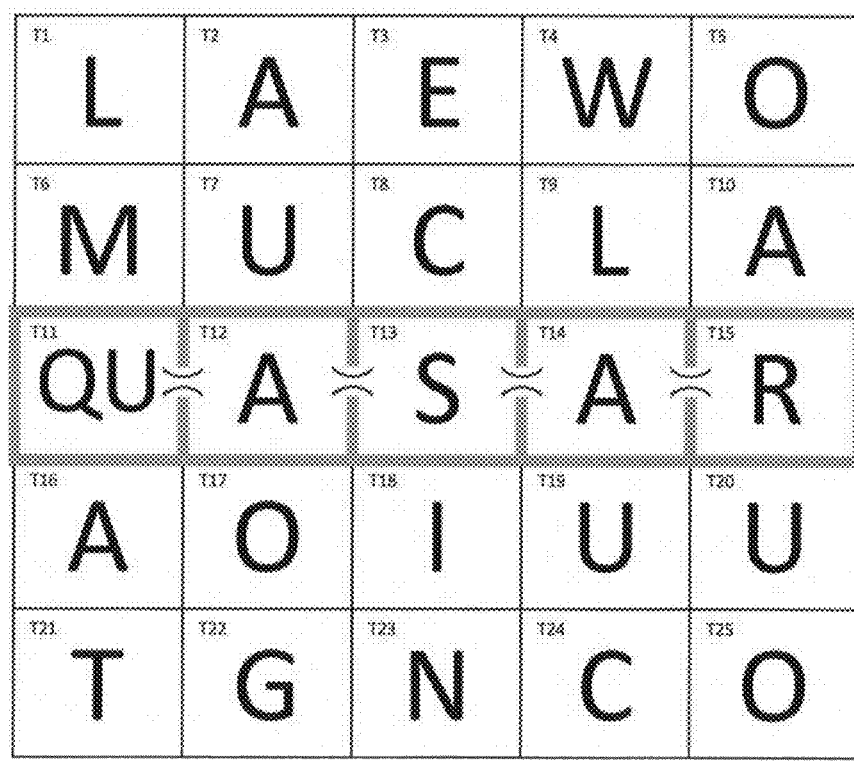

FIG. 14b shows the game board after linking letters to make the word 'QUASAR'. This includes the green background 'S' tile T13, and hence the background is attained by tiles T11, T12, T14, and T15.

Figure 14C:
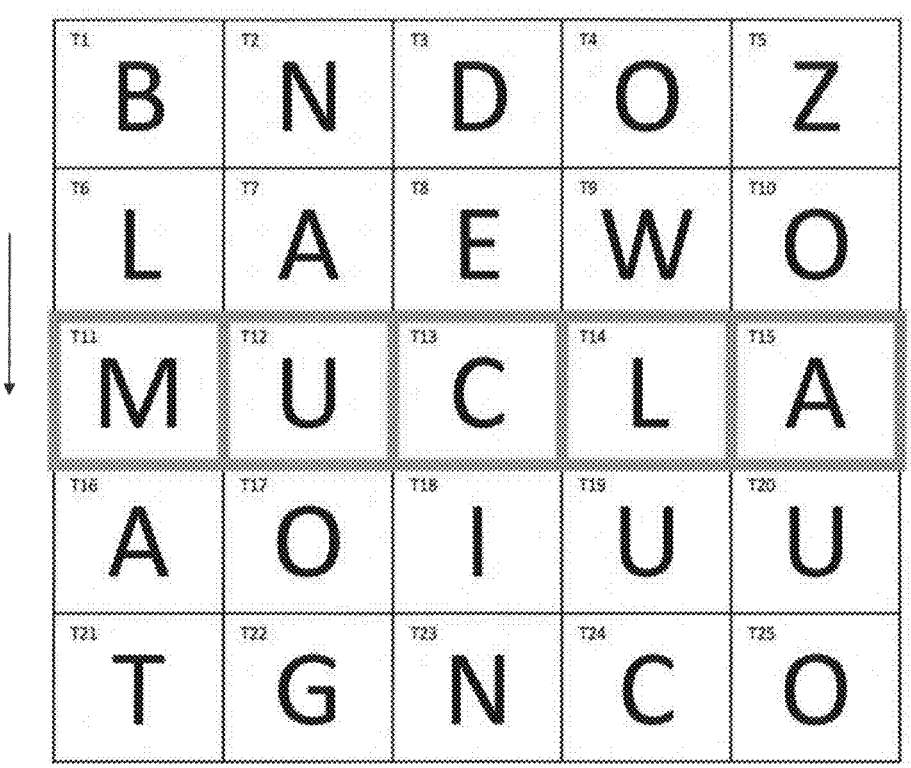

FIG. 14c shows the game board after the linked tiles have been removed. The board has then been refilled from above, as indicated by the arrow.

Figure 14D:
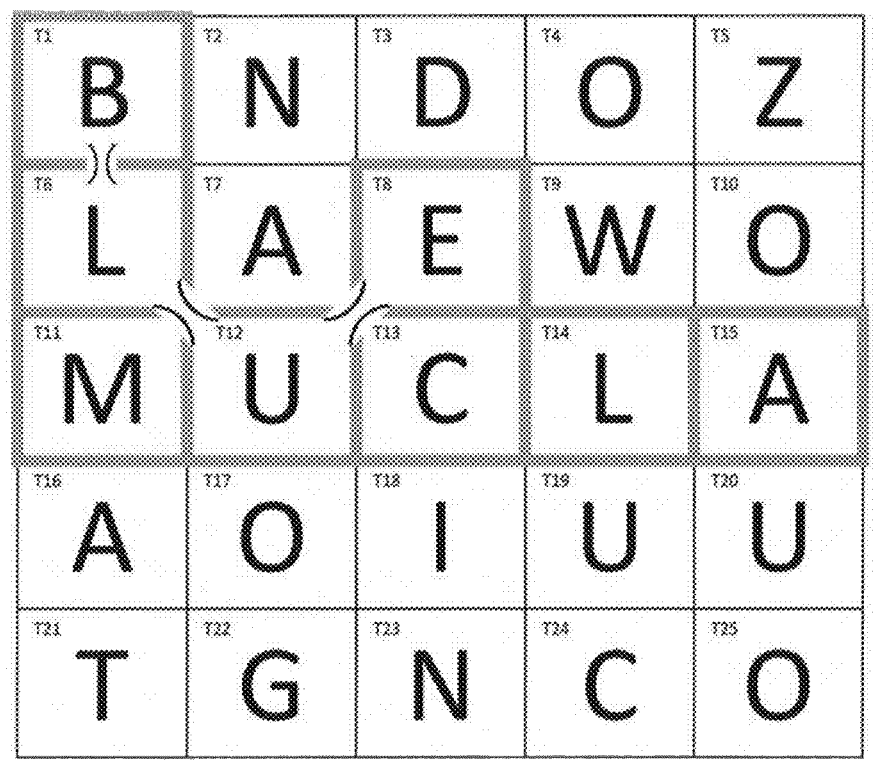

FIG. 14d shows a second word 'BLUE' formed by linking letter tiles T1, T6, T12, and T8. The 'U' tile T12 has already attained a green background. Therefore tiles T1, T6, and T12 attain a green background as a result of successfully being linked to form a word including a tile with a green background.

Figure 14E:
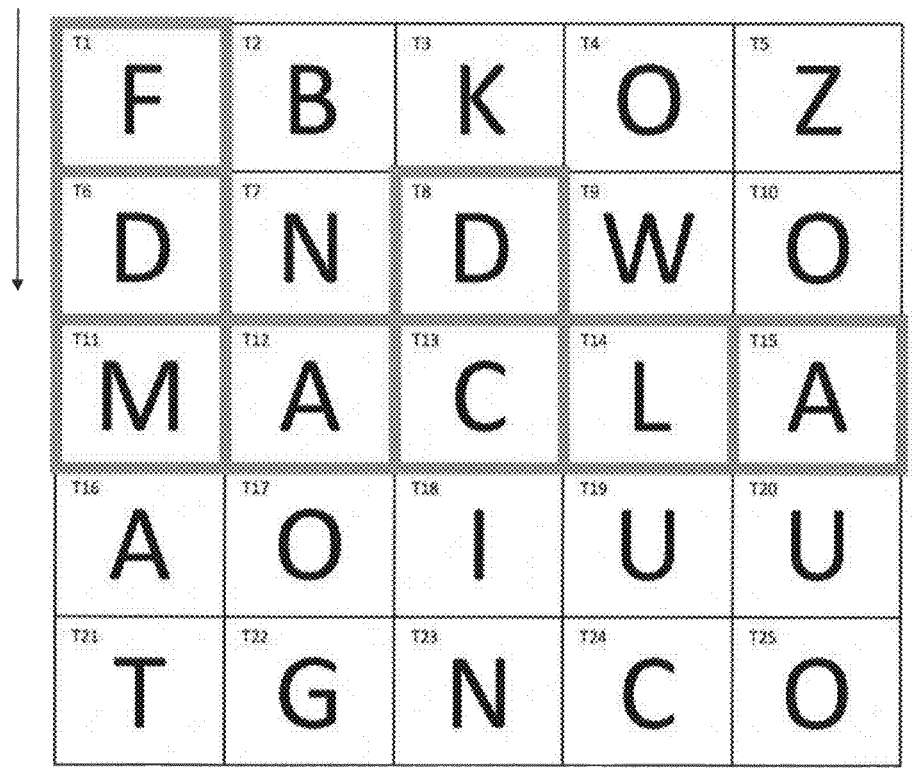

FIG. 14e shows the game board after the letters linked to form the word 'BLUE' have been removed. The game board has been refilled from above, as shown by the arrow. The tiles T1, T6, and T12 retain their background.

FIG. 15a shows an edited version of the game board. Tiles T1, T1, T3, T6, and T7 have been linked to form the word 'BLAND'. None of the tiles involved in this word have attained a green background.

FIG. 15b shows the game board after the letters successfully forming the word 'BLAND' have been removed. The word is a valid word within the rules of the game, and as such scores points and is subsequently removed from the game board. None of the tiles T1, T2, T6, T7, or T3 have attained a green background, as at least one of the tiles used to form a word must already have attained the background in order to spread it. The board has been refilled from above as indicated by the arrow.

Figure 16A:
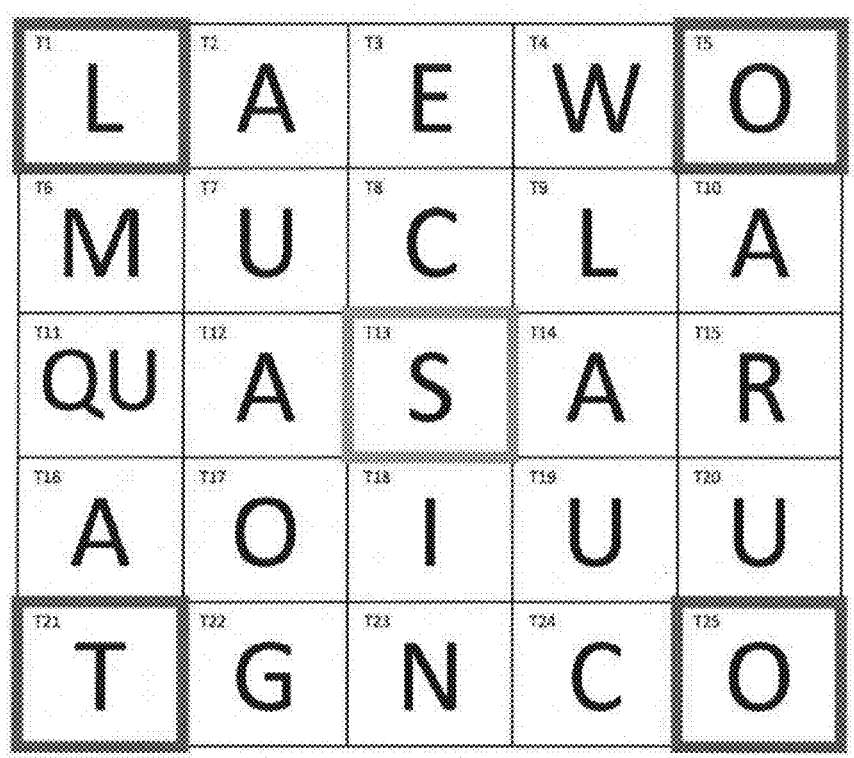

FIG. 16a shows an edited version of the game board. Tile T13 has the attained background rendered to the player as a green border around the tile. The corner tiles T1, T5, T21, and T25, have been given a different type of background, rendered to the user as a cyan border around the tile. A level objective could be presented to the player, such as: 'Link tiles to form words until all cyan tiles have turned green'.

Figure 16B:
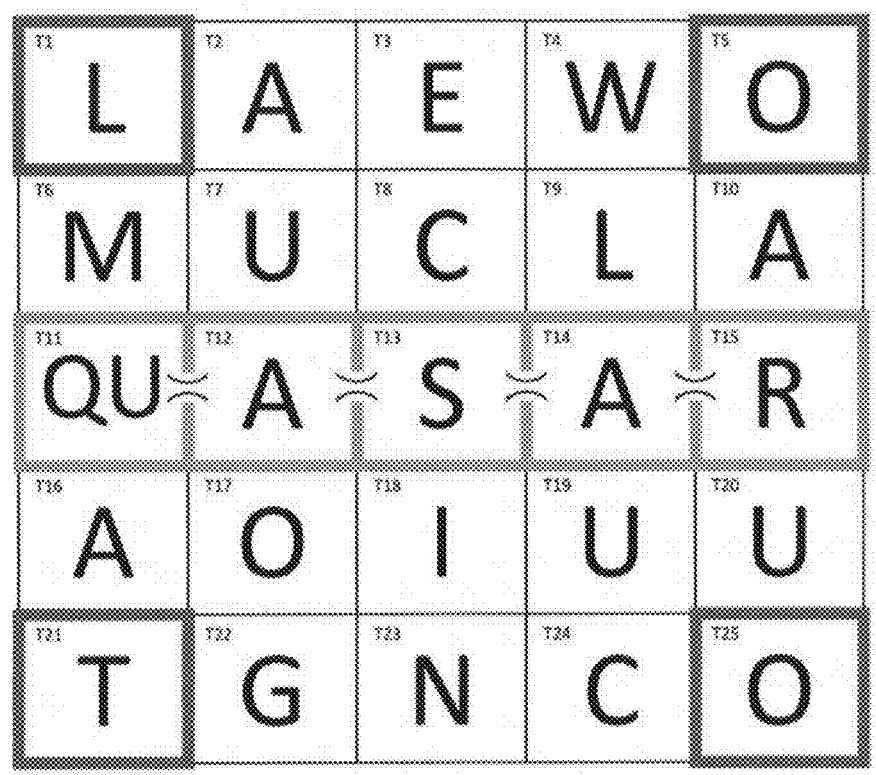
Figure 16C:
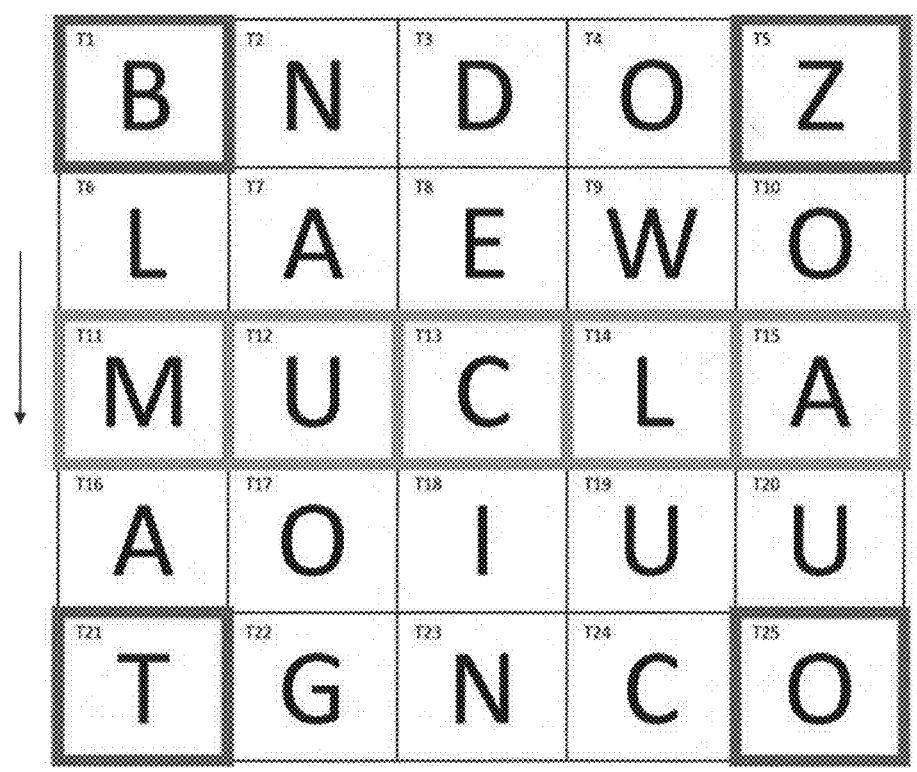

FIG. 16b shows the word 'QUASAR' being formed in tiles T11, T12, T13, T14, and T15. This causes these tiles to attain the green background as well.

FIG. 16c shows the game board after the successfully created word has been removed from the game board, and the board refilled from above. The attained background of green is retained by tiles T11, T12, T13, T14, and T15.

Figure 16D:
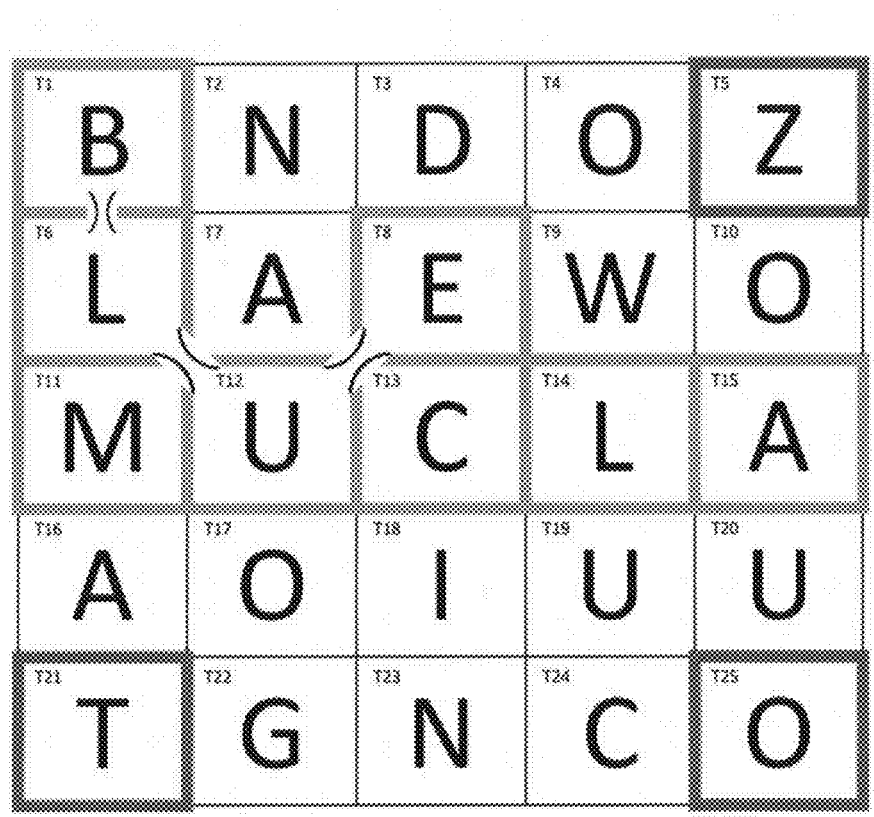

FIG. 16d shows the word 'BLUE' being formed by linking tile T1, T6, T12, and T8, as shown previously in FIG. 14d. The background is attained by these tiles as a result of the successful creation of a word where tile T12 has already attained the background. In FIG. 16c tile T1 had a cyan background. Tile T1 has now attained a green background as a result of the word 'BLUE', and the cyan background is removed. The level objective is as such ¾ complete.

Figure 16E:
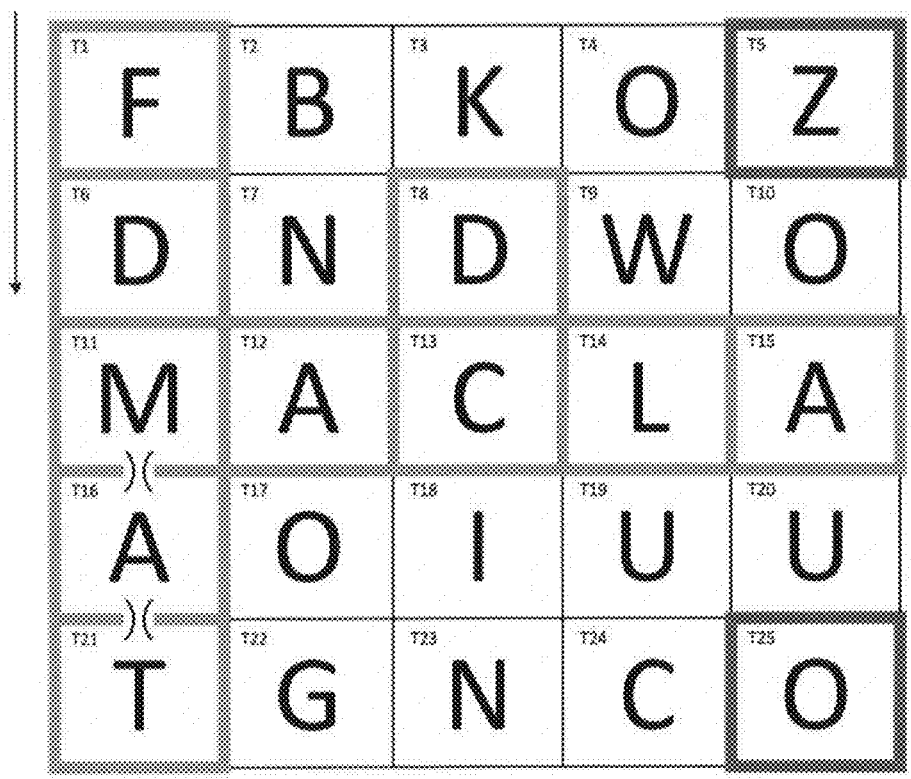

FIG. 16e shows the word 'MAT' being formed using tiles T11, T16, and T21. Tile T11 has already attained a green background. As a result of these tiles successfully creating a word, tiles T16 and T21 have now attain the green background as well. Tile T21 previously had a cyan background, which has now been removed as described for tile T1 in FIG. 16d. The level objective is now ½ complete.

FIG. 17a shows an edited version of the game board. Tile T13 has the attained background rendered to the player as a green border around the tile. Tile T12 contains a special tile. The tile T12 contains a double ended arrow 402 below an 'A'. This indicates that any word formed using this tile T12 will result in a line blast, clearing all the tiles in the same column as tile T12.

FIG. 17b shows the word 'QUASAR' being formed, with the green background being attained by all tiles involved, T11, T12, T13, T14, and T15, therefore including the special 2-way lineblast tile T12.

FIG. 17c shows the game board after the tiles of the word 'QUASAR' have been removed, and the board is refilled from above. The lineblast from the special tile previously at tile T12 has resulted in the green background being attained by all the tiles in the same column as tile T12: tiles T2, T7, T17, and T22. The tiles in the lineblast have also been removed and refilled from above.

FIG. 18a shows an edited version of the game board. The tile T13 has attained a green background. Tile T12 contains a crossed pair of double ended arrows 502 signifying a special 4-way lineblast 'A' tile. Making a word using this tile will result in a diagonal line blast in all 4 directions radially from the 'A' tile T2.

FIG. 18b shows the word 'QUASAR' being formed as shown previously, each tile involved having attained the green background. This includes the special tile T12, a diagonal 4-way lineblast.

FIG. 18c shows the game board after the tiles of the word 'QUASAR' have been removed, and the board is refilled from above. The tiles T4, T6, T8, T16, T18, and T24 involved in the diagonal 4-way lineblast have been removed, refilled from above, but have retained the green background spread from tile T12.

FIG. 19a show an edited version of the game board. The word 'QUASAR' has been formed as shown previously, each tile involved having attained the green background. T15, containing the 'R' at the end of the word 'QUASAR', is a special 'crown' 602 'R' tile. If used to make a word a 'crown' tile will result in a randomly selected tile on the game board attaining the green background.

FIG. 19b shows the resulting randomly selected tile T3 having attained the green background. As described previously, the tiles of the word 'QUASAR' have been removed, and the board refilled from above.

'Beached Buddies'

Another match 3 switcher game described herein has game objects represent sea creatures, where the standard background appearance is round and the attained background is water.

The game objects can be moved by clicking and holding on the object, and then dragging it in any of the 4 directions within the x-y plane of the board (up, down, left or right). The object will only move if by moving it in the selected direction, it will make a group of at least 3 matching objects in a combo, containing either itself or the object adjacent to it in the selected direction. The game board contains game objects in the form of marine animals distributed in a grid formation. The background of the tiles in which they sit are of either 'water' or 'ground' type. The water type is an 'attained background' and thus can be spread to other tiles by making matches.

When placed on a water tile the animals chosen to represent the different game objects have happy/excited facial expressions. This is representative of these animals typically considered to be water loving creatures; a frog, a starfish, an octopus, a whale, and a duck. When on ground tiles, the animals of the game objects have a sad/deflated appearance. Each animal has a colour, and it is the colour and animal type which is the quality upon which a match is decided, not the specific image representation or tile type upon which the animal is positioned. For example a match can contain both 'sad' and 'happy' animals. The type of tile, i.e. ground or water, affects only the result of a match. For example, a match-3 completely on ground tiles results in the disappearance of the matched animals, and the refilling of the board from above. A match-3 on tiles where one or all of them are water tiles, results in any ground tiles under the animals directly involved in the match, turning into water tiles. The matched animals disappear, as they did on the ground tiles, and the game board refills from above, but the tiles upon which the match was made are now, and remain to be, water tiles.

FIG. 20 shows the game objects for 'Beached Buddies'. When placed on a water tile, T1-T5, the animals chosen to represent the different game objects have happy/excited facial expressions. When on ground tiles, T6-T10, the animals of the game objects have a sad/deflated appearance.

FIG. 21a shows an edited version of the game board as it will be rendered to a user on the display of his computer device. The board has been reduced to 5×5 grid for illustrative purposes. Each tile of the board contains a reference letter T, followed by a reference number from 1 to 25. The board has been filled with game objects in the form of marine animals, and the tiles in which they sit are of either 'water' or 'ground' type. Arrows indicate a move that will create a match-3.

FIG. 21b shows the game board after the frog in tile T8 has been dragged to the right and into tile T9, swapping places with the octopus originally in tile T9. The match-3 in tiles T3, T8, and T13 is outlined with a dashed line. The 3 tiles on which the match is made are all ground tiles, and no water tiles.

FIG. 21c shows the board after the match-3 has disappeared. There were no water tiles involved in the match, and therefore no water was spread. The match disappears, and the board is refilled from above, as shown by the arrow.

FIG. 22a show an edited version of the game board. Arrows show a move that will result in a match-3.

FIG. 22b shows the game board after the frog in tile T8 has been dragged downwards into tile T13, swapping places with an octopus which has moved from tile T13 to T8. This has resulted in the match-3, outlined by a dashed line, in tiles T13, T18, and T23. Tiles T13 and T23 are ground tiles, but tile T18 is a water tile. The water tile is denoted by a blue colour around the game object (marine animal), and indicated by the appearance of the game object. Specifically a marine animal of a 'happy' demeanour. The match is still a match, regardless of the different types of attained background it's tiles have, or whether the game objects are 'happy' or 'sad', they are the same marine animal and the same colour.

FIG. 22c shows the game board after the move in FIG. 22a has been made. As tile T18 was a water tile, and directly involved in the match, water spreads to the other tiles directly involved in the match. Tiles T13 and T23 are now water tiles. As a consequence the tiles are now blue in colour, and the frogs in T13 and T23 are now 'happy' frogs.

As previously shown in FIGS. 21b and 21c, the matched game objects are removed from the board, and the spaces refilled by adding game objects to the board from above (the positive y direction in the plane of the game board).

Figure 23A:
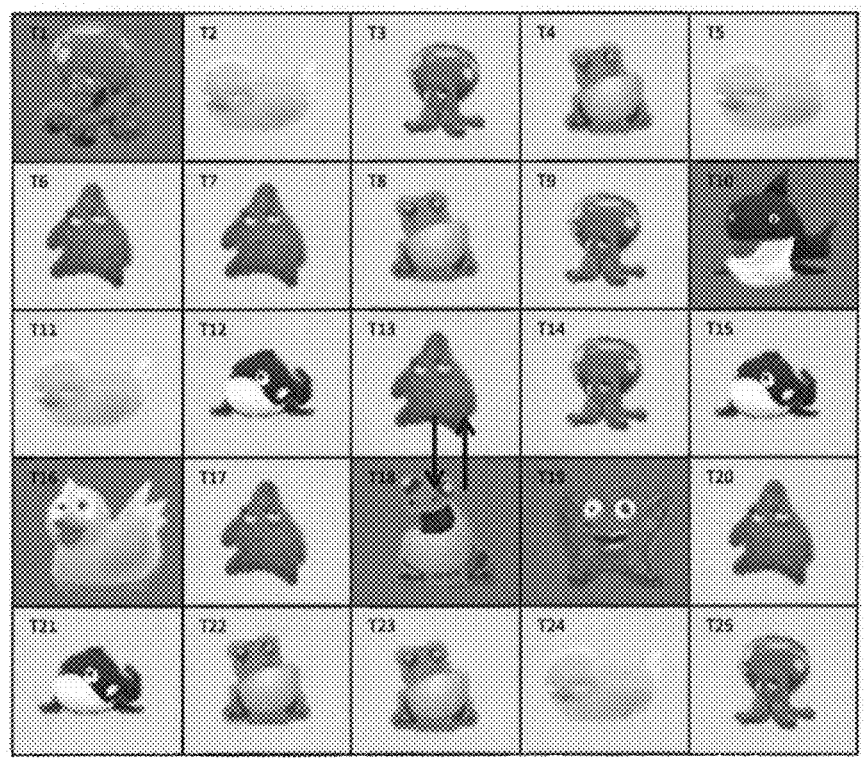

FIG. 23a shows an edited version of the game board. Arrows indicate a move that will create a 4-combo match.

The starfish in tile T13 will be dragged downwards into tile T18, swapping places with the frog currently in tile T18. In this situation the starfish is currently on a ground tile, but will be moved to a water tile. The frog will move from a water tile to a ground tile. The marine animal and its associated colour will remain the same, however the 'sad' starfish will become 'happy' on moving into the water, and the 'happy' frog will become 'sad' on moving onto the ground.

Figure 23B:
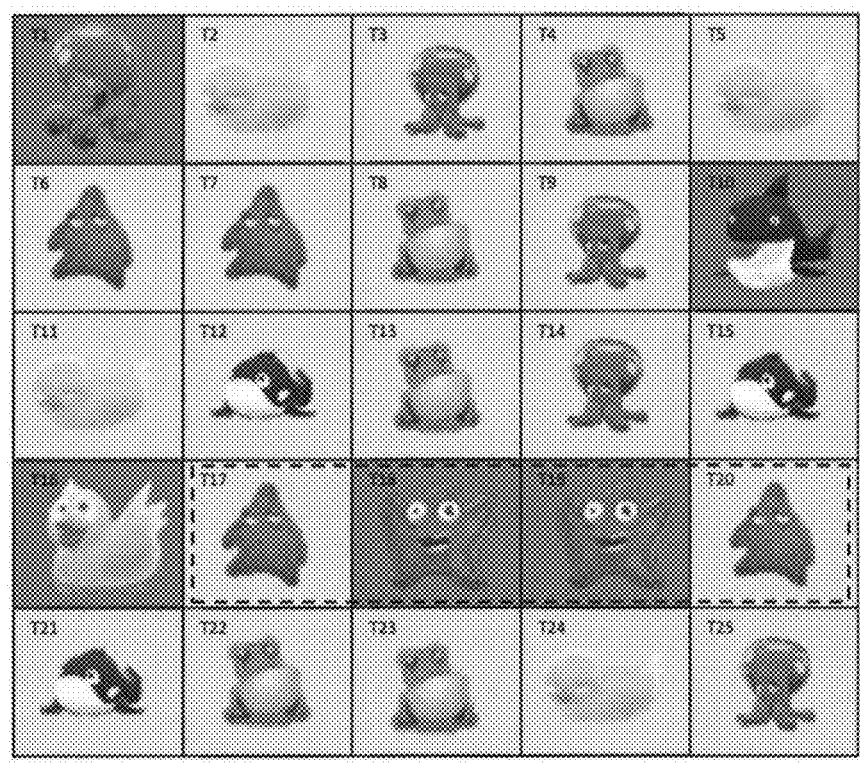

FIG. 23b shows the match created in tile T17, T18, T19, and T20 outlined with a dashed line. This 4-combo lies across two tiles having attained backgrounds of water, T18 and T19, and two ground tiles T17 and T20. The expressions of the marine animal game objects are in keeping with the tile backgrounds they are illustrated as still occupying.

Figure 23C:
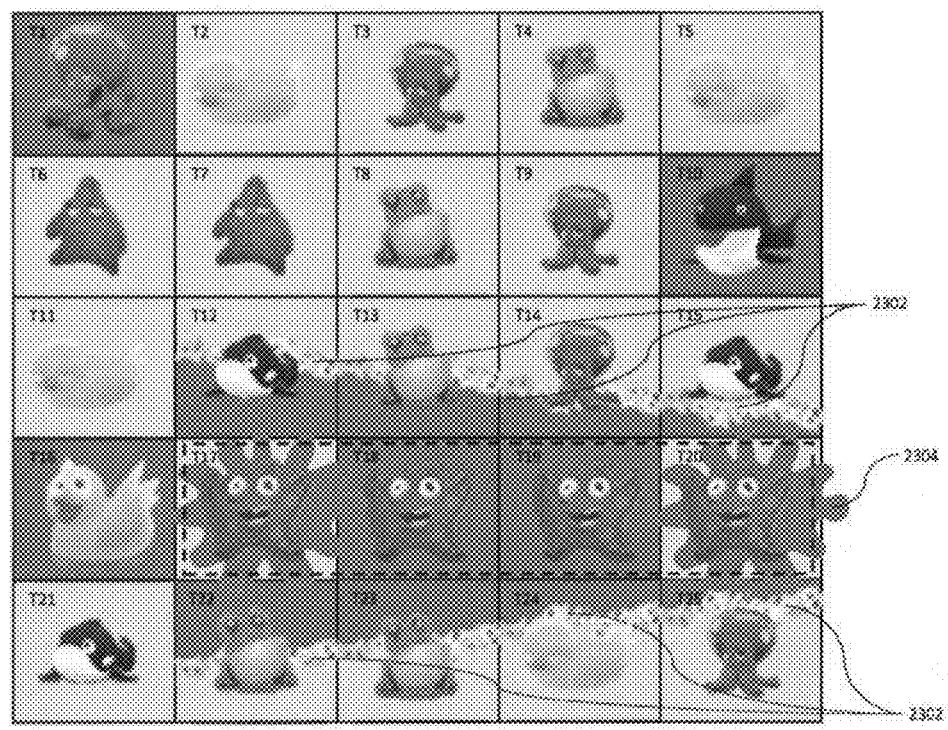

FIG. 23c shows the result of the 4-combo match being made. The two ground tiles within the 4-combo, T17 and T20, attain the background of water, with a splash 2304 around the marine animal game object, and a change of the animals expression from 'sad' to 'happy'. The 4-combo also results in tidal waves, 2302. The tidal waves emanate from the lateral sides of the 4-combo. Each tile-width wave travels outwards, along the columns perpendicular to the 4-combo, until it reaches the next ground tile or the edge of the game board. The tidal waves are emitted from all tiles in the 4-combo, whether they have attained the water background or not. In this example, all the tidal waves meet a ground tile immediately.

Figure 23D:
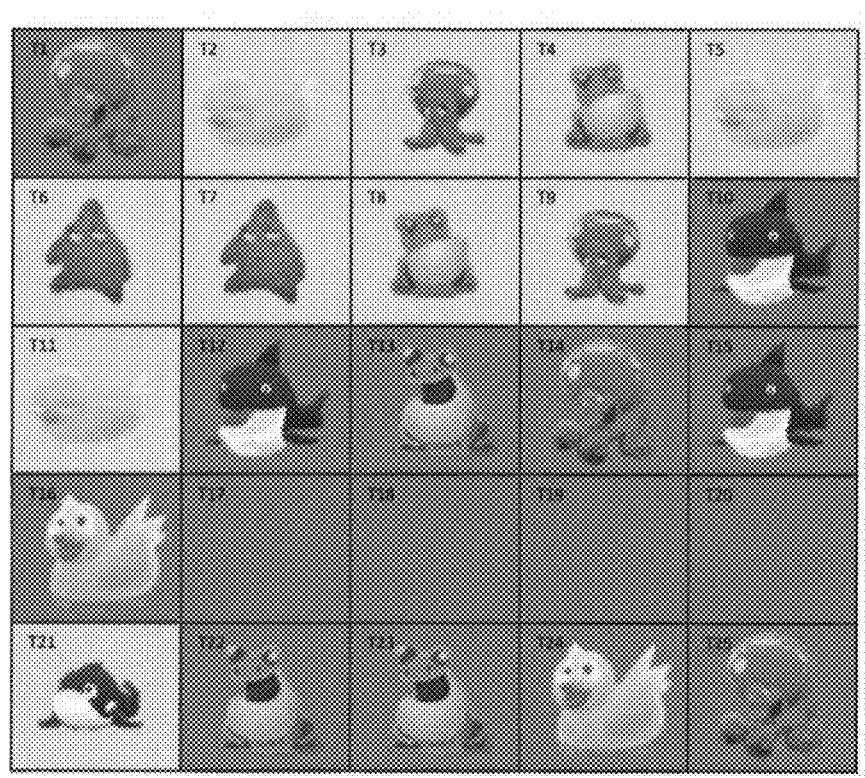

FIG. 23d shows the game board after the tidal waves have met the first ground tile in their paths, T12, T13, T14, T15, T22, T23, T24, and T25, and caused each to attain a background of water. The marine animal game objects in these tiles have subsequently changed from having a 'sad' expression to a 'happy' expression. The 4 marine animal game objects directly involved in the 4-combo have been removed from tiles T17, T18, T19, and T20.

Figure 23E:
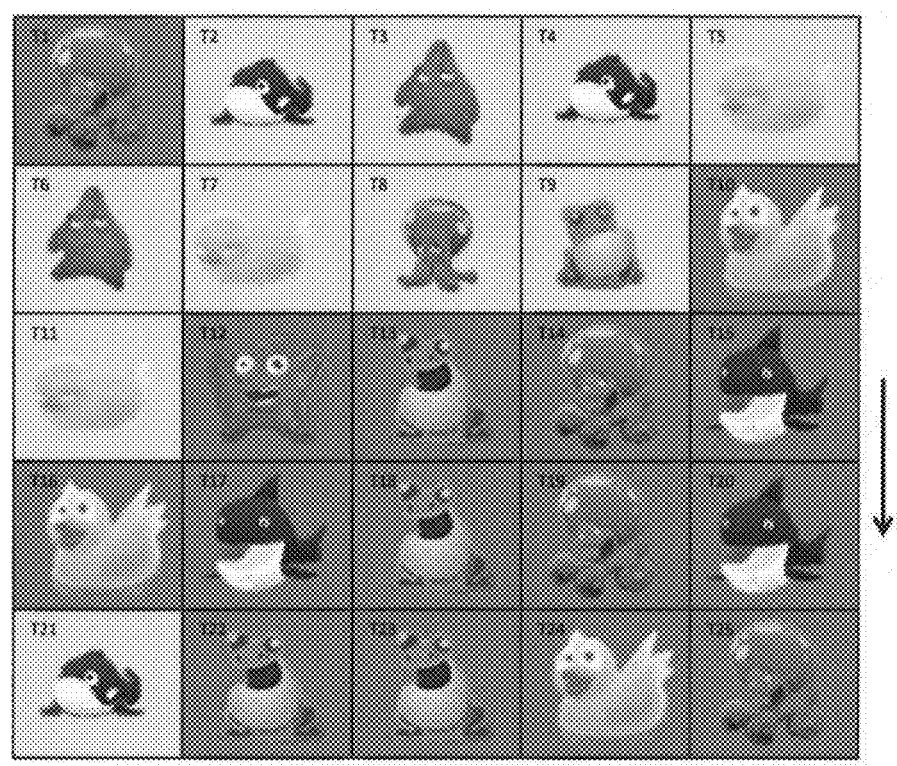

FIG. 23e shows the game board having been refilled from above, as shown by the arrow. The marine animal game objects have moved down to fill the empty tiles shown in FIG. 23d, and new tiles have entered the top tiles in the respective columns. As a result of this, the animals in tiles T5, T7, T8, and T9, move from a ground tile to a tile which has an attained background of water. Subsequently their expression has changed from 'sad' to 'happy'.

Figure 24A:
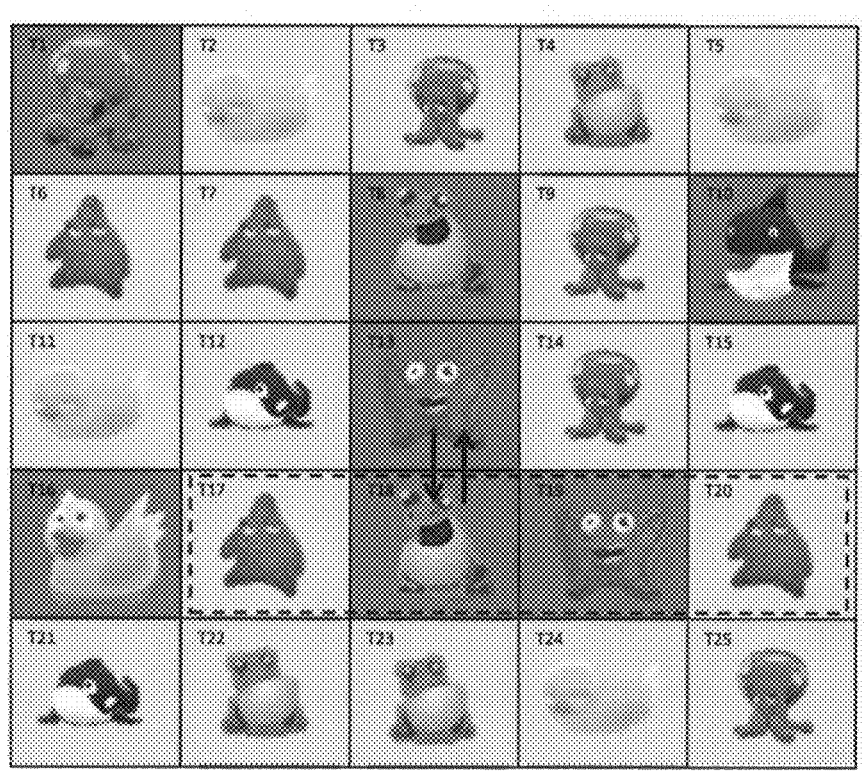

FIG. 24a shows the same game board as shown in FIG. 23a. However, tiles T13 and T8 have already attained a water background, and contain 'happy' animals. The same move in tiles T13 and T18 is shown as in FIG. 23a, and the position of the resulting 4-combo is shown outlined by a dashed line.

Figure 24B:
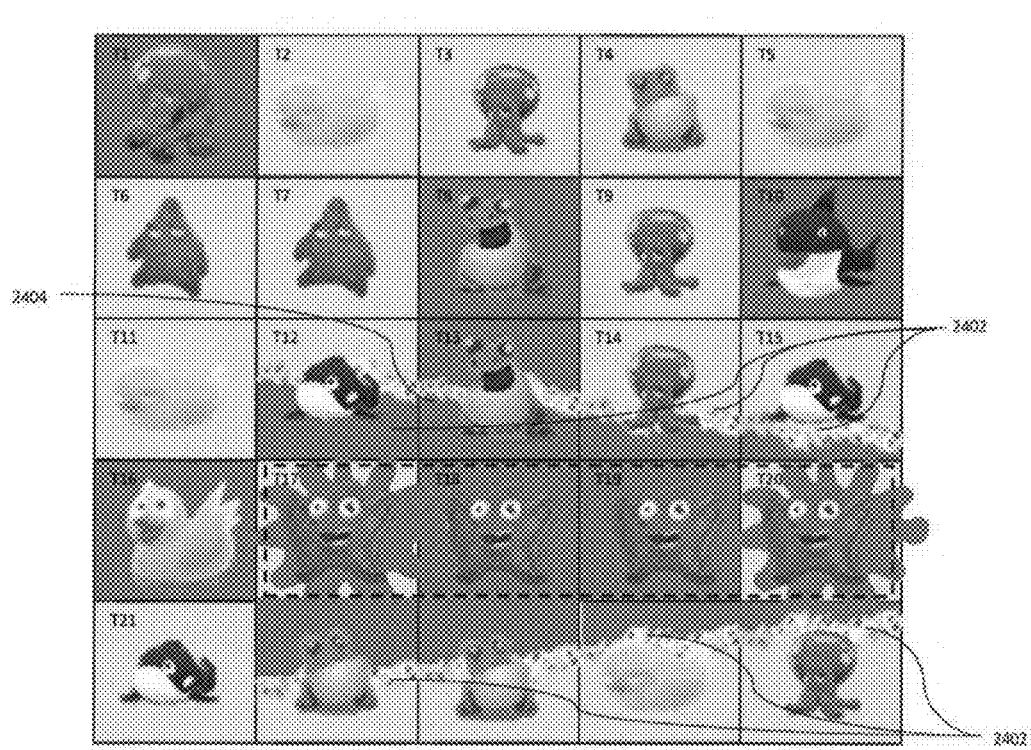

FIG. 24b shows the resulting tidal waves, 2402, reaching the nearest ground tile in their perpendicular columns. However, as tile T13 had already attained a water background, the wave does not stop here in this column.

Figure 24C:
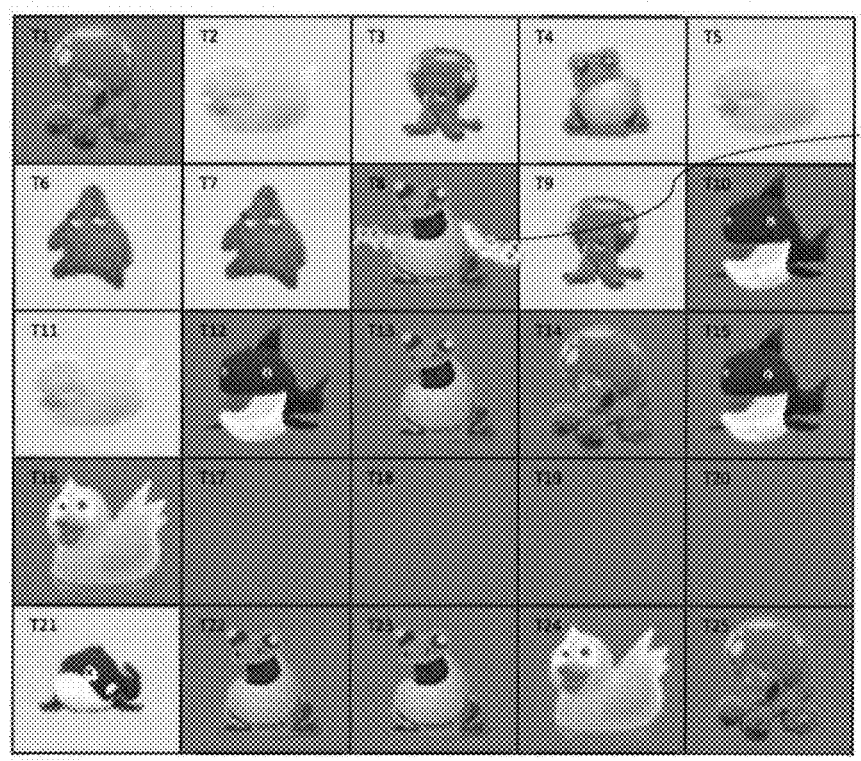

FIG. 24c shows the game board after the tidal waves have reached their neighbouring tiles. All but one of these (T13) are ground tiles, and as such the tidal wave does not go onto the next tile in the column, but causes these tiles (T12, T14, T15, T22, T23, T24, and T25) to attain a water background. Subsequently the animals occupying these tiles have 'happy' expressions. The tidal wave in tile T13 2404 travels on to the next tile T8. This tile had also already attained a water background, and therefore the tidal wave does not stop here either.

Figure 24D:
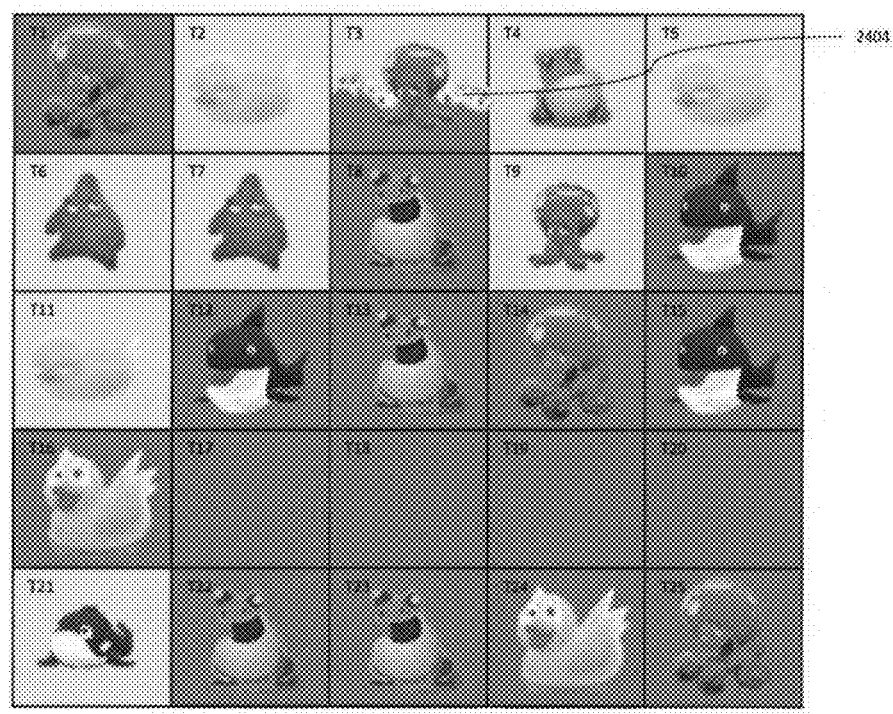

FIG. 24d shows the game board after the tidal wave 2404 reaches tile T3. Tile T3 is a ground tile, occupied by a 'sad' octopus.

Figure 24E:
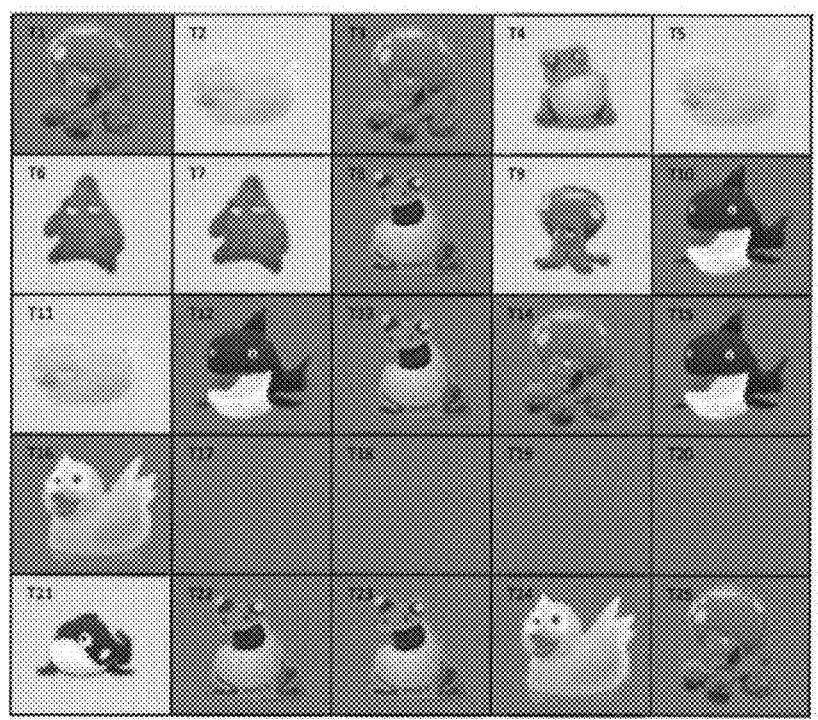

FIG. 24e shows the game board after the tidal wave has reached tile T3, and enabled it to attain a water background. The 'sad' octopus is now 'happy'.

Figure 24F:
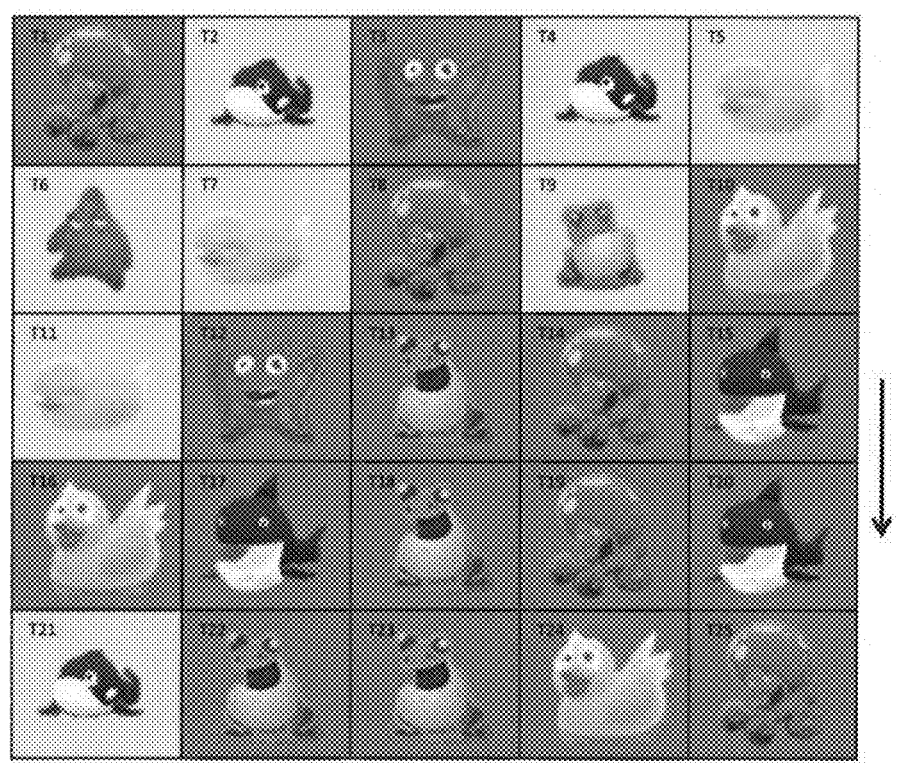

FIG. 24f shows the game board having been refilled from above, to fill tiles T17, T18, T19, and T20. The direction of which is indicated by the arrow at the right-hand side of the figure. The marine animal game objects from ground tiles T7, T9, and T5, have moved to water tiles, T12, T14, and T10, and subsequently the expressions of the animals have changed from 'sad' to 'happy'.

Figure 25A:
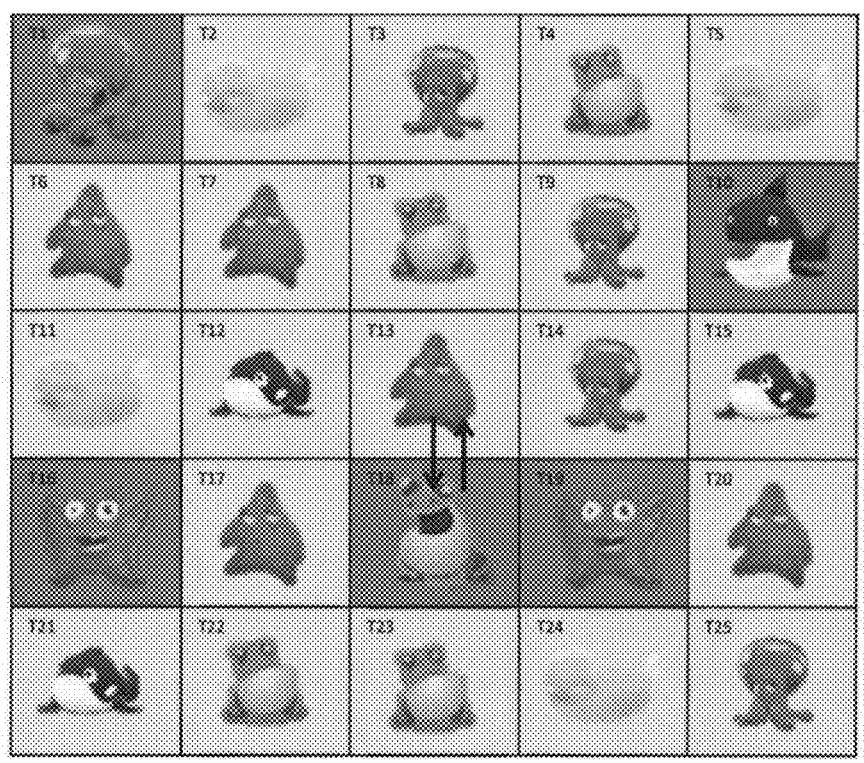

FIG. 25a shows an edited version of the game board. A move is indicated by two arrows that will create a 5-combo match in tiles T16, T17, T18, T19, and T20. This is the same move as shown in FIG. 23a, though now tile T16 is instead occupied by a starfish. The 5-combo is a match across tiles including at least one which has an already attained background of water, and thus incurs the consequential water spreading result.

Figure 25B:
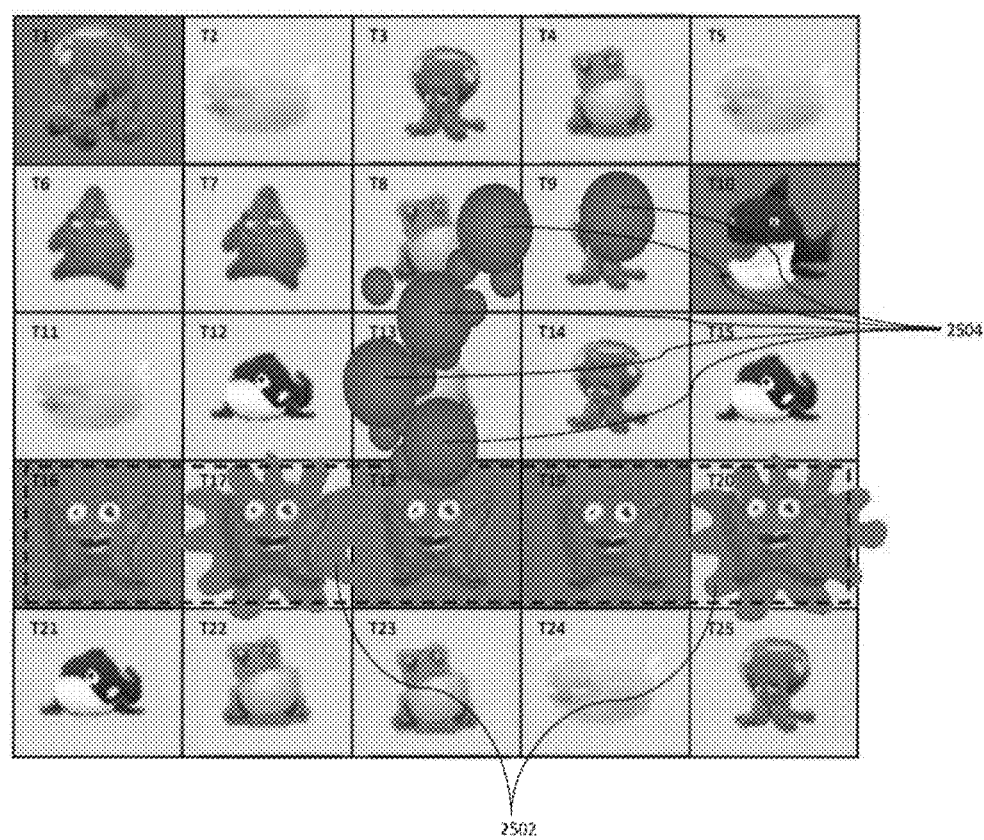

FIG. 25b shows the immediate result of the 5-combo match. Tiles T17 and T20 attain a water background, and the expressions of the starfish occupying them change from 'sad' to 'happy'. A splash 2502 marks the transition from ground to water tile. Five large water droplets 2504 are released as a water fountain from the tile T18 in the centre of the 5-combo. The centre tile in relation to the 5-combo is where the water fountain appears from. This is always the case, regardless of the respective position of the marine animal game object that was moved to complete the 5-combo.

Figure 25C:
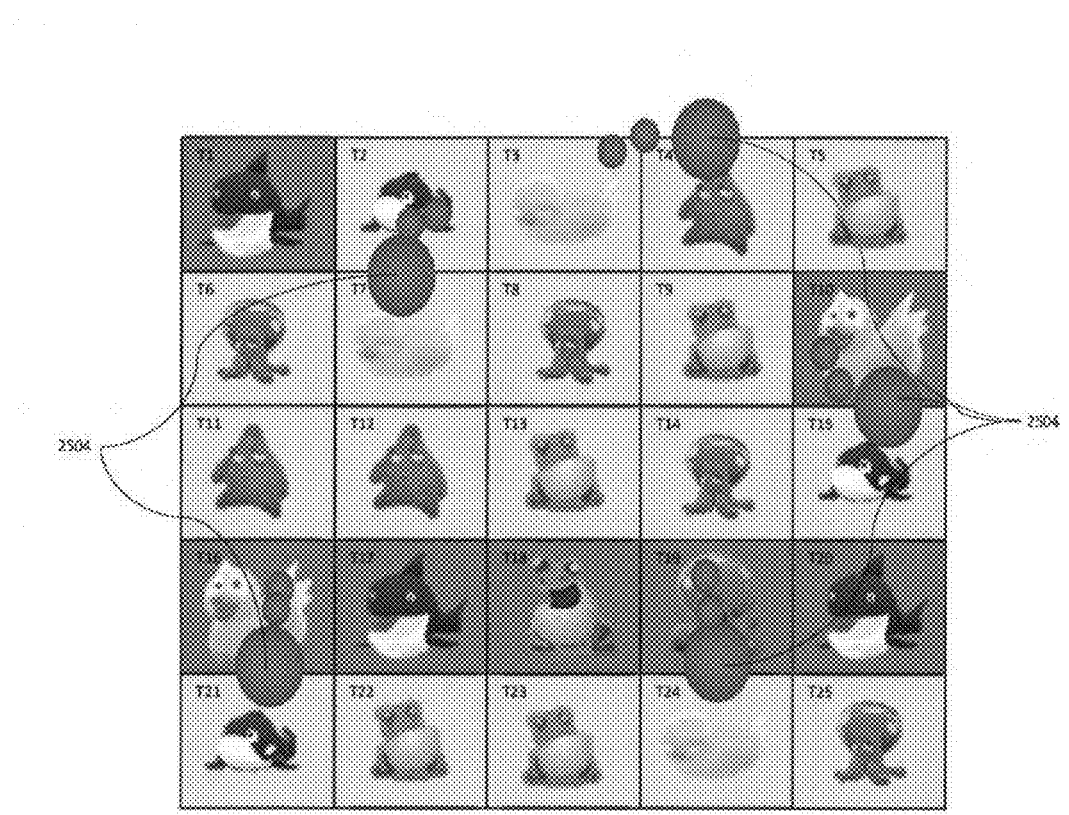

FIG. 25c shows the game board after the game objects in the 5-combo match have been removed from the board, and the spaces refilled from above. The resulting five large water droplets 2504 from the water fountain have spread out across the game board. Each droplet moves towards a random remaining ground tile. If less than 5 ground tiles remain, water tiles are selected as targets instead. Any remaining ground tiles will be prioritised as targets before any water tiles.

Figure 25D:
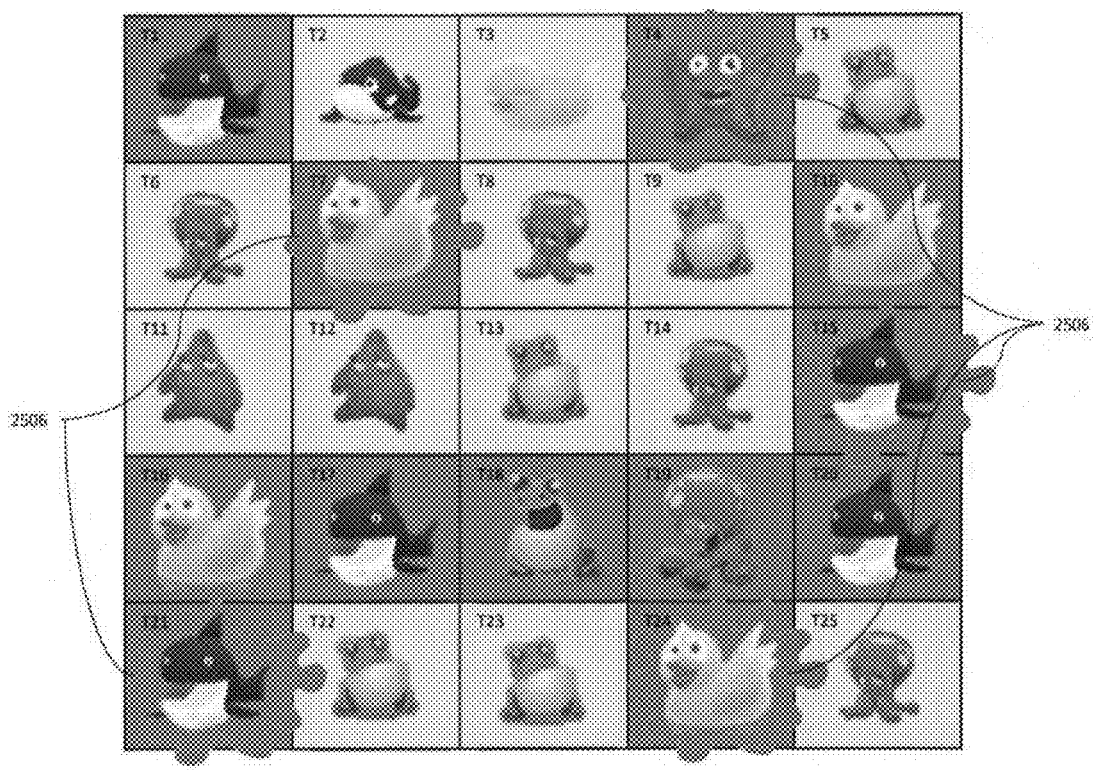

FIG. 25d shows the result of the five large water droplets landing on five respective ground tiles T4, T7, T15, T21, and T24. The droplets create a splash 2506 which signifies these ground tiles attaining a water background.

Figure 25E:
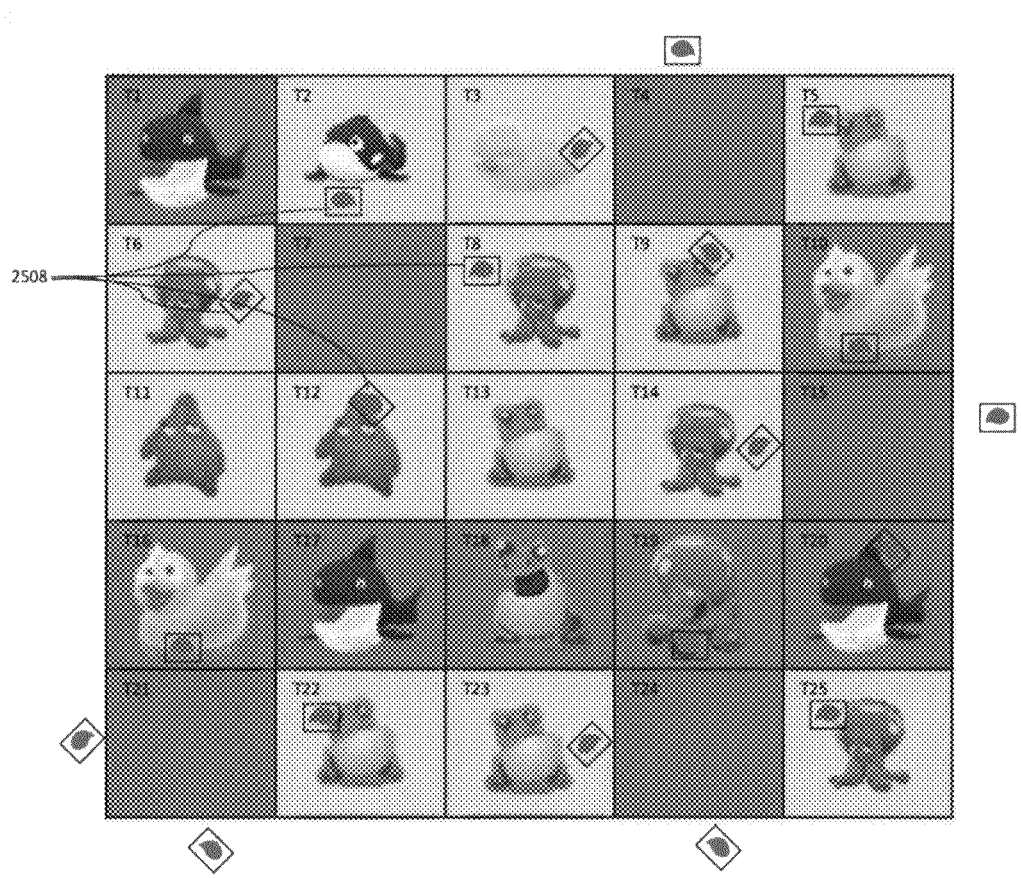

FIG. 25e shows the game board after the marine animal game objects in the tiles splashed by the large water droplets have been removed. The splashes 2506 resulting from the large water droplets 2504 also splash the four tiles adjacent to the tile on which they occur. This is illustrated in the figure by small water droplets 2508 within the adjacent tiles. For example, the large droplet landing on tile T7 has resulted in the splashing of adjacent tiles T2, T6, T8, and T12. Equivalents of the small droplets 2508 can also be seen adjacent to tiles T4, T15 T21, and T24.

Figure 25F:
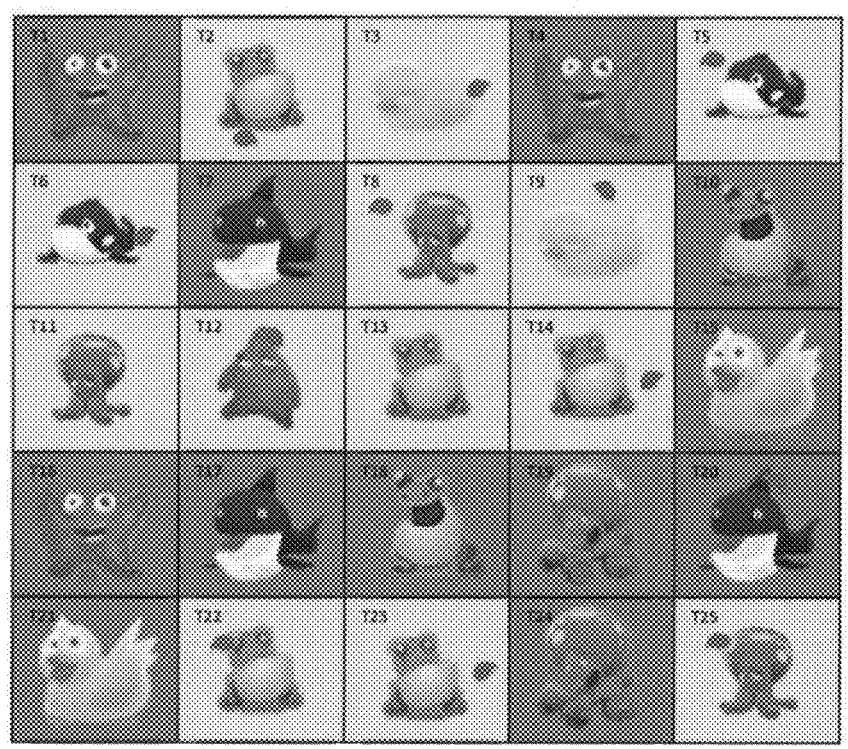

FIG. 25f shows the game board after the spaces on the board have been refilled from above, as indicated by the arrow. Tiles T4, T7, T15, T21, and T24 have retained their water background. The tiles adjacent to those impacted by the five large water droplets continue to be splashed.

Figure 25G:
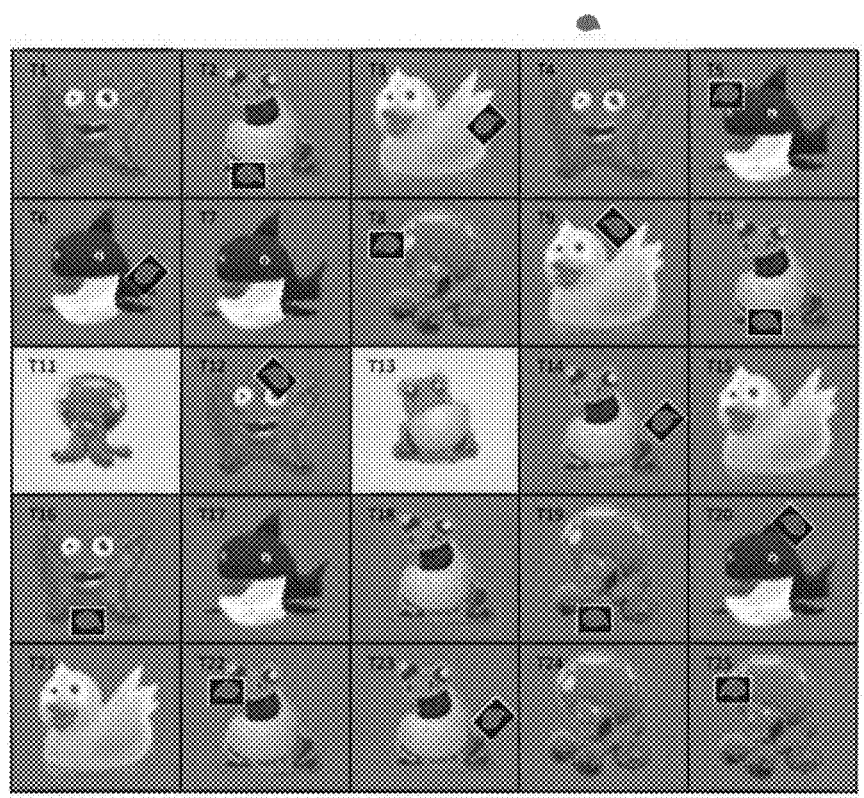

FIG. 25g shows all the splashed adjacent tiles to T4, T7, T15, T21, and T24 having attained a water background as a result of being splashed. The splashes within the tiles have been highlighted to shown their location more clearly against the blue background.

Figure 25H:
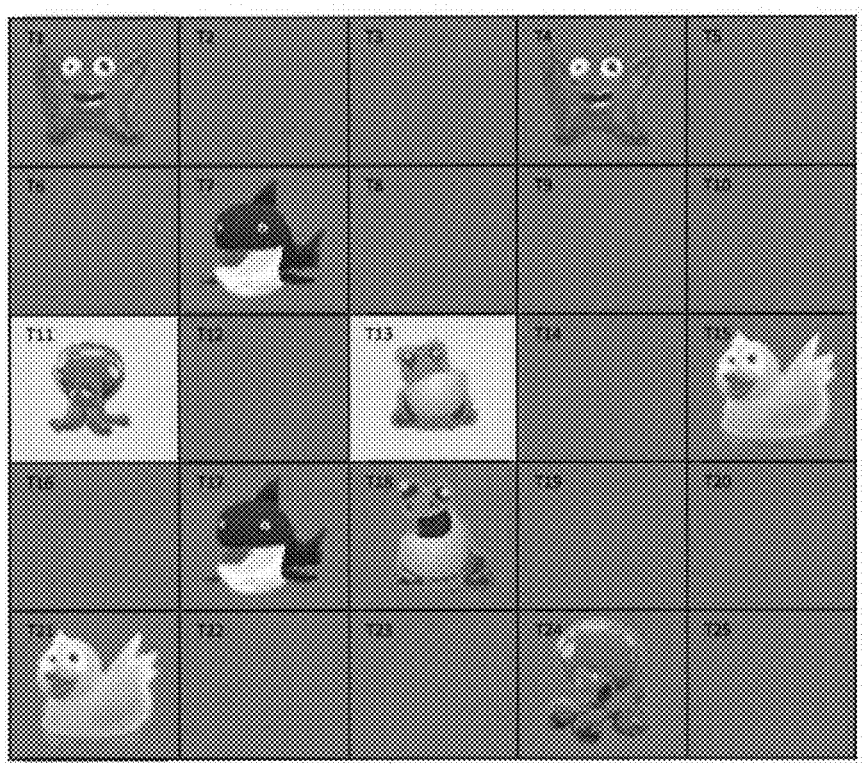

FIG. 25h shows the game board after the animal game objects in the adjacent tiles T2, T3, T5, T6, T8, T9, T10, T12, T14, T16, T19, T22, T23, and T25, have been removed as a result of being splashed. In this illustration, this results in most of the game objects being removed due to the edited game board size.

Figure 25I:
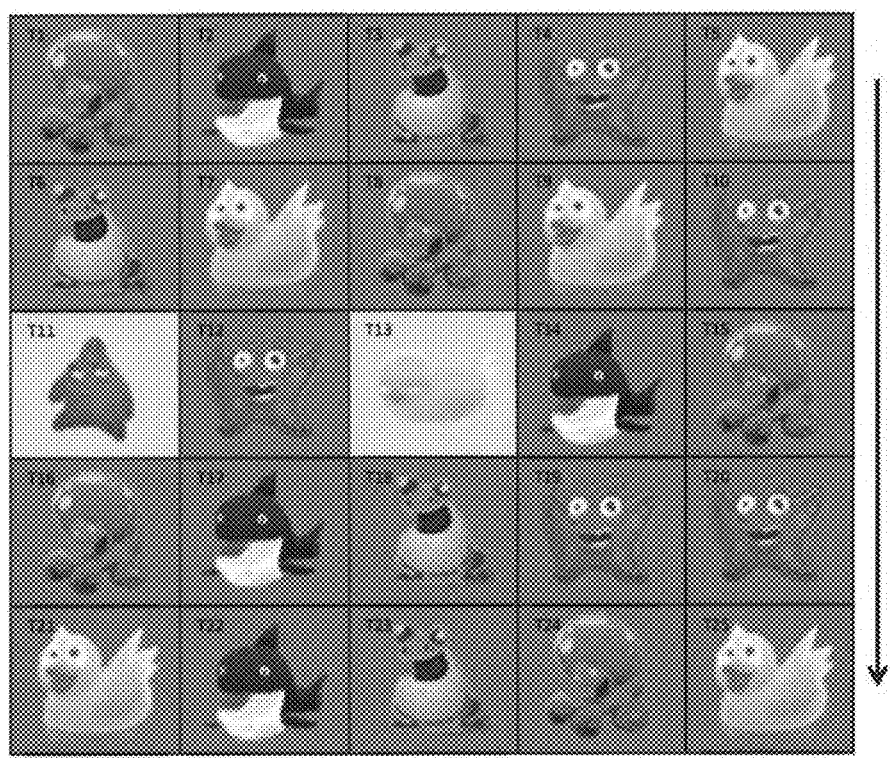

FIG. 25*i* shows the spaces in the game board having been refilled from above in the usual way, with the remaining game objects moving to the bottom of their respective tile columns.

Figure 26A:
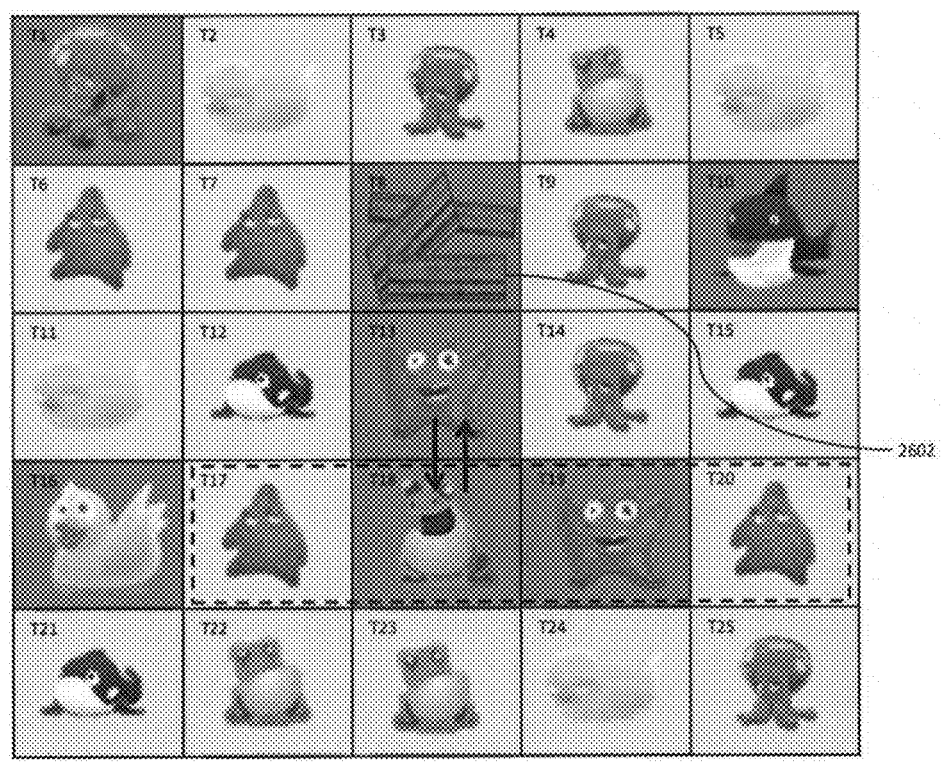

FIG. 26*a* shows an edited version of the game board. Tile T8 is occupied by a 'blocker' 2602, illustrated by 3 overlapping planks of driftwood. A move resulting in a 4-combo is shown by two arrows, and the resulting 4-combo position is outlined by a dashed line.

Figure 26B:
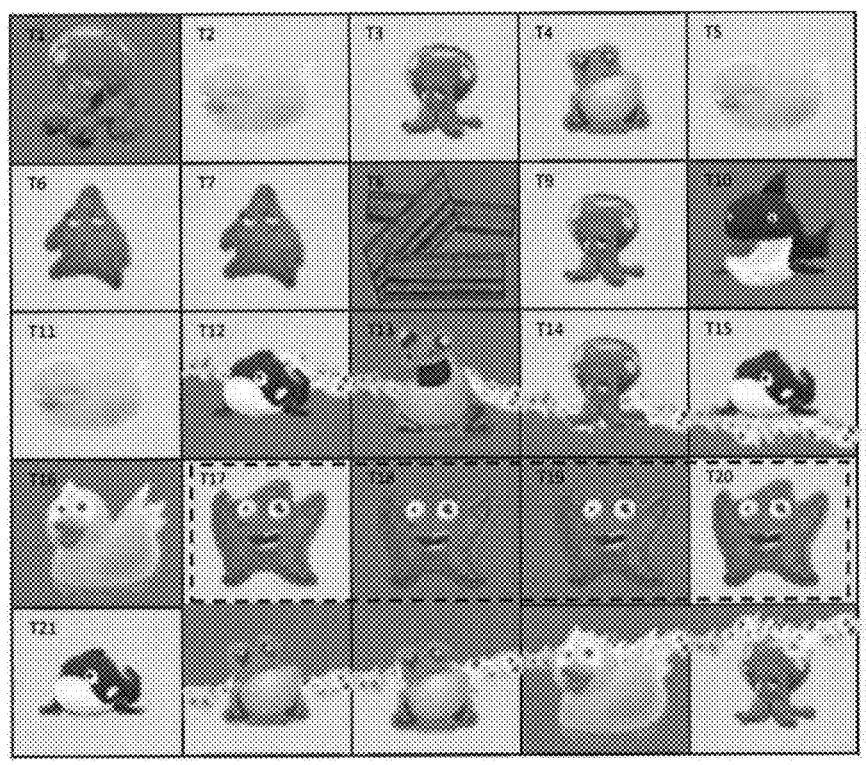

FIG. 26*b* shows the resulting tidal waves from the 4-combo travelling through the water tiles until they reach a ground tile, as previously described in more detail with reference to FIGS. 23 and 24.

Figure 26C:
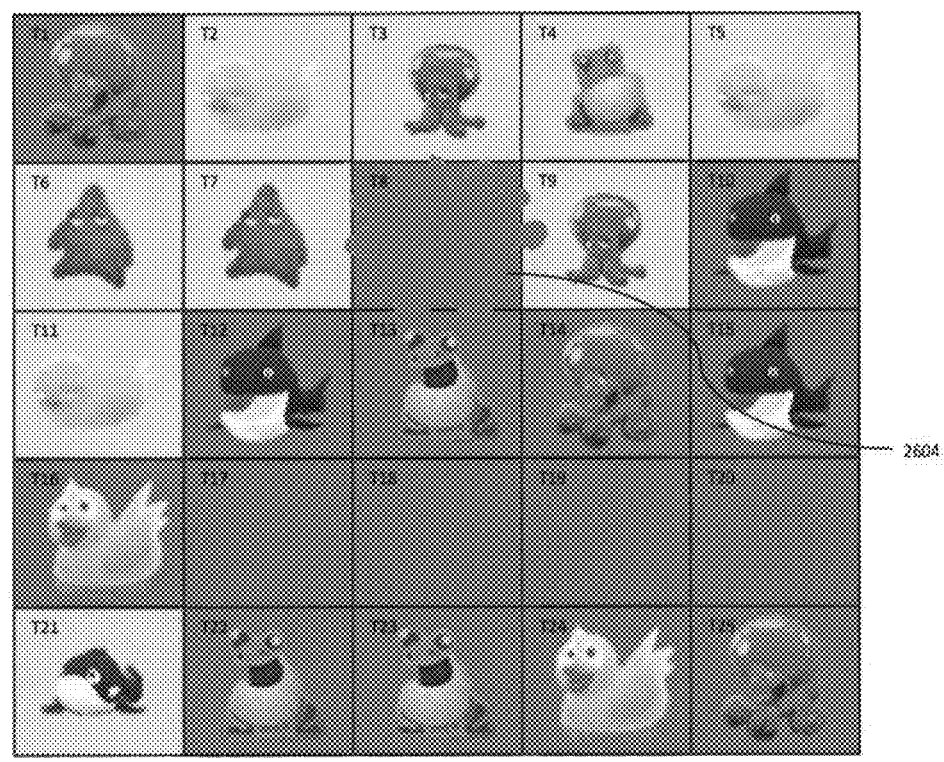

FIG. 26*c* shows the game board after the tidal wave has moved through tile T13, and on to tile T8. As T13 had already attained a water background, there is no change in its background or the marine animal that occupies it. Tile T8 contains a splash 2604 as a result of the tidal wave then encountering the 'blocker' 2602 occupying this tile. The 'blocker' is destroyed by the tidal wave, and the tidal wave moves no further along the column. Tile T8 attains a water background as the result of this encounter.

Figure 26D:
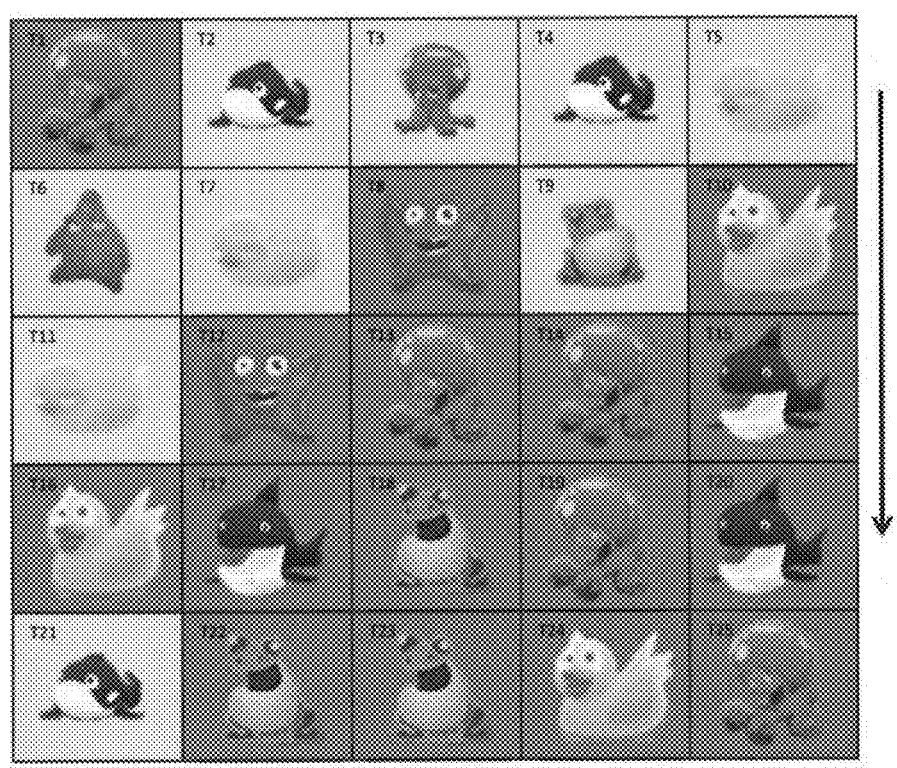

FIG. 26*d* shows the game board having been refilled from above, as previously illustrated, and indicated by an arrow.

FIG. 27 is a flow diagram which shows the steps carried out to determine the type of refill to be rendered. This is dependent upon the presence of jam, of special candy, or the presence of both within a match. At step S2700 a match is detected. A check is performed returning that none of the matched candies are on jam S2702. This results in the board refilling normally S2704. Alternatively, a check is performed returning that one or more normal candies within the match are on jam S2706. This results in the board refilling with candies rendered on jam S2708. Alternatively, a check is performed returning that special candy is in the match S2710. This results in the special candy's associated special feature S2712. A check is then performed to establish whether the special feature will encounter candy on jam S2714. If so, the jam is smeared in keeping with the special feature S2718. The candies are then refilled rendered on jam, as smeared by the special feature S2720. If the special feature does not encounter candy on jam, the candies are refilled normally S2704. Alternatively, a check is performed returning that special candy on jam is in the match S2722. This results in the special feature associated with the special candy in the match S2724. The candies removed by the special feature are refilled rendered on jam S2716.

FIG. 28 is a flow diagram which shows the steps carried out once a match is detected S2800 in order to correctly render the jam. Step S2802 checks whether the match covers tile in which there is jam. If no jam is detected then the matched candies are removed from the game board, which is then refilled from above as usual, and the next game move S2804 is played. If the match does cover jam, a check is performed to establish if there is more than one colour jam S2806. If there is only one colour of jam covered, the jam is spread to the tiles in the match S2808. If there is more than one colour of jam covered by the match, more checks are needed to determine which is spread. Step S2810 checks whether the candy that was dragged to make the match is on jam. If it is, the colour of jam covered by the dragged candy is spread S2816. If there is no jam covered by the dragged candy, the rest of the tiles in the match are considered. Step S2812 checks whether there is a majority of one colour of jam covered by the match. If there is no majority colour of jam covered by the match, the majority colour of jam on the board is spread S2818. IF there is a majority colour of jam covered by the match, this colour jam is spread S2814.

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the scope of the invention as claimed.

The terms user and player are used interchangeably throughout this document and no specific meaning is intended using one or the other unless the context suggests otherwise.

Match 3 Switcher Game

The following description describes additional game components of match 3 switcher games. The person skilled in the art will understand that there are many other ways the present ideas can be implemented and the description is not limited to only one implementation. The following features can be used in combination with any of the aforesaid novel game components.

Glossary/Terms

Game board: The area where the matching and swapping of elements occur: Note that the entire game board is not visible to a player but can be scrolled to change the player view.

Game elements: All elements that appear on the game board. A game element comprises a tile having a background appearance and carry's a game object. The terms game element and game object are used interchangeable herein when describing game play relating to the objects themselves.

Standard game elements: These are the six basic candies used for making switches and colour matches on the game board. Compared to special game elements, the standard game elements have no extra properties or behaviour, they are only used to make colour combinations or to create new special game elements.

Special game elements: All elements that appear on the game board and which have specific behaviours and properties.

Striped candy: A special candy with a line blast effect which means it removes one row or one column.

Line blast: An effect which removes one row or one column.

Bomb element: a candy in wrapped paper which removes candies in a 3×3 square area.

Wrapped candy: a candy in wrapped paper which removes candies in a 3×3 square area.

Colour Bomb: Removes all candies of the colour it is being swapped with.

Booster: Something that enhances the gameplay and that supports, assists, or increases power or effectiveness.

Blocker: Special game elements that are unswappable, need 1 or more matches next to them to disappear and are in the way for falling candies.

Candy Crush Saga™ by the games developer King™ is a game belonging to the match-3 category of games. This means that the core basic of the game is to match three or more game elements sharing the same colour with each other. In Candy Crush Saga, these game elements are implemented as candies. FIG. 1 and FIG. 2 shows one implementation of the first level in Candy Crush Saga™ where candies have to be matched to complete the level.

The game has more than 350 different levels and not all of those levels have the same requirements to be completed. Simply matching three or more game elements is not enough to complete all levels in the game but the player has to meet certain goals as well. These goals could be to reach a certain amount of points before running out of moves or time; to bring down certain game elements to the bottom of the screen; to remove a certain amount of game elements before running out of moves or to collect certain game elements through specific matches before running out of moves.

If the game becomes difficult there are boosters to help the player pass a level. These can be obtained from in-game purchases or received as gifts from Facebook friends.

The game also has a candy land themed map view. The map view shows what levels have been completed as well as how many levels are left to play. Throughout the game and for each level completed, the player journeys across the map and follows the story of a girl who is journeying through the candy land. The map is also divided into different areas where each area has its own candy theme as well as a small story connected to that area.

If the player has connected to a social network by entering login details through a prompt in the game, then friends' progress from the same network can be viewed on the map by the means of their portrait next to the highest level they have currently reached.

If the player connects to the social network Facebook when playing the game, then the game will automatically synchronize and either download or upload the latest changes in the progression of the game. For example, the player could have played the game on another computer via Facebook's own platform and if the player then later decides to play on for example their iPhone, the latest updates would be sent to this device. As long as the player is connected to the internet and has logged in to Facebook via the game, then the game will automatically synchronize and send data to Facebook, making it possible for the player to play on any computer, iOS device or Android device without having to start the game over. This makes the place to play very flexible.

Rules

Basic Moves and Combinations

Moves

To play game elements in the shape of candies are swapped with each other to make moves on a game board. To gain points the player has to make moves that create matches of at least three of the same candy. In doing so, the player gains points and the matched candies are removed. As a result, new candies populate the game board in order to fill any empty spaces created. The game board is populated depending on the physics of a tile associated with each game element. For all candies that are removed on the game board, points are always shown in the same colour as the candy that was removed, for example three red candies will show red points, green candies green points and so on. If a blocker element would be removed then the points shown would be in the same colour as the candies from the match that removed it.

Only swapping moves that will create at least one combination of at least three game elements of the same type are allowed.

Limited Number of Moves

A typical game mode of Candy Crush Saga provides the player with a limited number of moves to reach the level target.

In some implementations additional moves can be earned by good gameplay.

The Game Board

The game board is a scrolling game board. The display displays a grid of square tiles, each with a game element, showing a portion of the level being played (see FIGS. 5 and 6).

Different Goals to Complete Levels

To add more diversity and make Candy Crush Saga™ a more dynamic game, players have to fulfil different criteria in order to complete different levels; these are referred to as goals. Each level always has one or more goals that have to be fulfilled in order to complete that level. The goal discussed in this description is to attain a certain background appearance of tiles.

Reach a Set Score Before Running Out of Moves

One of Candy Crush Saga's most common goals is to collect a certain amount of points before running out of moves. The points are collected through making matching combinations on the game board. The smarter combinations made, the more points.

Reach a Set Score Before Running Out of Time

Candy Crush Saga also has timed levels. The goal that needs to be fulfilled on these levels is to collect a certain amount of points before time runs out. The smarter combinations made, the more points.

Basic Rules

How to Play

If the player tries to make a move with two candies in such a way that no candy will be matched with at least two more of its own colour, then the move will not be allowed and the player will have to try to find another move.

If no moves are possible on the game board then all the candies are reshuffled so that there will always be at least one possible move available. If the player can't see or find a move to make, then the game helps the player by giving a hint. The hint is displayed after a few seconds of inactivity and is shown by brightening and magnifying the candies of a possible move in a flashing animation.

Advanced Rule

Not only the match of 3 candies is allowed but matches of more candies can also be done. Matches with more than 3 candies give more points and is something the player should try and aim for. Different acceptable matches are:
  Match of 3 in a line.
  Match of four in a vertical line.
  Match of four in a horizontal line.
  Match of four in a 2×2 square.
  Match of five in a vertical line.
  Match of five in a horizontal line.
  Match of five in a T-shape.
  Match of five in an L-shape.
  Match of 6 or more candies in a combination of 4-in-a-row, 5-in-a-row, T- and L-shapes.

As can be noticed from the list of possible matches, no diagonal matches are accepted. Diagonal matches and/or swaps can be allowed in some implementations of the game.

Combos to Receive Special Elements

Matches made of four or more candies not only give more points but also reward the player with special game elements. The special game elements received from combos have various positive properties and can be used to gain more points and to easier pass a level. The elements received from different matches are:
  4-in-a-row: Striped candy
  4 in a 2×2 block: Fish
  L- or T-shape: Wrapped candy
  5-in-a-row: Colour bomb If a match is made with more than 6 candies, then it is likely that the combo is a shape merged from 4-in-a-row, 5-in-a-row, L-shape and T-shape. If so, there is a hierarchy of what kind of special element is received:

If there is a merge of 4-in-a-row and an L- or T-shape, then the special game element received will be the same as from an L- or T-shape. L- and T-shapes give the same special game element.

If there is a merge of 5-in-a-row and an L- or T-shape, then the special game element received will be the same as from a 5-in-a-row combo.

How to Trigger Special Elements

To use the special game elements received from combos there are two different ways:
  Some of the special game elements are triggered through a standard match with two or more candies of the same colour as the special game element.
  Some of the special game elements are triggered by swapping place with any candy regardless if a match-3 is made.

Combining Special Elements with Each Other

Special game elements received from matches can be combined with each other for various positive effects affecting the game board. Striped candies, Wrapped candies and Colour bombs can all be matched with each other. To trigger these combos they do not need to be matched by game elements of the same colour but can simply be swapped with each other for an instant trigger.

Points

The points given for different combinations and removals of blocks are:
  3-in-a-row: 60 points
  4-in-a-row: 120 points
  5-in-a-row: 200 points
  T-shape: 200 points
  L-shape: 200 points
  Break a Jelly block: 1000 points
  Break a Frosting block: 20 points/per block
  Break a Chocolate block: 20 points/per block
  Get an ingredient to the bottom of the screen: 10 000 points
  Using a special game element to remove other game elements: 60 points/per element removed Game Elements Standard Game Elements In Candy Crush Saga there are 6 standard game elements (see FIG. 15) which all look like candies:
  Purple candy in the shape of a flower
  Blue candy in the shape of a sphere
  Green candy in the shape of a square block
  Red candy in the shape of a tilted bean
  Yellow candy in the shape of a drop
  Orange candy in the shape of an oval Special Game Elements Special game elements can either be received from special combos or from an automatic placement on the game board.

Special Game Elements Received from Combos

Striped Candy

How to Generate a Striped Candy

A Striped candy is given by matching four candies of the same colour in a horizontal or vertical line.

Looks

The Striped candies have the same shape and colour as the standard game elements except for that they have white vertical or horizontal lines on them. The colour and the shape of the striped candy will be the same as the candies' which were being matched to create it.

If the match of four candies is done in a horizontal line then a candy with vertical lines will be given. If a match of four candies is done in a vertical line, then a candy with horizontal lines will be given.

Effect

Striped candies remove a whole row or column depending on if it was made from a vertical or horizontal combo. The white lines on the candy indicate whether it will remove a row or a column. To trigger a Striped candy it needs to be matched with two more candies of the same colour.

Striped candies removes all candies in a row or column also if the game board is divided up in two or more areas that are not connected. The player can this way remove candies from areas that otherwise would be hard or impossible to find combinations in. The impact of different game board designs are described elsewhere in this document.

Animation when Used

When a Striped candy is being triggered, an animation shoots out of the Striped candy following the row or column which it is removing. The animation looks something like the candy being stretched out and turned into lines that shoot out together with a sparkle effect. For all candies that are being removed, the points given for each candy will be shown in the same colour as the candy being removed.

Wrapped Candy

How to Generate a Wrapped Candy

A Wrapped candy is given by having an L- or T-shaped combination.

Looks

The Wrapped candies have the same shape and colour as standard game elements but with a wrapping around them. The colour and the shape of the Wrapped candy will be the same as the candies' which were being matched to create it.

Effect

The Wrapped candy is triggered by matching it with two more candies of the same colour. The result of the trigger are two explosions removing candies in a 3×3 square around the Wrapped candy. The first explosion occurs instantly when the Wrapped candy is being triggered, the second explosion occurs after all candies from the first explosion have been removed and replaced with new candies. If the Wrapped candy is at the edge of the game board an explosion will happen but there is no effect from the part of the explosion area that is outside of the game board. When swapped with a colour bomb, all candy in the level is destroyed.

Animation when Used

When a Wrapped candy detonates, an animation with sparkling effect and light circles is shown with the Wrapped candy in the centre of the animation.

Colour Bomb

How to Generate a Colour Bomb

A Colour bomb is received when matching five candies in a vertical or horizontal line.

Looks

The Colour ball looks like a chocolate sweet. A round ball with multi coloured sprinkles on it.

Effect

To trigger the Colour bomb it can be swapped with any candy, no match-3 is necessary. When the Colour bomb is triggered, it removes all candies of the same colour as the candy that was used to trigger it.

Animation when Used

When the Colour bomb is being used. Blue coloured lightning bolts shoots out from the colour bomb to all candies that are going to be removed.

Other Special Game Elements

Mystery Candy

How to Generate a Mystery Candy

Mystery Candies are placed randomly on the game board and do not need a special combination to appear.

Looks

The Mystery candies have an oval flattened shape which is slightly tilted and with a question mark painted onto it. The Mystery candy comes in the 6 standard candy colours.

Effect

To use the mystery candy it needs to be included in a standard match-3 with candies of the same colour as the Mystery candy. The Mystery candy will then turn into a random game element which could have either positive or negative impact for the player. It could for example turn into a Striped candy or a Colour bomb, or it could turn into something less fortunate for example a spreading chocolate block (see description elsewhere) or a bomb that counts down and explodes to make the player game over.

Animation when Used

When the Mystery candies are used in a combination they burst and turn into a random element.

Lucky Candy

How to Generate a Lucky Candy

Lucky candies are inserted on the game board automatically when having selected a pre-game booster which specifically adds Lucky candies to the candy mix on the game board.

Looks

The Lucky candy looks like a flattened sphere with a white tick mark painted on top of it. The candy comes in all the 6 standard candy colours.

Effect

To use the Lucky candy it need to be matched with two more candies of the same colour. The Lucky candy will then turn into a random positive game element.

Animation when Used

When the Lucky candy is being matched it looks like it is unwrapped and behind the wrap it reveals the new game element.

Fish

How to Generate a Fish

Fishes are placed on the game board by selecting a pre-game booster that specifically does so. They can also be created by creating a match of 4 candies in a 2×2 block. Further ahead in the game the Fish can also appear randomly on the game board.

Looks

The Fish looks like a candy jelly fish. It comes in the same colours as the standard 6 candies.

Effect

The fish is used by matching it with two more candies of the same colour. Doing so will cause the fish to swims towards a random element on the gameboard and remove it. If there are Jelly blocks or other blockers then the game will prioritize to remove those before removing a candy that stands on an empty square.

Polka Fish

How to Generate a Polka Fish

This fish is given when combining a Fish with a Striped candy. The Striped candy and the Fish do not need to be of the same colour. Furthermore the Polka fish will be triggered instantly and cannot be saved for later use.

Looks

The Polka fish looks like a standard candy Fish but with the same kind of stripes as the Striped candy.

Effect

The Polka fish turns a random candy into a vertical or horizontal striped candy which in turn is instantly triggered and creates a line blast effect.

Animation when Used

In one implementation, as with the standard candy Fish and the Wrapped Fish, the created Polka fish swims out of view and returns with two more Polka fishes of the same colour which then swims to the position of the candies that are to be turned into triggered line blast elements. Having reached their destination the Polka fishes disappear.

Colour Changing Candy
How to Generate a Colour Changing Candy

These candies are placed automatically on the game board. They could also be a resulting candy when having used a mystery candy.

Looks

Like a standard candy but with a soft glow around it and an animation of a rainbow passing by over the surface of the candy.

Effect

The candy changes between two colours for every switch made on the game board.

Teleporter

This is a game element that is automatically placed on a fixed position on an edge of one of the cells in the game board. The teleporter will typically be placed on the game board in pairs where one of the teleporters act as an entry point for candies falling on the game board across the cell edge where the teleporter sits. The candy will then be introduced on the game board where the exit point teleporter sits. So if a candy is normally falling one way from the top of the game board to the bottom of the game board, the teleporter can move a candy up the game board again or to another area of the game board.

The teleporter does not fall down or take space on the area where switching is done and it is never included in any colour combinations.

Jelly Blocks

Jelly blocks are introduced early in the game and a typical goal to complete a level is to remove all Jelly blocks on the game board. Alternatively, the goal to complete a level may be to uncover larger game objects that are positioned behind several jelly blocks as seen in FIG. 17.

The Jelly blocks are placed behind candies and are stuck into place. They cannot be swapped and they do not fall down if candies below them are being removed. To remove a Jelly block a match has to be made on top of it. Sometimes Jelly blocks consist of two layers and then they need two matches on top of them to be removed.

Candy Cannon

This is a visible game mechanic. In one implementation it can indicate where liquorice, bombs, and ingredients are set to appear.

Combining Special Game Elements

Special game elements can be combined with each other through a simple switch. Doing so creates powerful effects that help the player earn more points and to easier pass a level.

The different combos and effects received are:
Two Striped candies
Two Wrapped candies
One Striped and one Wrapped candy
One Wrapped candy and one Colour bomb
One Striped candy and one Colour bomb
Two Colour bombs
Two Fish Two Striped Candies Combining two Striped candies will trigger two simultaneous line blasts where one row and one column is removed in a cross shaped way, see FIG. 24. It does not matter if the Striped candies combined are horizontal or vertical. The column and row blasts will be initiated from the position which the moved striped candy has been moved to.

Two Wrapped Candies

Swapping any two Wrapped candies with each other will create a double explosion as with a standard Wrapped candy, the difference being that the area of effect will be much larger and remove everything in a 6×5 square area or a 5×6 square area depending on if the Wrapped candies are placed next to each other horizontally or vertically.

One Striped and One Wrapped Candy

Combining any Striped candy with any Wrapped candy will trigger 3 horizontal and 3 vertical line blast effects. The result is three adjacent rows being removed and thereafter three adjacent columns being removed.

One Wrapped Candy and One Colour Bomb

Combining these two will first remove all of the candies on the gameboard.

One Striped Candy and One Colour Bomb

The combination of these two special candies will turn all candies of the same colour as the Striped candy into randomly vertical or horizontal Striped candies which are then instantly triggered and fills the game board with line blasts.

Two Colour Bombs

Combining two Colour bombs will remove all game elements on the game board except if a game element is a multi-layered blocker (see description elsewhere). If a game element has more than one layer then one of those layers will be removed.

Two Fish

Combing two fish causes three fish to swim out from the position of the combination to three random locations on the gameboard. The fishes remove the game elements at the three position that they swim to.

Coconut Wheel and Colour Bomb

First, all candies which the game board has the most of will be removed. After those candies have been removed, the Coconut wheel will roll over the board and every candy it rolls over will turn into stripes.

Coconut Wheel and Striped Candy

With this combination, the Coconut wheel will roll over the board and turn all candies it rolls over into Striped candies that instantly triggers.

Coconut Wheel and Wrapped Candy

With this combination, the Coconut wheel turns all candies that it rolls over into Wrapped candies which are then instantly triggered and explodes.

Blockers

The game implements several different kinds of so called Blockers. Blockers are negative game elements that are in the way for the player when wanting to make matches on different areas of the game board. The game described herein has a new game objective associated with a Chocolate blocker.

The Chocolate blocker not only blocks a space on the game board but also multiplies to block even larger areas of the game board. If a colour combination is made next to a Chocolate blocker then no Chocolate block will multiply and that Chocolate block will be removed. However, if a colour match is made and is not next to a chocolate block then one of the Chocolate blocks on the game board will multiply and another space on the game board will be filled with a Chocolate blocker. The space that receives a new Chocolate block will always be adjacent to an existing Chocolate block, however, which Chocolate block on the game board it will come from is seemingly random. If all Chocolate blocks on the game board have been removed then no new Chocolate blocks will appear. Chocolate blockers cannot be swapped and change places but are stuck where they are. Chocolate blockers can only multiply to a cell on the game board that is occupied with a candy.

Boosters

Novel boosters discussed herein include the colouring candy and the Manually Operated Sidekick.

In-Game
Game Board

Part of the game board is presented to the player while playing levels in Candy Crush Saga. The term game board signifies the area that contains candies and other elements such as ingredients, jelly and frosting, not the surrounding landscape such as the score meter and the heart showing the amount of lives left. The entire game board is not visible to a player; instead the CPU can control the user interface to scroll the service board to a player.

There are audio controls on the user interface used for the music and sound effects. The amount of moves the player has left to complete the level is shown. The current score of the player, expressed in absolute points is presented so that the player may follow the gameplay. The star meter, showing an indication of how much points the player has in relation to the pre-defined goals required for achieving a certain amount of stars. The game board is populated with regular candies in regular cells and or tiles. The number of lives the player has left is shown. Both the current level of the game and a symbol indicating what the goal of the level is are shown in relation to the game board. The physics of a tile governs where new candies enter onto the board when existing ones are removed. For part of the game board (upper part in FIG. 16) new candies are generated from the top and fall downwards as shown by the arrows, and for the lower part in FIG. 16 candies are generated from the bottom and move into place upwards.

The entire game board is not visible to a player: instead it can scroll upwards or downwards depending how the game progresses as described earlier.

Star Meter

In the most basic version, this feature serves the purpose of letting players know their performance while playing the game by showing which level of score they have accomplished. The level of score is determined by the amount of points gathered and compared against predefined levels that will earn the player one, two or three stars. Stars are a representation of how well a player is performing on a level. Achieving at least one star is required to pass a level. Achieving more than one stars indicates that a player is performing better than the minimum required and is a factor that helps drive engagement by making players feel more skilled. The amount of points required to achieve one, two or three stars is pre-defined and typically does not change for any level. However, in some implementations it is possible to have a variable score required for different amounts of stars, for instance one that is correlated with the average scores of all players playing the game.

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

In some implementations, the player can see indications of the previous high score achieved on a level while playing it. It is also possible that no indication of the player's own previous score is shown.

In some implementations, the indications of the performance of other players are shown in relation to the score meter. It can be both absolute and relative indications. The indications can be in the form of pictures associated with the players. When the player passes the score of another player or the previous best score the player has achieved, a message can be shown to encourage the player and denote the accomplishment.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

The look of a level, as well as the overall look of the virtual landscape, can change as the player performs better. For instance, after achieving one star during the play of a level, the digits shown when scoring points can turn into a different colour. The lookout of the virtual landscape can become warmer and more colourful as more stars are gained. The look of the game can change according to other variables as well, such as the in-game view changing depending on how many moves are left in order to convey a sense of urgency.

The Star Meter also has other important functions. One is that the score of friends from a social network is shown on the meter, if there is data available. This increases competition and incentivises players to replay levels in order to beat the score of friends.

Another function is that the amount of stars achieved on each level is shown next to the levels on the map view. This gives players an overview of their overall performance in the game. Also, in order to complete a level the player needs to reach the amount of points needed to achieve at least one star.

The invention claimed is:

1. A computer device having:
    a user interface configured to display user actuatable game elements in a game board and to detect user input when a user engages with a game element in a move;
    a processor configured to receive a detected user input and on detecting a match game condition to control the user interface to remove at least three game elements from the display and to generate replacement user game elements for a subsequent move; and
    a graphics rendering component operable to render the game elements on the user interface, each game element having a graphical representation on a tile having a background appearance,
    wherein the processor is configured to determine on detecting the match game condition if at least one tile in the match game condition has an attained background appearance and if so to apply the attained background appearance to each tile of the match condition;
    wherein if the processor determines on detecting the match game condition that no tile in the match game condition has an attained background appearance, it is configured to cause replacement tiles of the match game condition to be rendered with tiles of a standard background appearance, wherein the standard background appearance differs visually from the attained background appearance.

2. A computer device according to claim 1, wherein the standard background appearance is a first colour and the attained background appearance is a second colour.

3. A computer device according to claim 1, wherein the standard background appearance is matt and the attained background appearance is shiny.

4. A computer device according to claim 1, wherein the graphics rendering component is operable to render game elements in multiple varieties, each variety differing from another variety in its shape and/or colour of the game element rendered on each tile.

5. A computer device according to claim 4, wherein the game elements resemble candies.

6. A computer device according to claim 1, wherein the processor is configured to control the graphics rendering component to generate on the game board at least one special game element, wherein a special game element causes multiple further game elements to be removed when it is involved in a match game condition.

7. A computer device according to claim 6, wherein the tiles on the game board are arranged in rows and columns.

8. A computer device according to claim 6, wherein the special game element causes a column of existing game elements on the game board to be removed in a line blast feature.

9. A computer device according to claim 1, wherein the direction of refill of the game element is downwards from a top portion of the game board when viewed by a user.

10. A computer device according to claim 1, wherein each tile has a selectable physics which controls the direction in which its game element moves to replenish a vacancy left by removed game elements.

11. A computer device according to claim 1, wherein a game element is engaged by a user to be switched with an adjacent game element to create a match.

12. A computer device having:
a user interface configured to display user actuatable game elements in a game board and to detect user input when a user engages with a game element in a move;
a processor configured to receive a detected user input and on detecting a match game condition to control the user interface to remove at least three game elements from the display and to generate replacement user game elements for a subsequent move; and
a graphics rendering component operable to render the game elements on the user interface, each game element having a graphical representation on a tile having a background appearance,
wherein the processor is configured to determine on detecting the match game condition if at least one tile in the match game condition has an attained background appearance and if so to apply the attained background appearance to replacement tiles of the match game condition at the location of the removed game elements of the match condition;
wherein the processor is configured to control the graphics rendering component to generate on the game board at least one special game element, wherein a special game element causes multiple further game elements to be removed when it is involved in a match game condition,
wherein the processor is further configured to detect whether the special game element was on a tile with an attained background appearance, and if so to render all tiles with replaced game elements to have the attained background appearance.

13. A computer device having:
a user interface configured to display user actuatable game elements in a game board and to detect user input when a user engages with a game element in a move;
a processor configured to receive a detected user input and on detecting a match game condition to control the user interface to remove at least three game elements from the display and to generate replacement user game elements for a subsequent move; and
a graphics rendering component operable to render the game elements on the user interface, each game element having a graphical representation on a tile having a background appearance,
wherein the processor is configured to determine on detecting the match game condition if at least one tile in the match game condition has an attained background appearance and if so to apply the attained background appearance to replacement tiles of the match game condition at the location of the removed game elements of the match condition;
wherein the processor is configured to control the graphics rendering component to generate on the game board at least one special game element, wherein a special game element causes multiple further game elements to be removed when it is involved in a match game condition;
wherein the processor is further configured to detect if the special game element was on a tile with an attained background appearance, and if not to apply a refill procedure, wherein the tiles on the game board are arranged in rows and columns, the special game element causes a column of existing game elements on the game board to be removed in a line blast feature, and the refill procedure detects whether any game elements removed in the line blast feature are on an attained background appearance, and if so to apply the attained background appearance to refill game elements for that game element and game elements in a refill direction of the column.

14. A computer device having:
a user interface configured to display user actuatable game elements in a game board and to detect user input when a user engages with a game element in a move;
a processor configured to receive a detected user input and on detecting a match game condition to control the user interface to remove at least three game elements from the display and to generate replacement user game elements for a subsequent move; and
a graphics rendering component operable to render the game elements on the user interface, each game element having a graphical representation on a tile having a background appearance,
wherein the processor is configured to determine on detecting the match game condition if at least one tile in the match game condition has an attained background appearance and if so to apply the attained background appearance to replacement tiles of the match game condition at the location of the removed game elements of the match condition;
wherein the game element represents letters, and a match condition is determined by the formation of a word stored in a dictionary accessible to the processor.

15. A computer device according to claim 14 wherein a game element is engaged by a user to link to an adjacent game element to create a match.

16. A computer device having:
- a user interface configured to display user actuatable game elements in a game board and to detect user input when a user engages with a game element in a move;
- a processor configured to receive a detected user input and on detecting a match game condition to control the user interface to remove at least three game elements from the display and to generate replacement user game elements for a subsequent move; and
- a graphics rendering component operable to render the game elements on the user interface, each game element having a graphical representation on a tile having a background appearance,
- wherein the processor is configured to determine on detecting the match game condition if at least one tile in the match game condition has an attained background appearance and if so to apply the attained background appearance to replacement tiles of the match game condition at the location of the removed game elements of the match condition;
- wherein the processor is configured to detect when all tiles have the attained background appearance, and to generate a new game board for a new level.

17. A computer implemented method of controlling a user interface responsive to user engagement with displayed game elements on an interface, the method comprising the following steps implemented by a processor of a computer device:
- detecting a match game condition of at least three game elements responsive to user input;
- generating replacement game elements to be displayed, each game element associated with a tile having a background appearance;
- determining on detecting the match game condition if at least one tile in the match game condition has an attained background appearance, and if so applying the attained background appearance to each tile of the match condition; and
- generating a game board having a first set of tiles with a standard background appearance, a second set of tiles with a first attained background appearance and a third set of tiles with a second attained background appearance, wherein an objective for the user is to select one of the first and second attained background appearances and to control the game elements such that after at least one game replacement tiles are all of his selected first or second attained background appearance.

18. A method according to claim 17, wherein a first player controls the first attained background appearance and a second player controls the second attained background appearance wherein if the attained background appearance associated with the player making a move for which a match condition is identified is comprised in the match, all the tiles of the match change to the attained background of that player.

* * * * *